(12) United States Patent
Takano et al.

(10) Patent No.: US 12,293,588 B2
(45) Date of Patent: May 6, 2025

(54) OBJECT DETECTION DEVICE, OBJECT DETECTION SYSTEM, MOBILE OBJECT, AND OBJECT DETECTION METHOD

(71) Applicant: KYOCERA Corporation, Kyoto (JP)

(72) Inventors: Fuko Takano, Yokohama (JP); Eijiro Shibusawa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 455 days.

(21) Appl. No.: 17/753,948

(22) PCT Filed: Sep. 15, 2020

(86) PCT No.: PCT/JP2020/034984
§ 371 (c)(1),
(2) Date: Mar. 18, 2022

(87) PCT Pub. No.: WO2021/054340
PCT Pub. Date: Mar. 25, 2021

(65) Prior Publication Data
US 2022/0383643 A1    Dec. 1, 2022

(30) Foreign Application Priority Data
Sep. 19, 2019   (JP) .............................. 2019-170901

(51) Int. Cl.
*G06V 20/58*   (2022.01)
*G06T 7/593*   (2017.01)
*G06T 7/60*    (2017.01)

(52) U.S. Cl.
CPC ............. *G06V 20/58* (2022.01); *G06T 7/593* (2017.01); *G06T 7/60* (2013.01); *G06T 2207/10028* (2013.01); *G06T 2207/30261* (2013.01)

(58) Field of Classification Search
None
See application file for complete search history.

(56) References Cited

U.S. PATENT DOCUMENTS

| 5,410,346 A * | 4/1995 | Saneyoshi ............ H04N 13/239 348/148 |
| 2013/0223686 A1 * | 8/2013 | Shimizu .................. G06T 7/246 382/103 |

(Continued)

FOREIGN PATENT DOCUMENTS

| EP | 2772883 A2 | 9/2014 |
| JP | H05-265547 A | 10/1993 |

*Primary Examiner* — Soo Shin
(74) *Attorney, Agent, or Firm* — Studebaker Brackett PLLC

(57) ABSTRACT

A processor of an object detection device is configured to search for a pair of coordinates associated with a disparity approximately equal to a target disparity satisfying a predetermined condition in a second direction of a disparity map, update a first pair of coordinates to the found pair of coordinates, and calculate a height of an object corresponding to the target disparity on the basis of the first pair of coordinates. In the disparity map, a disparity acquired from a captured image is associated with a pair of two-dimensional coordinates formed by a first direction and the second direction intersecting the first direction. When a second pair of coordinates associated with a disparity approximately equal to the target disparity is present within a predetermined interval from the first pair of coordinates, the processor is configured to update the first pair of coordinates to the second pair of coordinates.

10 Claims, 48 Drawing Sheets

(56) References Cited

U.S. PATENT DOCUMENTS

| | | | | |
|---|---|---|---|---|
| 2013/0251194 | A1* | 9/2013 | Schamp | G06T 7/11 |
| | | | | 382/199 |
| 2014/0133699 | A1* | 5/2014 | Guan | G06V 20/588 |
| | | | | 382/103 |
| 2016/0188995 | A1* | 6/2016 | Somanath | G06T 7/593 |
| | | | | 382/203 |
| 2016/0196654 | A1* | 7/2016 | Aoki | G06V 20/58 |
| | | | | 382/103 |
| 2017/0371347 | A1* | 12/2017 | Cohen | B60W 30/08 |
| 2018/0336701 | A1* | 11/2018 | Yokota | B60R 21/00 |
| 2019/0102602 | A1* | 4/2019 | Uchida | G08G 1/165 |
| 2022/0383643 | A1* | 12/2022 | Takano | G06T 7/60 |

* cited by examiner

OBJECT DETECTION DEVICE, OBJECT DETECTION SYSTEM, MOBILE OBJECT, AND OBJECT DETECTION METHOD

CROSS REFERENCE TO RELATED APPLICATIONS

The present application claims priority to Japanese Patent Application No. 2019-170901 filed in Japan on Sep. 19, 2019, the entire disclosure of which is incorporated herein by reference.

TECHNICAL FIELD

The present disclosure relates to an object detection device, an object detection system, a mobile object, and an object detection method.

BACKGROUND ART

A recent mobile object such as an automobile has mounted therein an object detection device including a stereo camera. Such an object detection device acquires a plurality of images using the stereo camera, and detects an object that may be an obstacle on the basis of the acquired plurality of images (for example, see PTL 1).

CITATION LIST

Patent Literature

PTL 1: Japanese Unexamined Patent Application Publication No. 5-265547

SUMMARY OF INVENTION

An object detection device according to an embodiment of the present disclosure includes a processor. The processor is configured to search for a pair of coordinates associated with a disparity approximately equal to a target disparity satisfying a predetermined condition in a second direction of a disparity map, update a first pair of coordinates to the found pair of coordinates, and calculate a height of an object corresponding to the target disparity on the basis of the first pair of coordinates. In the disparity map, a disparity acquired from a captured image generated by a stereo camera capturing an image of a road surface is associated with a pair of two-dimensional coordinates formed by the second direction and a first direction corresponding to a horizontal direction of the captured image, the second direction intersecting the first direction. When a second pair of coordinates associated with a disparity approximately equal to the target disparity is present within a predetermined interval from the first pair of coordinates, the processor is configured to update the first pair of coordinates to the second pair of coordinates. When a predetermined number or more of pairs of coordinates associated with a disparity smaller than the target disparity are present between the first pair of coordinates and the second pair of coordinates, the processor is configured not to update the first pair of coordinates to the second pair of coordinates.

An object detection system according to an embodiment of the present disclosure includes a stereo camera that captures a plurality of images having a disparity therebetween, and an object detection device including at least one processor. The processor is configured to search for a pair of coordinates associated with a disparity approximately equal to a target disparity satisfying a predetermined condition in a second direction of a disparity map, update a first pair of coordinates to the found pair of coordinates, and calculate a height of an object corresponding to the target disparity on the basis of the first pair of coordinates. In the disparity map, a disparity acquired from a captured image generated by the stereo camera capturing an image of a road surface is associated with a pair of two-dimensional coordinates formed by the second direction and a first direction corresponding to a horizontal direction of the captured image, the second direction intersecting the first direction. When a second pair of coordinates associated with a disparity approximately equal to the target disparity is present within a predetermined interval from the first pair of coordinates, the processor is configured to update the first pair of coordinates to the second pair of coordinates. When a predetermined number or more of pairs of coordinates associated with a disparity smaller than the target disparity are present between the first pair of coordinates and the second pair of coordinates, the processor is configured not to update the first pair of coordinates to the second pair of coordinates.

A mobile object according to an embodiment of the present disclosure includes an object detection system including a stereo camera that captures a plurality of images having a disparity therebetween, and an object detection device including at least one processor. The processor is configured to search for a pair of coordinates associated with a disparity approximately equal to a target disparity satisfying a predetermined condition in a second direction of a disparity map, update a first pair of coordinates to the found pair of coordinates, and calculate a height of an object corresponding to the target disparity on the basis of the first pair of coordinates. In the disparity map, a disparity acquired from a captured image generated by the stereo camera capturing an image of a road surface is associated with a pair of two-dimensional coordinates formed by the second direction and a first direction corresponding to a horizontal direction of the captured image, the second direction intersecting the first direction. When a second pair of coordinates associated with a disparity approximately equal to the target disparity is present within a predetermined interval from the first pair of coordinates, the processor is configured to update the first pair of coordinates to the second pair of coordinates. When a predetermined number or more of pairs of coordinates associated with a disparity smaller than the target disparity are present between the first pair of coordinates and the second pair of coordinates, the processor is configured not to update the first pair of coordinates to the second pair of coordinates.

An object detection method according to an embodiment of the present disclosure includes calculating a height of an object corresponding to the target disparity on the basis of the first pair of coordinates. The calculating of the height of the object includes searching for a pair of coordinates associated with a disparity approximately equal to a target disparity satisfying a predetermined condition in a second direction of a disparity map, and updating a first pair of coordinates to the found pair of coordinates. In the disparity map, a disparity acquired from a captured image generated by a stereo camera capturing an image of a road surface is associated with a pair of two-dimensional coordinates formed by the second direction and a first direction corresponding to a horizontal direction of the captured image, the second direction intersecting the first direction. The calculating of the height of the object includes, when a second pair of coordinates associated with a disparity approximately equal to the target disparity is present within a predetermined interval from the first pair of coordinates, updating the first pair of coordinates to the second pair of coordinates. The calculating of the height of the object includes, when a predetermined number or more of pairs of coordinates associated with a disparity smaller than the target disparity are present between the first pair of coordinates and the second pair of coordinates, not updating the first pair of coordinates to the second pair of coordinates.

DESCRIPTION OF EMBODIMENTS

Figure 1:
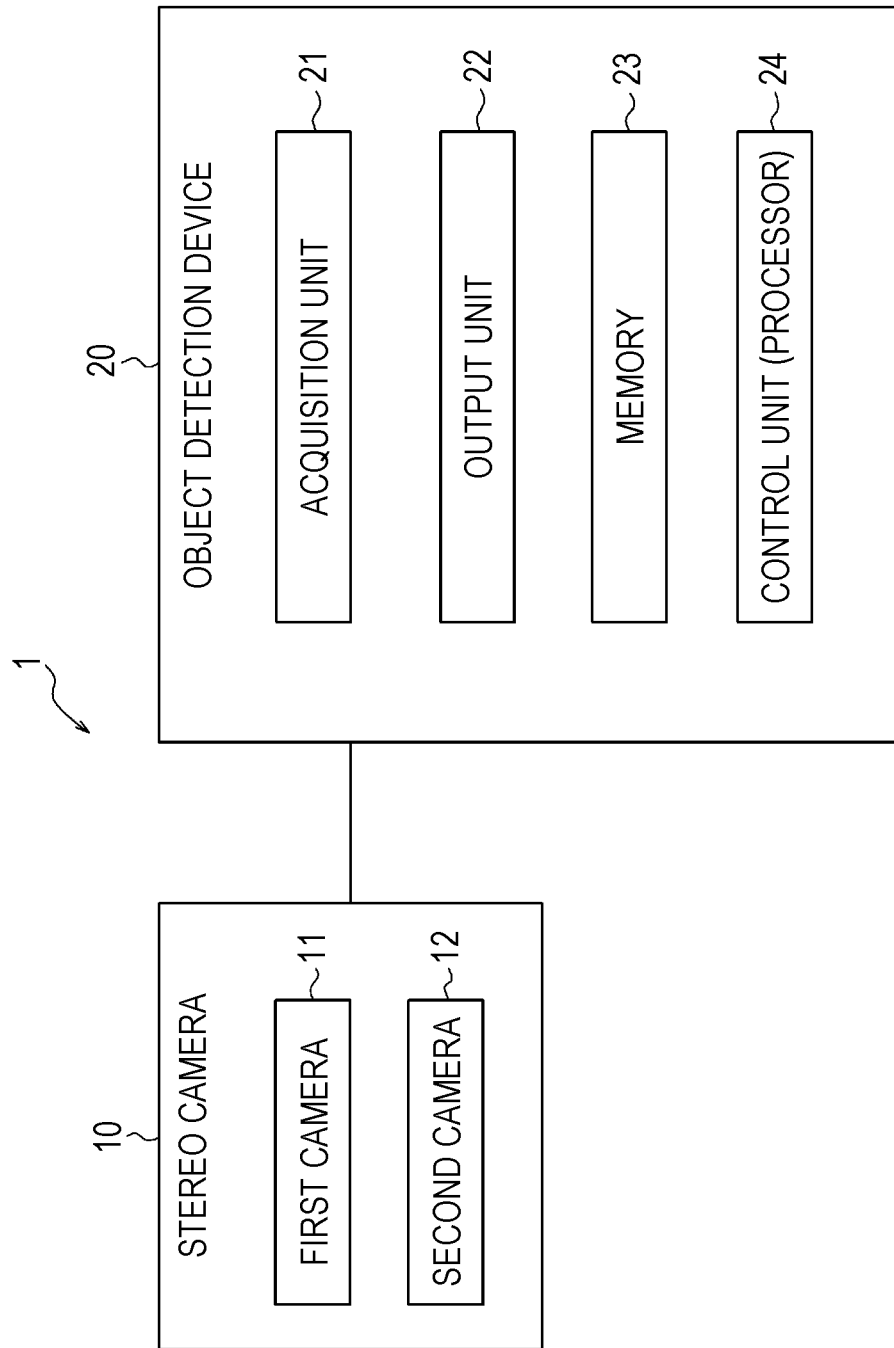
FIG. 1 is a block diagram illustrating a schematic configuration of an object detection system according to an embodiment of the present disclosure.

An object detection device of the related art is required to have improved object detection performance. An object detection device, an object detection system, a mobile object, and an object detection method of the present disclosure can improve the object detection performance.

An embodiment of the present disclosure will be described hereinafter with reference to the drawings. In the following drawings, the same or similar components are denoted by the same reference numerals. The drawings used in the following description are schematic ones. Dimensions, ratios, and the like in the drawings do not necessarily match the actual ones. Figures illustrating images captured by cameras, disparity images, and the like include those prepared for explanation. These images are different from images that are actually captured or processed. In the following description, a "subject" is a target whose image is to be captured by a camera. The "subject" includes an object, a road surface, the sky, and the like. An "object" has a specific position and size in a space. The "object" is also referred to as a "three-dimensional object".

As illustrated in FIG. 1, an object detection system 1 includes a stereo camera 10 and an object detection device 20. The stereo camera 10 and the object detection device 20 are capable of communicating with each other via wired or wireless communication. The stereo camera 10 and the object detection device 20 may communicate with each other via a network. The network may include, for example, a wired or wireless LAN (Local Area Network), a CAN (Controller Area Network), or the like. The stereo camera 10 and the object detection device 20 may be housed in the same housing and configured in an integrated manner. The stereo camera 10 and the object detection device 20 may be located in a mobile object 30 described below and configured to be capable of communicating with an ECU (Electronic Control Unit) in the mobile object 30.

In the present disclosure, a "stereo camera" is a plurality of cameras having parallax and cooperating with each other. The stereo camera includes at least two cameras. The stereo camera is capable of capturing an image of a target from a plurality of directions in cooperation with the plurality of cameras. The stereo camera may be a device having a single housing including a plurality of cameras. The stereo camera may be a device including two or more cameras that are independent of each other and located apart from each other. The stereo camera is not limited to a plurality of cameras independent of each other. In the present disclosure, for example, a camera having an optical mechanism that guides light incident on two separate locations to one light-receiving element can be used as a stereo camera. In the present disclosure, a plurality of images of the same subject captured from different viewpoints may be referred to as a "stereo image".

As illustrated in FIG. 1, the stereo camera 10 includes a first camera 11 and a second camera 12. Each of the first camera 11 and the second camera 12 includes an optical system defining an optical axis OX, and an imaging element. The first camera 11 and the second camera 12 have different optical axes OX. In this embodiment, the optical axes OX of both the first camera 11 and the second camera 12 are collectively represented by single reference sign OX. The imaging element includes a CCD image sensor (Charge-Coupled Device Image Sensor) and a CMOS image sensor (Complementary MOS Image Sensor). The imaging elements of the first camera 11 and the second camera 12 may be present in the same plane that is perpendicular to the optical axes OX of the respective cameras. The first camera 11 and the second camera 12 generate image signals representing images formed by the respective imaging elements. The first camera 11 and the second camera 12 may perform any processing, such as distortion correction, lightness adjustment, contrast adjustment, and gamma correction, on the captured images.

The optical axes OX of the first camera 11 and the second camera 12 are oriented in a direction such that the first camera 11 and the second camera 12 can capture images of the same subject. The optical axes OX and the positions of the first camera 11 and the second camera 12 are determined so that the captured images include at least the same subject. The optical axes OX of the first camera 11 and the second camera 12 are oriented parallel to each other. The term parallel is not limited to exactly parallel, but possible errors caused by assembly and attachment and caused over time may be allowed. The optical axes OX of the first camera 11 and the second camera 12 are not limited to being parallel to each other, and may be oriented in directions different from each other. Even when the optical axes OX of the first camera 11 and the second camera 12 are not parallel to each other, a stereo image can be generated through conversion of the images in the stereo camera 10 or the object detection device 20. The base length is a distance between the optical center of the first camera 11 and the optical center of the second camera 12. The base length corresponds to the distance between the centers of the lenses of the first camera 11 and the second camera 12. The base-length direction is a direction connecting the optical center of the first camera 11 and the optical center of the second camera 12.

The first camera 11 and the second camera 12 are located apart from each other in a direction intersecting the optical axes OX. In one of a plurality of embodiments, the first camera 11 and the second camera 12 are located in the left/right direction. The first camera 11 is located to the left of the second camera 12 when facing forward. The second camera 12 is located to the right of the first camera 11 when facing forward. The first camera 11 and the second camera 12 capture images of a subject at a predetermined frame rate (for example, 30 fps). Due to the difference in position between the first camera 11 and the second camera 12, the corresponding positions of the subject in two images captured by the respective cameras differ. The first camera 11 captures a first image. The second camera 12 captures a second image. The first image and the second image form a stereo image captured from different viewpoints.

Figure 2:
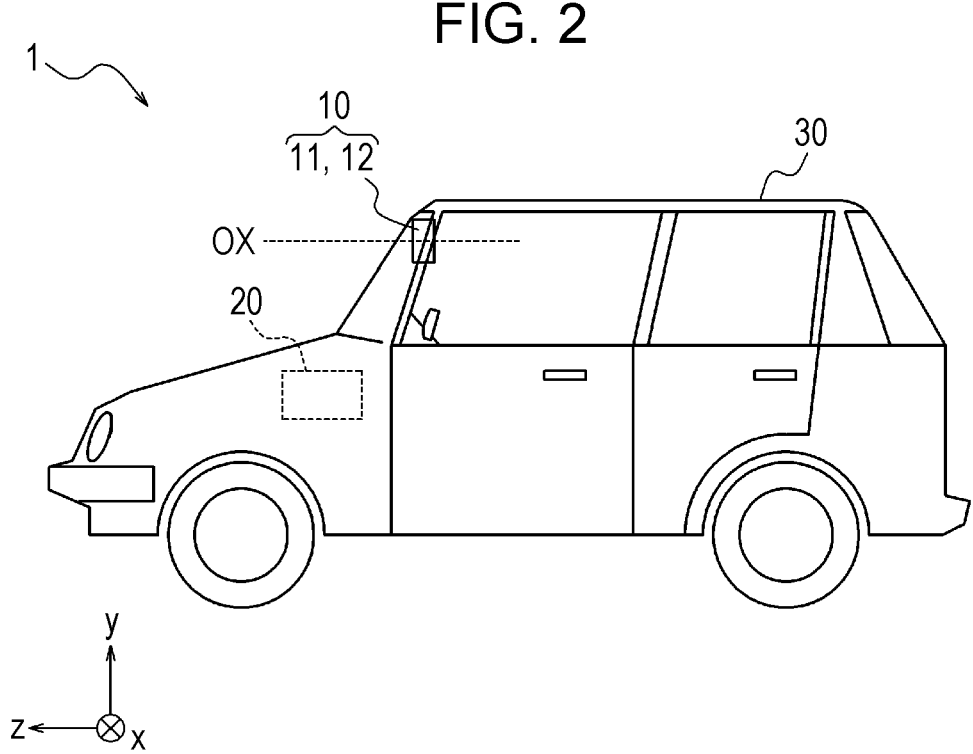
FIG. 2 is a side view schematically illustrating a mobile object having mounted therein the object detection system illustrated in FIG. 1.
Figure 3:
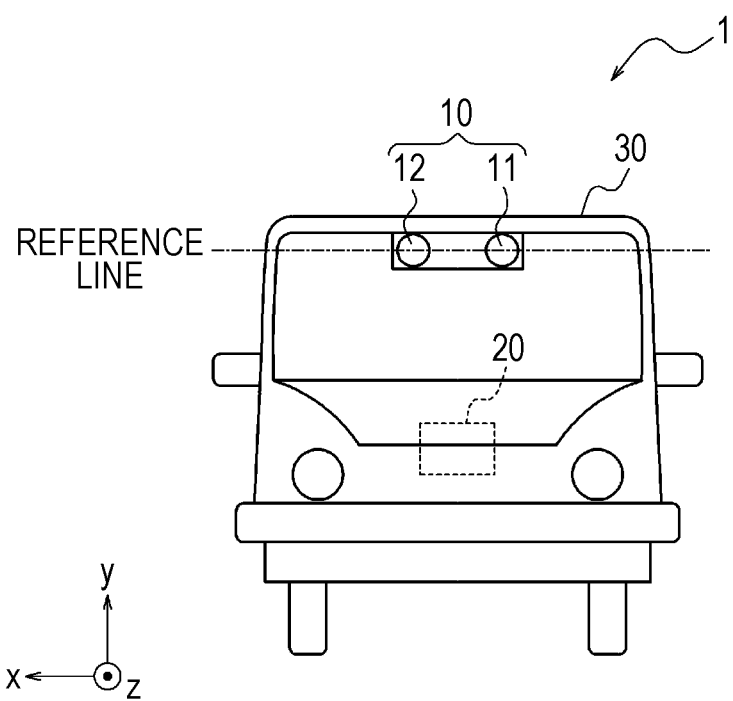
FIG. 3 is a front view schematically illustrating the mobile object having mounted therein the object detection system illustrated in FIG. 1.

As illustrated in FIG. 2 and FIG. 3, the object detection system 1 is mounted in the mobile object 30. As illustrated in FIG. 2, the first camera 11 and the second camera 12 are arranged such that the optical axes OX of the respective optical systems of the first camera 11 and the second camera 12 are substantially parallel to the forward direction of the mobile object 30 to allow the first camera 11 and the second camera 12 to capture images of a scene ahead of the mobile object 30.

The mobile object 30 of the present disclosure travels on a travel path including a road, a runway, or the like. The surface of the travel path on which the mobile object 30 travels is also referred to as a "road surface".

In the present disclosure, the direction of travel of the mobile object 30 when the mobile object 30 is driving straight ahead is also referred to as the "forward direction" or the "positive direction of the z axis". A direction opposite to the forward direction is also referred to as the "backward direction" or the "negative direction of the z axis". The positive direction of the z axis and the negative direction of the z axis are collectively referred to also as the "z direction" unless particularly distinguished. Left and right are defined with respect to the mobile object 30 that faces forward. The z direction is also referred to as the "depth direction".

In the present disclosure, a direction orthogonal to the z direction and pointing from left to right is also referred to as the "positive direction of the x axis". A direction orthogonal to the z direction and pointing from right to left is also referred to as the "negative direction of the x axis". The positive direction of the x axis and the negative direction of the x axis are collectively referred to also as the "x direction" unless particularly distinguished. The x direction may coincide with the base-length direction. The x direction is also referred to as the "horizontal direction".

In the present disclosure, a direction perpendicular to a road surface near the mobile object 30 and pointing upward from the road surface is also referred to as the "height direction" or the "positive direction of the y axis". A direction opposite to the height direction is also referred to as the "negative direction of the y axis". The positive direction of the y axis and the negative direction of the y axis are collectively referred to also as the "y direction" unless particularly distinguished. The y direction may be orthogonal to the x direction and the z direction. The y direction is also referred to as the "vertical direction".

In the present disclosure, a "mobile object" may include a vehicle and an aircraft, for example. The vehicle may include, for example, an automobile, an industrial vehicle, a railroad vehicle, a life vehicle, a fixed-wing aircraft configured to travel on a runway, and the like. The automobile may include, for example, a passenger vehicle, a truck, a bus, a two-wheeled vehicle, a trolleybus, and the like. The industrial vehicle may include, for example, industrial vehicles for agricultural and construction uses and the like. The industrial vehicle may include, for example, a forklift, a golf cart, and the like. The industrial vehicles for agricultural uses may include, for example, a tractor, a cultivator, a transplanter, a binder, a combine harvester, a lawnmower, and the like. The industrial vehicles for construction uses may include, for example, a bulldozer, a scraper, a power shovel, a crane truck, a dump truck, a road roller, and the like. The vehicle may include a human-powered vehicle. The classification of vehicles is not limited to that in the example described above. For example, the automobile may include an industrial vehicle capable of traveling on a road. A plurality of classifications may include the same vehicle. The aircraft may include, for example, a fixed-wing aircraft, a rotary-wing aircraft, and the like.

The first camera 11 and the second camera 12 can be mounted in various locations of the mobile object 30. In one of a plurality of embodiments, the first camera 11 and the second camera 12 are mounted inside the mobile object 30, which is a vehicle, and can capture images of a scene outside the mobile object 30 through the windshield. For example, the first camera 11 and the second camera 12 are arranged ahead of the rearview mirror or on the dashboard. In one of a plurality of embodiments, the first camera 11 and the second camera 12 may be fixed to any of a front bumper, a fender grille, a side fender, a light module, and a hood of the vehicle.

The object detection device 20 can be located in any portion inside the mobile object 30. For example, the object detection device 20 can be located in the dashboard of the mobile object 30. The object detection device 20 acquires the first image and the second image from the stereo camera 10. The object detection device 20 detects an object on the basis of the first image and the second image. The object to be detected by the object detection device 20 may be an object on a road surface when the mobile object 30 is a vehicle. Examples of the object on the road surface include another vehicle and a pedestrian.

The object detection device 20 may be configured to implement processes performed by a control unit 24 described below by reading a program recorded in a non-transitory computer-readable medium. The non-transitory computer-readable medium includes, but is not limited to, a magnetic storage medium, an optical storage medium, a magneto-optical storage medium, and a semiconductor storage medium. The magnetic storage medium includes a magnetic disk, a hard disk, and a magnetic tape. The optical storage medium includes optical disks such as a CD (Compact Disc), a DVD, and a Blu-ray (registered trademark) Disc. The semiconductor storage medium includes a ROM (Read Only Memory), an EEPROM (Electrically Erasable Programmable Read-Only Memory), and a flash memory.

The object detection device 20 includes an acquisition unit 21, an output unit 22, a memory 23, and a control unit 24 (processor).

The acquisition unit 21 is an input interface of the object detection device 20. The acquisition unit 21 is capable of receiving an input of information from the stereo camera 10 and another device. A physical connector and a wireless communication device can be used as the acquisition unit 21. The physical connector includes an electric connector supporting transmission via electrical signals, an optical connector supporting transmission via optical signals, and an electromagnetic connector supporting transmission via electromagnetic waves. The electric connector includes a connector conforming to IEC 60603, a connector conforming to the USB standard, a connector supporting an RCA terminal, a connector supporting an S terminal specified by EIAJ CP-1211A, a connector supporting a D terminal specified by EIAJ RC-5237, a connector conforming to the HDMI (registered trademark) standard, and a connector supporting a coaxial cable including a BNC connector. The optical connector includes various connectors conforming to IEC 61754. The wireless communication device includes wireless communication devices conforming to standards including Bluetooth (registered trademark) and IEEE 802.11. The wireless communication device includes at least one antenna.

Image data of images captured by the first camera 11 and the second camera 12 can be input to the acquisition unit 21. The acquisition unit 21 outputs the input image data to the control unit 24. The acquisition unit 21 may support the transmission method of an imaging signal of the stereo camera 10. The acquisition unit 21 may be connected to an output interface of the stereo camera 10 via a network.

The output unit 22 is an output interface of the object detection device 20. The output unit 22 can output a processing result of the object detection device 20 to other devices inside the mobile object 30 or to other devices outside the mobile object 30. The other devices inside the mobile object 30 may include travel assistance devices such as an automatic cruise control, and safety devices such as an automatic braking device. The other devices outside the mobile object 30 may include another vehicle, a road measurer, and the like. The other devices inside the mobile object 30 or the other devices outside the mobile object 30 can appropriately use information received from the object detection device 20. The output unit 22 may include various interfaces supporting wired and wireless communication in a manner that is the same as or similar to that of the acquisition unit 21. For example, the output unit 22 may have a CAN interface. In this case, the output unit 22 communicates with other devices inside the mobile object 30.

The memory 23 stores programs for various processes and information being subjected to arithmetic operation. The memory 23 includes a volatile memory and a non-volatile memory. The memory 23 includes a memory independent of the processor, and an internal memory of the processor.

The control unit 24 includes one or more processors. The processors include a general-purpose processor that reads a specific program and executes a specific function, and a dedicated processor specific to a specific process. The dedicated processor includes an application specific IC (ASIC; Application Specific Integrated Circuit). The processor includes a programmable logic device (PLD). The PLD includes an FPGA (Field-Programmable Gate Array). The control unit 24 may be either a SoC (System-on-a-Chip) or a SiP (System In a Package) with which the one or more processors cooperate. A process to be executed by the control unit 24 can be translated to a process to be executed by a processor.

The control unit 24 executes various processes on a first disparity map in information processing performed in the object detection device 20. The first disparity map is obtained by mapping disparities to two-dimensional coordinates. The two-dimensional coordinates on the first disparity map are formed by a transverse direction corresponding to the horizontal direction of an image captured by the stereo camera 10, and a longitudinal direction intersecting the transverse direction. The transverse direction is a first direction. The longitudinal direction is a second direction. The transverse direction and the longitudinal direction may be orthogonal to each other. The transverse direction can correspond to a width direction of the road surface. When the image captured by the stereo camera 10 includes the horizon, the transverse direction can correspond to a direction parallel to the horizon. The longitudinal direction may correspond to a direction in which gravity is applied in the real space.

In the information processing performed in the object detection device 20, the first disparity map undergoes various operations. The various operations include arithmetic processing, writing information to the memory 23, reading information from the memory 23, and the like. An image of the first disparity map is also referred to as a "first disparity image". The first disparity image is an image in which pixels representing disparity are arranged on a two-dimensional plane formed by the transverse direction and the longitudinal direction. Hereinafter, a description will be given assuming that the control unit 24 executes various processes on the first disparity image. In the following description, a process to be performed on the first disparity image can be translated to a process to be performed on the first disparity map.

Figure 4:
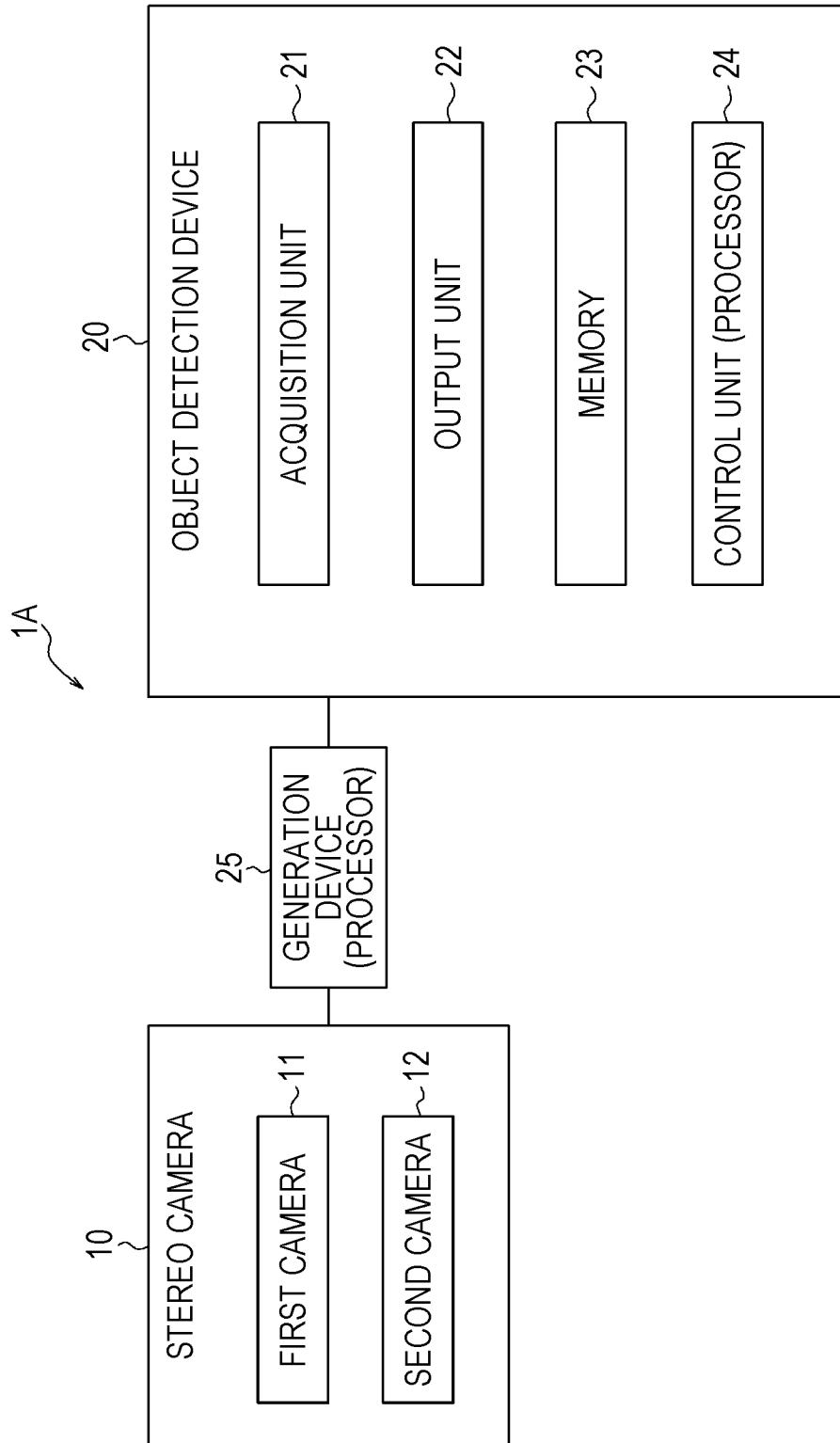
FIG. 4 is a block diagram illustrating a schematic configuration of an object detection system according to another embodiment of the present disclosure.

The configuration of the object detection system 1 of the present disclosure is not limited to the configuration illustrated in FIG. 1. FIG. 4 illustrates an object detection system 1A according to another embodiment of the present disclosure. The object detection system 1A includes the stereo camera 10, the object detection device 20, and a generation device 25. The generation device 25 may be mounted in hardware separate from the object detection device 20. The generation device 25 generates a first disparity image on the basis of the first image and the second image output from the stereo camera 10. The generation device 25 has a processor. The processor of the generation device 25 generates a first disparity image on the basis of the first image and the second image output from the first camera 11 and the second camera 12 of the stereo camera 10, respectively. The acquisition unit 21 acquires the first disparity image from the generation device 25. The object detection device 20 and the generation device 25 may be collectively identified as a single object detection device.

Figure 5:
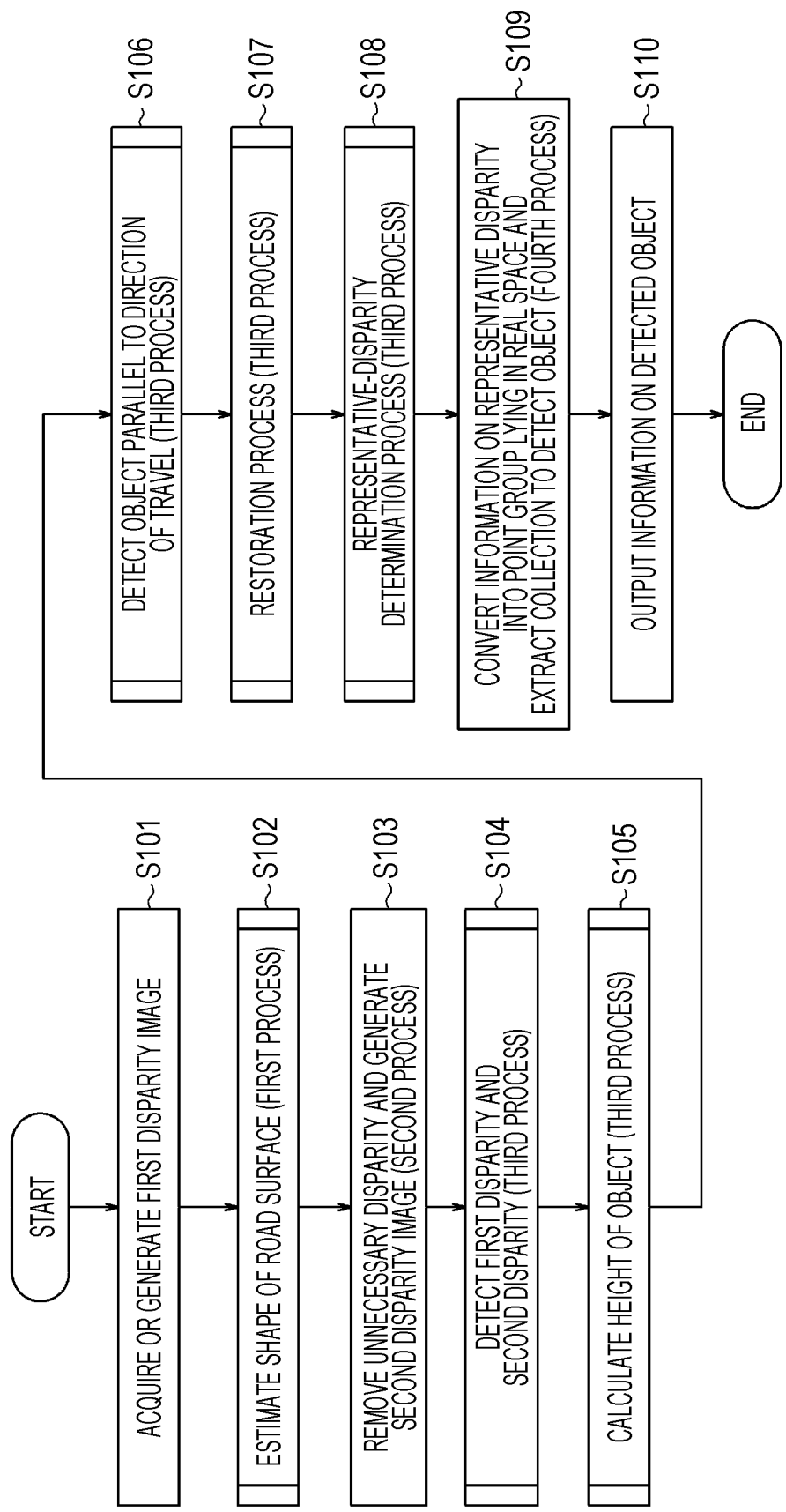
FIG. 5 is a flowchart illustrating an example of a process flow executed by the object detection device illustrated in FIG. 1.

A process executed by the control unit 24 will be described hereinafter with reference to a flowchart illustrated in FIG. 5. FIG. 5 is a flowchart illustrating an example of the overall flow of a process executed by the object detection device 20 illustrated in FIG. 1.

Prior to the detailed description of processing performed in each of the steps of the flowchart in FIG. 5, a brief description of the overview and purpose of the processing of each of the steps will be given first.

Step S101 is a step of acquiring or generating a first disparity image. Step S101 corresponds to pre-processing of a first process described below. In the configuration illustrated in FIG. 1, the control unit 24 generates the first disparity image. In the configuration illustrated in FIG. 4, the control unit 24 causes the acquisition unit 21 to acquire the first disparity image generated by the generation device 25.

Step S102 is a step of estimating the shape of the road surface. The process executed in step S102 is also referred to as a "first process". Since the shape of the road surface is estimated, a disparity corresponding to the road surface with respect to the coordinate in the longitudinal direction can be estimated in the first disparity image. The shape of the road surface can be used to remove an unnecessary disparity in the subsequent processing and/or estimate the height position of the road surface in the real space.

Step S103 is a step of removing an unnecessary disparity from the first disparity image to generate a second disparity image. The process executed in step S103 is also referred to as a "second process". The unnecessary disparity includes a disparity corresponding to a lane line on the road surface, a disparity corresponding to a structure above the road, and the like that can be included in the first disparity image. Removing the unnecessary disparity from the first disparity image makes it less likely that the object detection device 20 erroneously detects a lane line on the road surface, a structure above the road surface, and the like as objects to be detected on the road surface. This can increase the accuracy with which the object detection device 20 detects an object.

Step S103 can be a step of removing an unnecessary disparity from the first disparity map to generate a second disparity map in the information processing performed in the object detection device 20. The second disparity image described above is an image of the second disparity map. In the following description, a process to be performed on the second disparity image can be translated to a process to be performed on the second disparity map.

Step S104 is a step of detecting the first disparity and the second disparity on the basis of the second disparity image. The first disparity is identified and detected as a disparity corresponding to an object to be detected. The second disparity is detected as a candidate disparity corresponding to the object to be detected. It can be determined whether the second disparity is to be restored as a disparity corresponding to the object to be detected in a restoration process described below.

Step S105 is a step of calculating the height of the object in the image. The height of the detected object in the image can be the height of a detection frame 182 illustrated in FIG. 51 described below. The height of the object in the image is also referred to as the "height of the detection frame". The process executed in step S105 is also referred to as a "height calculation process".

Step S106 is a step of detecting a disparity corresponding to an object parallel to the direction of travel of the mobile object 30 in the second disparity image. The object parallel to the direction of travel of the mobile object 30 is also referred to as a "parallel object". Examples of the parallel object include structures alongside the road, such as a guardrail and a sound-insulating wall of an expressway, and a side surface of another vehicle. The parallel object, such as a guardrail, and the object to be detected, such as another vehicle, may be close to each other in the second disparity image, for example. Detecting a parallel object and, for example, assigning a flag to the detected parallel object make it less likely that the object detection device 20 erroneously detects the parallel object as an object to be detected on the road surface. This configuration can increase the accuracy with which the object detection device 20 detects an object. The process executed in step S106 is also referred to as a "parallel-object detection process".

Step S107 is a step of determining whether to restore the second disparity as a disparity corresponding to the object to be detected.

Step S108 is a step of determining a representative disparity at each coordinate in the transverse direction on the second disparity image among the first disparity and the restored second disparity. The process executed in step S108 is also referred to as a "third process". The process executed in steps S104 to S108 is also referred to as the "third process".

Step S109 is a step of converting information on the representative disparities into coordinates in the real space and extracting a collection (group) of representative disparities to detect an object. The process executed in step S109 is also referred to as a "fourth process". In step S109, information on the position of the object to be detected and the width of the object viewed from the stereo camera 10 side is obtained.

Step S110 is a step of outputting information on the detected object from the output unit 22. The information on the object output in step S110 can include information on the height of the object in the image, which is calculated in step S105, the position of the object to be detected, which is detected in step S109, the width of the object viewed from the stereo camera 10 side, which is detected in step S109, and the like. The information described above can be provided to other devices inside the mobile object 30.

Next, each of the steps will be described in detail.

In the processing of step S101, the control unit 24 acquires or generates a first disparity image. In the object detection system 1 illustrated in FIG. 1, the control unit 24 generates the first disparity image on the basis of the first image and the second image acquired by the acquisition unit 21. In the object detection system 1A illustrated in FIG. 4, the control unit 24 causes the acquisition unit 21 to acquire the first disparity image generated by the generation device 25. The control unit 24 may store the first disparity image in the memory 23 for subsequent processing.

A method for generating the first disparity image is known and will be briefly described hereinafter. In the following, it is assumed that the control unit 24 generates the first disparity image.

The control unit 24 acquires a first image captured by the first camera 11 and a second image captured by the second camera 12. The control unit 24 divides one of the first image and the second image (for example, the first image) into a large number of small areas. The small areas may be each a rectangular area in which a plurality of pixels are arranged in the longitudinal direction and the transverse direction. For example, each of the small areas may be constituted by three pixels arranged in the longitudinal direction and three pixels arranged in the transverse direction. However, in each of small area, the number of pixels arranged in the longitudinal direction and the number of pixels arranged in the transverse direction are not limited to three. Further, the numbers of pixels in the longitudinal direction and the transverse direction of each small area may be different. The control unit 24 performs matching by comparing features while shifting each of the pixels in the plurality of small areas obtained as a result of the division by one pixel in the transverse direction in the other image. For example, in a case where the first image is divided into small areas, the control unit 24 compares features while shifting the small areas of the first image by one pixel in the transverse direction on the second image to perform matching. The features are, for example, a luminance and color pattern. One known method for stereo image matching is a method using a SAD (Sum of Absolute Differences) function. This represents the sum of the absolute values of differences between corresponding luminance values in each small area. When the SAD function is the minimum, it is determined that both images are most similar. The method for stereo image matching is not limited to the method using the SAD function. Any other method may be adopted for stereo image matching.

The control unit 24 calculates a disparity for each small area on the basis of a difference in the positions of pixels in the transverse direction between two areas of the first image and the second image on which matching is performed. A disparity can be a difference between a position of the same subject in the first image and a corresponding position thereof in the second image. The magnitude of the disparity can be expressed in units of pixel width in the transverse direction on a stereo image. The magnitude of the disparity can be calculated with accuracy smaller than one pixel through interpolation processing. The magnitude of the disparity corresponds to the distance between the subject whose image is captured by the stereo camera 10 and the stereo camera 10 in the real space. As the distance from the stereo camera 10 to the subject in the real space decreases, the disparity corresponding to the subject increases. As the distance from the stereo camera 10 to the subject in the real space increases, the disparity corresponding to the subject decreases.

The control unit 24 generates a first disparity image indicating a distribution of the calculated disparities. Pixels representing the disparities forming the first disparity image are also referred to as "disparity pixels". The control unit 24 may generate the first disparity image with the same definition as that of the pixels of the original first and second images.

Figure 6:
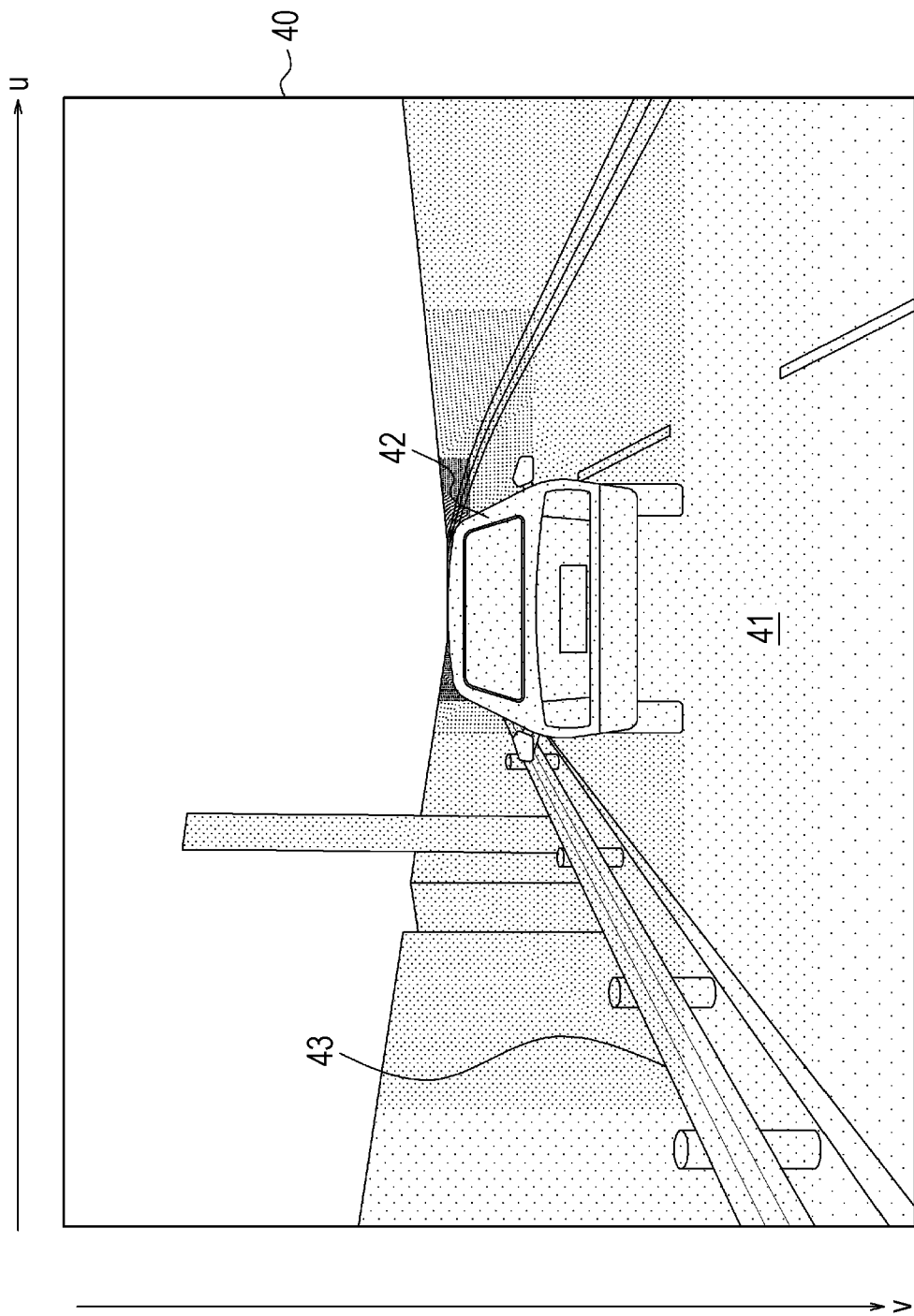
FIG. 6 is a diagram describing an example of a first disparity image acquired or generated by the object detection device.

FIG. 6 illustrates a first disparity image 40. The first disparity image 40 is a two-dimensional plane formed by a transverse direction (first direction) of the stereo camera 10 and a longitudinal direction (second direction) orthogonal to the transverse direction. The two-dimensional plane of the first disparity image 40 has arranged thereon disparity pixels representing disparities. The transverse direction is also referred to as the "u direction". The longitudinal direction is also referred to as the "v direction". The coordinate system formed by the u direction and the v direction is also referred to as the "uv coordinate system" and the "image coordinate system". In this embodiment, the upper left corner of each figure is the origin (0, 0) of the uv coordinate system. A direction pointing from left to right of each figure is the positive direction of the u axis, and a direction opposite to this direction is the negative direction of the u axis. A direction pointing from top to bottom of each figure is the positive direction of the v axis, and a direction opposite to this direction is the negative direction of the v axis. The negative direction of the v axis corresponds to a direction pointing upward from the road surface in the real space. The u coordinate and the v coordinate can be expressed in units of disparity pixels.

As illustrated in FIG. 6, the first disparity image 40 includes a disparity image 41, a disparity image 42, and a disparity image 43. The disparity image 41 corresponds to the road surface ahead of the mobile object 30. The disparity image 42 corresponds to another vehicle ahead of the mobile object 30. The disparity image 43 is a disparity image corresponding to a guardrail.

The control unit 24 may display disparity information included in each pixel of the first disparity image by luminance, color, or the like of the pixel. In the first disparity image 40 illustrated in FIG. 6, for convenience of illustration, the disparities of the pixels are displayed by different types of shading. In the first disparity image 40, the darker the shading of an area is, the smaller the disparities represented by the pixels in the area are. The lighter the shading of an area is, the larger the disparities represented by the pixels in the area are. In the first disparity image 40, the pixels in equally shaded areas represent disparities within a predetermined range. In the actual first disparity image, the pixels in some areas have fewer features in the stereo image than the pixels in the other areas in the matching process described above for calculating disparities, and the disparities thereof may thus be difficult to calculate. For example, in a portion of a subject that is spatially uniform, such as a window of the vehicle, and a portion that is overexposed due to the reflection of sunlight, disparities are difficult to calculate. In the first disparity image, when disparities corresponding to an object and a structure are present, the disparities can be displayed with different luminance or in different color from a disparity corresponding to a more distant background.

The control unit 24 does not need to display the first disparity image as an image after calculating the disparities. That is, the control unit 24 is only required to hold the first disparity map from which the first disparity image is generated, and execute appropriate processing on the first disparity map.

Figure 14:
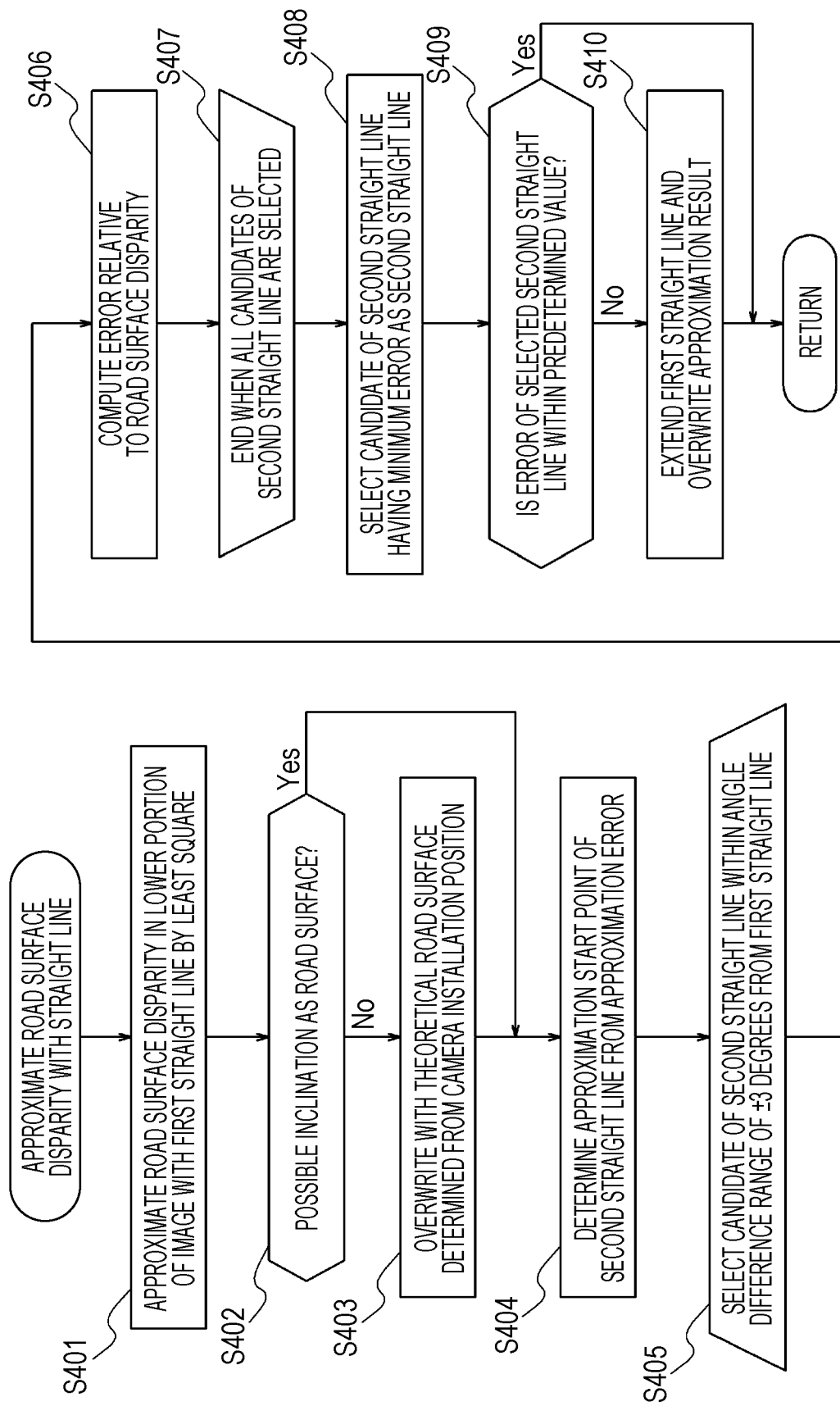
FIG. 14 is a flowchart of a process for approximating a relationship between the road surface disparity $d_r$ and the coordinate in the longitudinal direction (v coordinate) of an image with straight lines.

After executing step S101, the control unit 24 performs the first process of estimating the shape of the road surface from the first disparity image (step S102). The process for estimating the shape of the road surface, which is executed by the control unit 24, will be described hereinafter with reference to flowcharts in FIG. 7, FIG. 8, and FIG. 14. First, the control unit 24 extracts candidate road surface disparities $d_c$ from the first disparity image (step S201). The candidate road surface disparities $d_c$ are possible disparities corresponding to road surface disparities $d_r$ collected from the first disparity image. The road surface disparities $d_r$ refer to disparities of a road surface area. The road surface disparities $d_r$ do not include a disparity of an object on the road surface. The road surface disparities $d_r$ represent distances to corresponding portions on the road surface. The road surface disparities $d_r$ are collected as having close values at positions having the same v coordinate.

Figure 8:
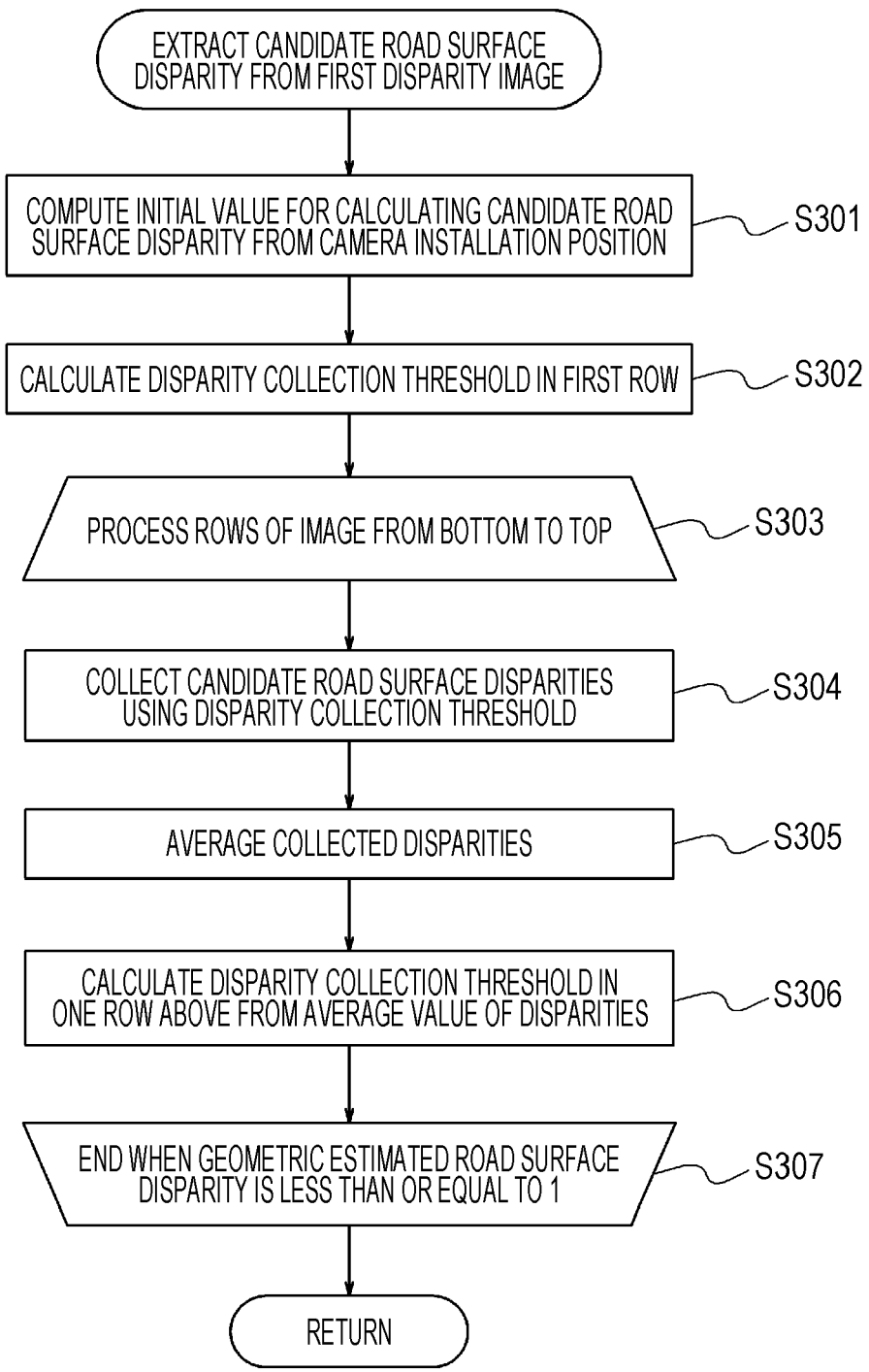
FIG. 8 is a flowchart illustrating an example of a process for extracting candidate road surface disparities from a first disparity image.

The details of the process for extracting the candidate road surface disparities $d_c$ are illustrated in the flowchart in FIG. 8. As illustrated in FIG. 8, the control unit 24 computes, based on the installation position of the stereo camera 10, a candidate-road-surface-disparity initial value do that is an initial value of a disparity for calculating a candidate road surface disparity (step S301). The candidate-road-surface-disparity initial value do is an initial value of a candidate road surface disparity at the extraction position of the candidate road surface disparity closest to the stereo camera 10. The extraction position of the candidate road surface disparity closest to the stereo camera 10 can be set from within, for example, a range from 1 m to 10 m from the stereo camera 10.

Figure 9:
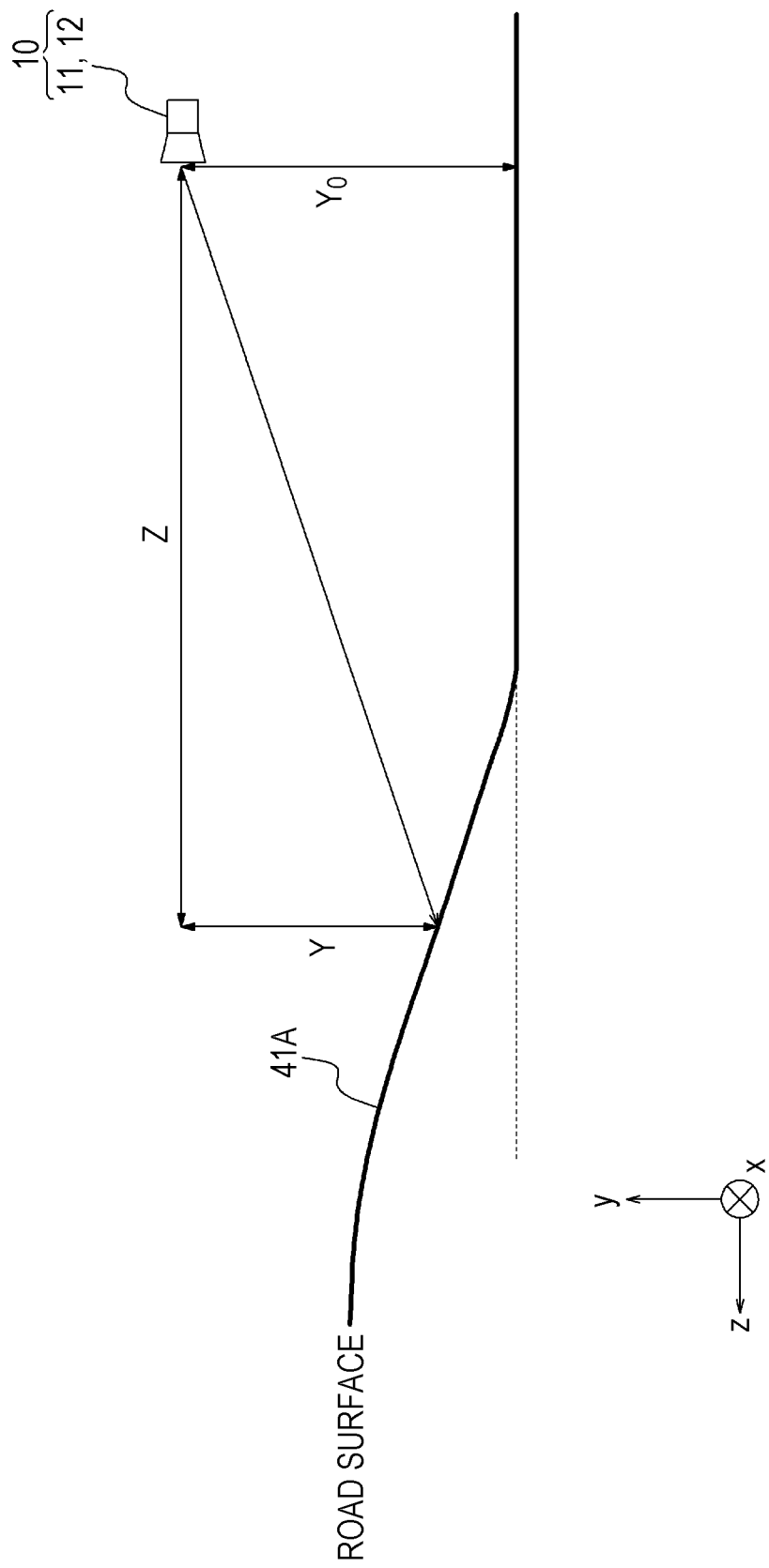
FIG. 9 is a diagram describing a positional relationship between the road surface and a stereo camera.

As illustrated in FIG. 9, a road surface height Y relative to the stereo camera 10 is the height of the stereo camera 10 in the vertical direction from a road surface 41A whose image is to be captured. A road surface height $Y_0$ is the height of the installation position of the stereo camera 10 from the road surface 41A. Due to undulations of the road, the road surface height Y may change depending on the distance from the stereo camera 10. Accordingly, the road surface height Y at a position away from the stereo camera 10 does not match the road surface height $Y_0$ at the installation position of the stereo camera 10. In one of a plurality of embodiments, the first camera 11 and the second camera 12 of the stereo camera 10 are assumed to be installed such that the first camera 11 and the second camera 12 face forward with the optical axes OX thereof parallel to each other. In FIG. 9, a distance Z indicates a distance to a specific road surface position in the horizontal direction. The base length of the stereo camera 10 is denoted by B, and the image size in the longitudinal direction is denoted by TOTALv. In this case, a relationship between a road surface disparity $d_s$ and the road surface height Y of the road surface 41A in a captured image at a certain longitudinal coordinate (v coordinate) is given by the following equation.

$$d_s = B/Y \times (v - \text{TOTAL}v/2) \tag{1}$$

The road surface disparity $d_s$ calculated by Equation (1) is also referred to as a "geometric estimated road surface disparity". In the following, the geometric estimated road surface disparity may be denoted by reference sign $d_s$.

The candidate-road-surface-disparity initial value do is calculated on the assumption that the road surface 41A is flat and parallel to the optical axes OX of the first camera 11 and the second camera 12 between the stereo camera 10 and the extraction position of the candidate road surface disparity $d_c$ closest to the position of the stereo camera 10. In this case, the v coordinate of the extraction position of the candidate road surface disparity closest to the position of the stereo camera 10 in the first disparity image is determined to be a specific coordinate ($v_0$). The coordinate ($v_0$) is an initial value of the v coordinate at which a candidate road surface disparity is extracted. The coordinate ($v_0$) is located between TOTALv/2 and TOTALv. The coordinate ($v_0$) is located on the lowest side (the side on which the v coordinate is large) within the image coordinate range over which disparities can be calculated. The coordinate ($v_0$) may be set to TOTALv, which corresponds to the lowermost row of the first disparity image. The candidate-road-surface-disparity initial value do can be determined by substituting $v_0$ into v and substituting $Y_0$ into Y in Equation (1).

The control unit 24 computes, based on the candidate-road-surface-disparity initial value $d_0$, a disparity collection threshold in the first row whose v coordinate in the longitudinal direction is the coordinate ($v_0$) (step S302). A row refers to an array of pixels arranged in the transverse direction and having the same v coordinate in the first disparity image. The disparity collection threshold includes an upper-limit threshold that is the upper limit of threshold for collecting disparities, and a lower-limit threshold that is the lower limit of threshold for collecting disparities. The disparity collection threshold is set above and below the candidate-road-surface-disparity initial value do under a predetermined rule so as to include the candidate-road-surface-disparity initial value $d_0$. Specifically, road surface disparities obtained when the road surface height Y changes up and down by a predetermined amount of change in road surface height $\Delta Y$ from a state in which the candidate-road-surface-disparity initial value do is calculated are determined as the upper-limit threshold and the lower-limit threshold of the disparity collection threshold, respectively. That is, the lower-limit threshold of the disparity collection threshold is obtained by subtracting the disparity corresponding to the amount of change in road surface height $\Delta Y$ from the candidate-road-surface-disparity initial value $d_0$. The upper-limit threshold of the disparity collection threshold is obtained by adding the disparity corresponding to the amount of change in road surface height $\Delta Y$ to the candidate-road-surface-disparity initial value $d_0$. The lower-limit threshold and the upper-limit threshold of a specific disparity collection threshold are determined by changing the value of Y in Equation (1).

Subsequently, the control unit 24 repeatedly executes the processing of steps S303 to S307. First, the control unit 24 performs processing on the lowermost row of the first disparity image whose v coordinate is the coordinate ($v_0$) (step S303).

The control unit 24 collects disparities by using the disparity collection threshold (step S304). The control unit 24 collects, as the candidate road surface disparities $d_c$, among disparity pixels having the coordinate ($v_0$) as the v coordinate that are included in the first disparity image and that are arranged side by side in the transverse direction, disparity pixels having disparities between the lower-limit threshold and the upper-limit threshold of the disparity collection threshold. That is, the control unit 24 determines that disparity pixels having disparities falling within a predetermined margin range relative to the candidate-road-surface-disparity initial value $d_0$ calculated using Equation (1) are candidates of a disparity pixel representing a correct disparity of the road surface 41A. The control unit 24 sets, as the candidate road surface disparities $d_c$, the disparities of the disparity pixels determined to be candidates of a disparity pixel representing a correct disparity of the road surface 41A. This configuration can make it less likely that the control unit 24 erroneously determines a disparity other than that corresponding to the road surface 41A, such as of an object and a structure on the road surface 41A, as the disparity corresponding to the road surface 41A. Thus, the detection accuracy of the road surface 41A is improved.

When the determination of all of the disparity pixels having the coordinate ($v_0$) as the v coordinate is completed in the processing of step S304, the control unit 24 averages the collected candidate road surface disparities $d_c$ to calculate an average candidate road surface disparity $d_{av}$ that is an average value of the candidate road surface disparities $d_c$ (step S305). The control unit 24 may store the candidate road surface disparities $d_c$, the u-v coordinates thereof, and the average candidate road surface disparity day at the coordinate ($v_0$) as the v coordinate in the memory 23.

After executing the processing of step S305, the control unit 24 executes the processing of step S306. In the processing of step S306, the control unit 24 calculates a disparity collection threshold for disparity pixels in a row one row above, that is, disparity pixels in a row whose v coordinate is the coordinate ($v_0$–1), from the average candidate road surface disparity day at the coordinate ($v_0$) as the v coordinate, which is calculated in the processing of step S305. The control unit 24 changes the road surface height Y so that Equation (1) is satisfied for the average candidate road surface disparity day at the coordinate ($v_0$) as the v coordinate, which is calculated in the processing of step S305. The control unit 24 substitutes $v_0$–1, instead of $v_0$, into Equation (1) in which the road surface height Y is changed to calculate a geometric estimated road surface disparity $d_s$ at the coordinate ($v_0$–1) as the v coordinate. The control unit 24 can set, as the lower-limit threshold of the disparity collection threshold, a disparity obtained by subtracting the disparity corresponding to the predetermined amount of change in road surface height $\Delta Y$ from the geometric estimated road surface disparity $d_s$ in a manner similar to that in the processing of step S302. The control unit 24 can set, as the upper-limit threshold of the disparity collection threshold, a disparity obtained by adding the disparity corresponding to the predetermined amount of change in road surface height $\Delta Y$ to the geometric estimated road surface disparity $d_s$.

Figure 10:
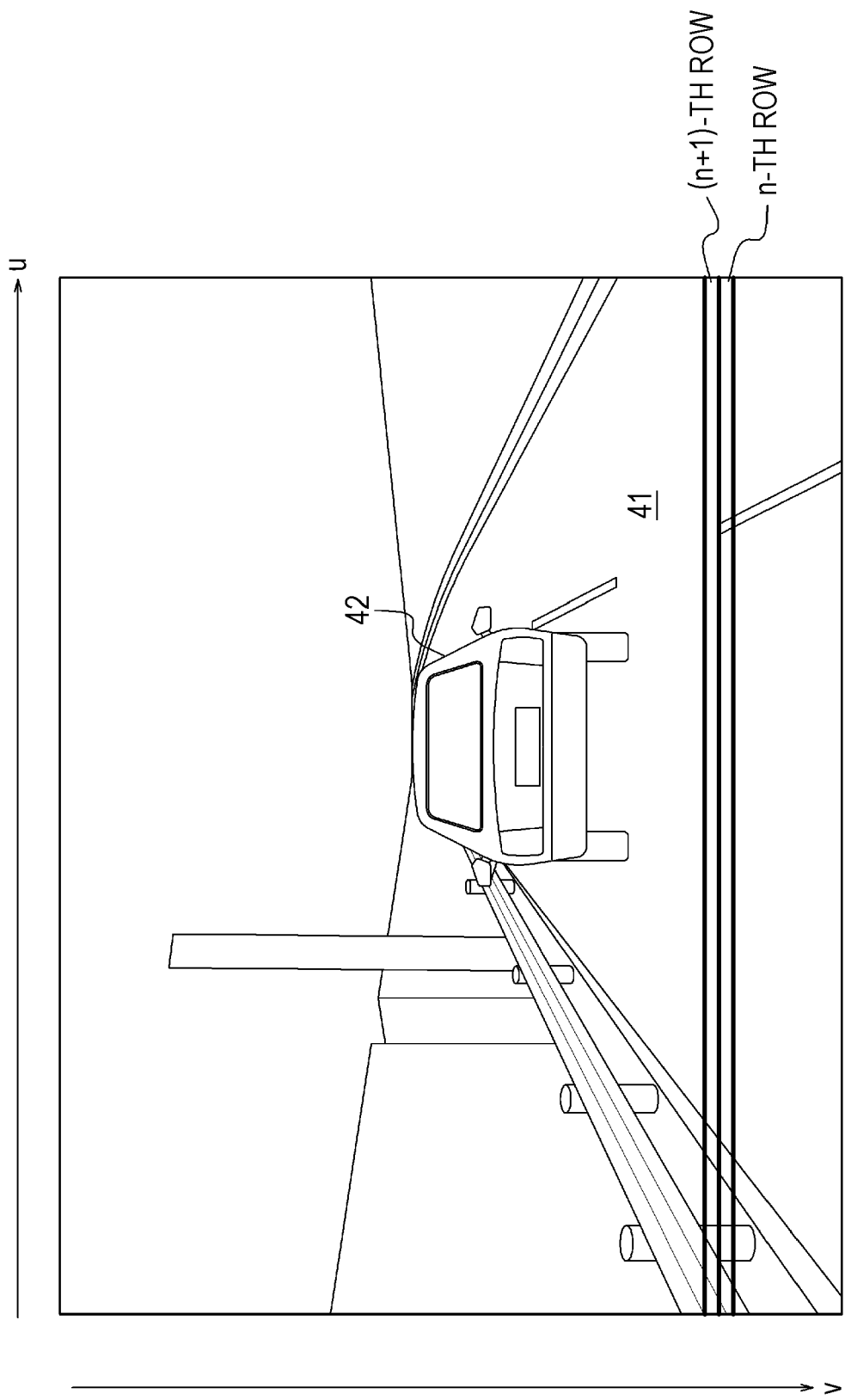
FIG. 10 is a diagram describing a procedure for extracting candidate road surface disparities.

After executing the processing of step S306, the control unit 24 determines whether the geometric estimated road surface disparity $d_s$ calculated by Equation (1) is larger than a predetermined value. The predetermined value is, for example, one pixel. If the geometric estimated road surface disparity $d_s$ is larger than 1, the control unit 24 returns to the processing of step S303 (step S307). In the processing of step S303, the control unit 24 moves the extraction target of the candidate road surface disparities $d_c$ to a row one pixel above. That is, when the extraction target of the candidate road surface disparities $d_c$ is a row whose v coordinate is the coordinate ($v_0$), the control unit 24 changes the v coordinate of the row to be subjected to road surface detection to the coordinate ($v_0$–1). As illustrated in FIG. 10, when the candidate road surface disparities $d_c$ are to be calculated in the n-th row, the control unit 24 changes the row to be subjected to road surface detection to the (n+1)-th row. In FIG. 10, the width of each row in the longitudinal direction is increased for convenience of illustration. In actuality, each row is one pixel high. In this case, the v coordinate of the (n+1)-th row is smaller than the v coordinate of the n-th row by 1.

The processing of steps S304 to S306 to be performed on the (n+1)-th row is performed in a manner that is the same as or similar to that in the processing to be performed on the row whose v coordinate is the coordinate ($v_0$). In the processing of step S304, the control unit 24 collects the candidate road surface disparities $d_c$ by using the disparity collection threshold calculated in the processing of step S306 for the n-th row. In the processing of step S305, the control unit 24 averages the collected candidate road surface disparities $d_c$ to calculate the average candidate road surface disparity $d_{av}$. In the processing of step S306, the control unit 24 changes the road surface height Y in Equation (1) by using the average candidate road surface disparity $d_{av}$. The control unit 24 calculates the geometric estimated road surface disparity $d_s$ by using Equation (1) in which the road surface height Y is changed. Further, to extract the candidate road surface disparities $d_c$ in the (n+2)-th row, the control unit 24 calculates a disparity collection threshold in consideration of the amount of change in road surface height $\Delta Y$ for the geometric estimated road surface disparity $d_s$.

The control unit 24 extracts, while sequentially shifting the extraction target of the candidate road surface disparities $d_c$ upward (in the negative direction of the v coordinate) from the row corresponding to the extraction position of the candidate road surface disparity $d_c$ closest to the stereo camera 10, the candidate road surface disparities $d_c$ corresponding to the v coordinate. The control unit 24 may store the extracted candidate road surface disparities $d_c$ in the memory 23 together with the corresponding u coordinate and v coordinate and the average candidate road surface disparity $d_{av}$ corresponding to the v coordinate.

Figure 7:
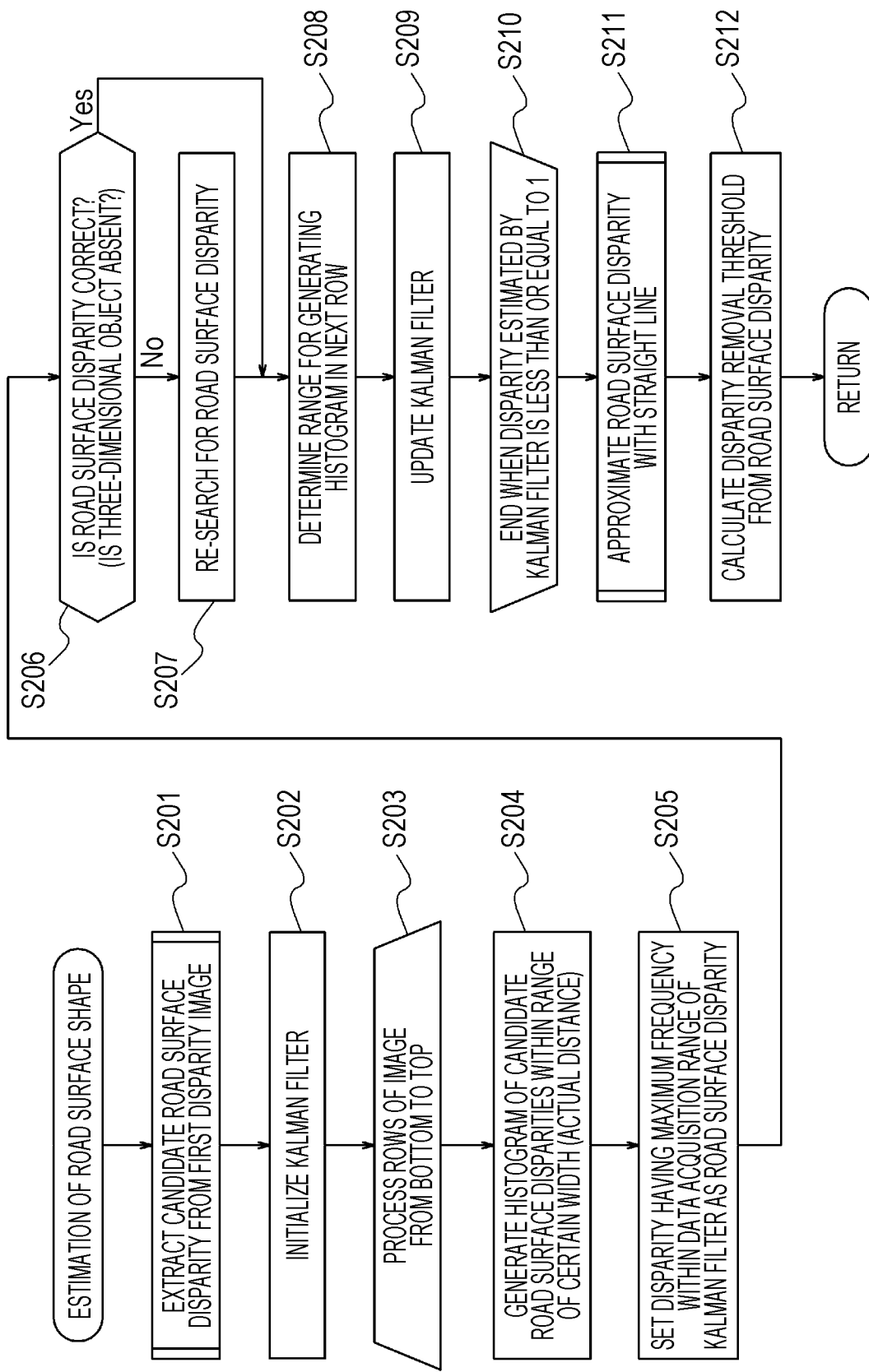
FIG. 7 is a flowchart illustrating an example of a process for estimating the shape of a road surface.

If the geometric estimated road surface disparity $d_s$ calculated by Equation (1) is less than or equal to the predetermined value described above in the processing of step S307, the control unit 24 ends the process of extracting the candidate road surface disparities $d_c$, and then returns to the processing of step S201 of the flowchart in FIG. 7. The predetermined value can be, for example, one pixel.

As described above, in the flowchart in FIG. 8, the initial value of the v coordinate for extracting the candidate road surface disparities $d_c$ is set to $v_0$ corresponding to the position on the short-distance side as viewed from the stereo camera 10, and the candidate road surface disparities $d_c$ on the long-distance side are sequentially extracted. The stereo camera 10 typically has higher accuracy of detection of disparity on the short-distance side than on the long-distance side. For this reason, sequentially extracting the candidate road surface disparities $d_c$ from the short-distance side to the long-distance side can increase the accuracy of the candidate road surface disparities $d_c$ to be detected.

In the flowchart in FIG. 8 for extracting the candidate road surface disparities $d_c$ described above, the candidate road surface disparities $d_c$ are calculated for each coordinate in the longitudinal direction. In other words, in the flowchart for extracting the candidate road surface disparities $d_c$ described above, the candidate road surface disparities $d_c$ are calculated for each row of one pixel in the longitudinal direction. The unit by which candidate road surface disparities are calculated is not limited to this. The candidate road surface disparities $d_c$ can be calculated in units of a plurality of coordinates in the longitudinal direction.

After the process of extracting the candidate road surface disparities $d_c$ in steps S301 to S307, the control unit 24 proceeds to the processing of step S202 of the flowchart in FIG. 7. When sequentially estimating the road surface disparities $d_r$ from the short-distance side to the long-distance side, the control unit 24 sequentially applies a Kalman filter to the road surface disparities $d_r$. Accordingly, first, the control unit 24 initializes the Kalman filter (step S202). The initial value of the Kalman filter can be the value of the average candidate road surface disparity day calculated in the processing of step S305, which corresponds to the lowest row (the row whose value of the v coordinate has the value $v_0$) among the rows in which the road surface disparities $d_r$ are to be estimated.

The control unit 24 sequentially executes the subsequent processing of steps S203 to S210 while changing the target row from the short-distance side to the long-distance side of the road surface (step S203).

First, the control unit 24 generates, for the target row in the first disparity image, a histogram representing frequency for each of the values of the road surface disparities $d_r$ from the candidate road surface disparities $d_c$ located within the range of a certain width in the real space (step S204). The range of a certain width in the real space is a range that takes into account the width of the travel lane of the road. The certain width can be set to a value, for example, 2.5 m or 3.5 m. The range for acquiring disparities is initially set to, for example, a range surrounded by a solid-line frame 45 in FIG. 11. The certain width is stored in advance in the memory 23 or the like of the object detection device 20. Limiting the range for acquiring disparities to this range makes it less likely that the control unit 24 erroneously recognizes an object or a structure such as a soundproof wall other than the road surface 41A as the road surface 41A and extracts the object or the structure. Thus, the accuracy of road surface detection can be improved. As described below, the range for acquiring disparities, which is indicated by the solid line in FIG. 11, can be sequentially changed from the initially set frame 45 in accordance with the situation on the road ahead.

The control unit 24 sets, for the target row, a range for acquiring the road surface disparities $d_r$ on the basis of the values of the road surface disparities $d_r$ predicted by the Kalman filter. The range for acquiring the road surface disparities $d_r$ is a range determined on the basis of the reliability calculated when the Kalman filter predicts the road surface disparities $d_r$ in the next row. The reliability is expressed by the variance $\pi^2$ of a Gaussian distribution ($\sigma$ is a standard deviation of the road surface disparities $d_r$). The control unit 24 can use the predicted value $\pm 2\sigma$ or the like to determine the range for acquiring the road surface disparities $d_r$. The control unit 24 extracts, from the histogram of the candidate road surface disparities $d_c$ generated in the processing of step S204, the road surface disparity $d_r$ having the maximum frequency within the range set on the basis of the Kalman filter for acquiring the road surface disparities $d_r$. The control unit 24 sets the extracted road surface disparity $d_r$ as an observation value of the road surface disparities $d_r$ in the target row (step S205).

Figure 12:
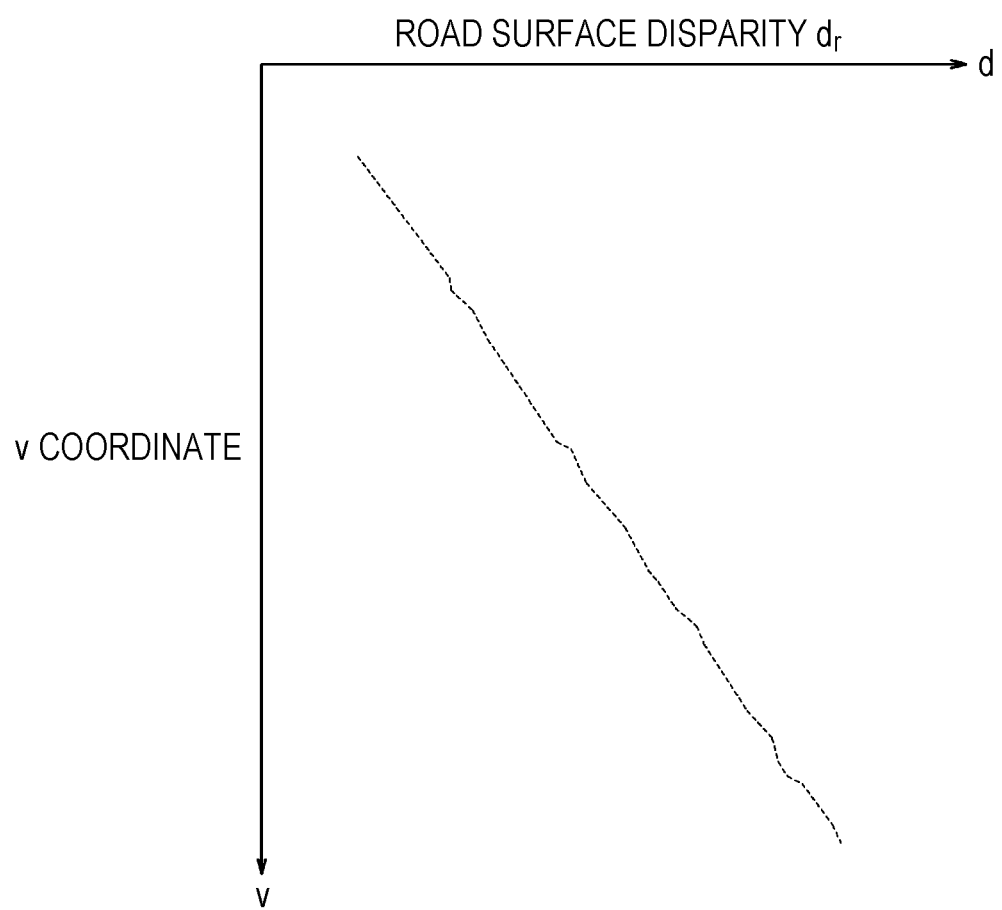
FIG. 12 is a d-v correlation diagram illustrating an example of a relationship between a road surface disparity $d_r$ and a coordinate in the longitudinal direction (v coordinate).

Then, the control unit 24 confirms that the road surface disparity $d_r$ determined in the processing of step S205 is a correct road surface disparity $d_r$ that does not include a disparity or the like corresponding to an object (step S206). The control unit 24 generates a d-v correlation diagram in which all of the road surface disparities $d_r$ detected in each of the rows up to the row currently being processed are mapped to a d-v coordinate space having the road surface disparity $d_r$ and the v coordinate as coordinate axes. If the road surface 41A is correctly detected, in the d-v correlation diagram, as the value of the v coordinate decreases, the road surface disparity $d_r$ also decreases linearly, as indicated by the broken line in FIG. 12.

Figure 13:
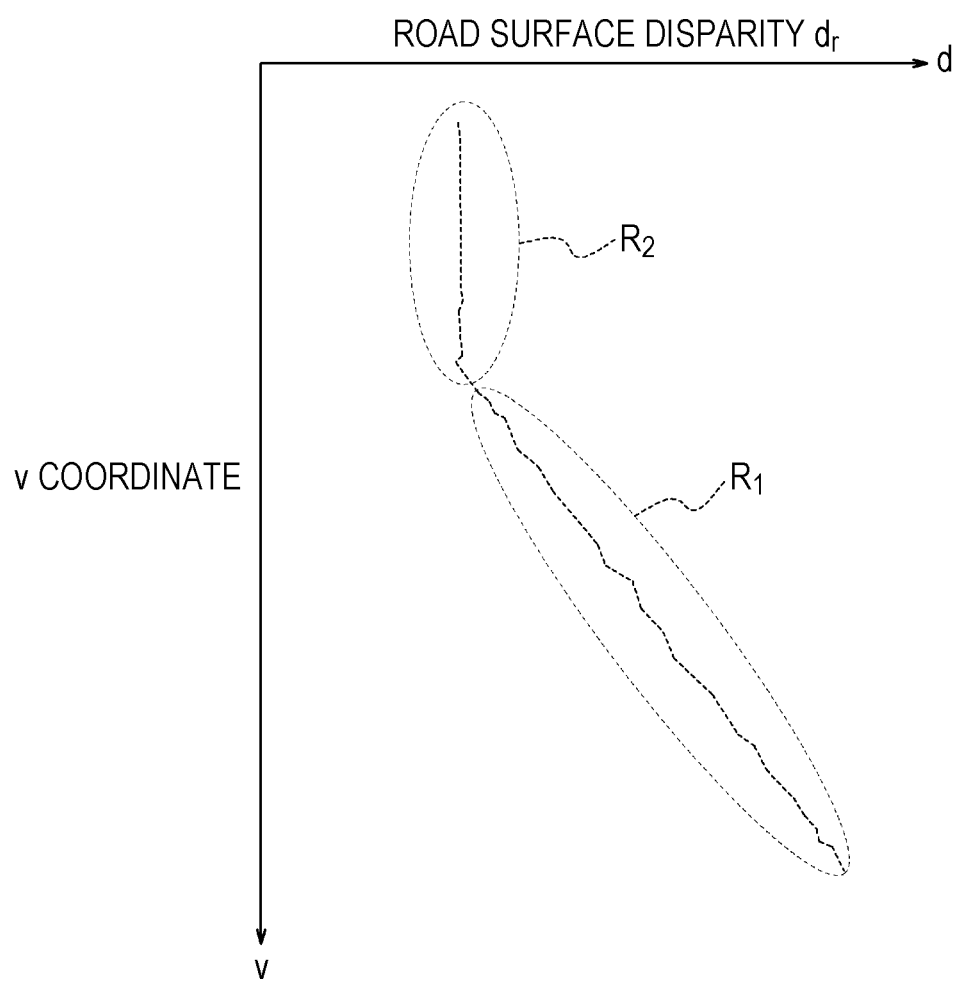
FIG. 13 is a diagram describing a method for sensing whether an object that does not correspond to a road surface disparity is included.

In contrast, if a disparity representing an object is erroneously recognized as the disparity representing the road surface 41A, as illustrated in FIG. 13, in the d-v correlation diagram, the disparity d is substantially constant in the portion of the disparity representing the object regardless of a change in the coordinate in the longitudinal direction (v coordinate). A typical object includes a portion perpendicular to the road surface 41A and is thus displayed in the first disparity image so as to include a large number of equidistant disparities. In FIG. 13, in a first portion $R_1$, the disparity d decreases with a change in the value of the v coordinate. The first portion $R_1$ is a portion where the disparity representing the road surface 41A is correctly detected. In a second portion $R_2$, the disparity d is constant even upon a change in v coordinate. The second portion $R_2$ is considered to be a portion where a disparity representing an object is erroneously detected. In response to a predetermined number of consecutive rows having substantially equal values of the disparity d, the control unit 24 can determine that a disparity representing an object is erroneously recognized as the disparity representing the road surface 41A.

If it is determined in the processing of step S206 that the disparity is not the correct road surface disparity $d_r$ (step S206: No), the control unit 24 re-searches for the road surface disparity $d_r$ from the row in which a disparity representing an object is determined to be erroneously detected (step S207). In the processing of step S207, the control unit 24 re-searches a road surface disparity histogram in an area of a row in which the disparity d does not change even upon a change in the value of the v coordinate.

If, in this area, a portion of a disparity smaller than the disparity d determined in the processing of step S205 includes a disparity with high frequency, the control unit 24 can determine that this disparity is an observation value of the correct road surface disparity $d_r$.

Figure 11:
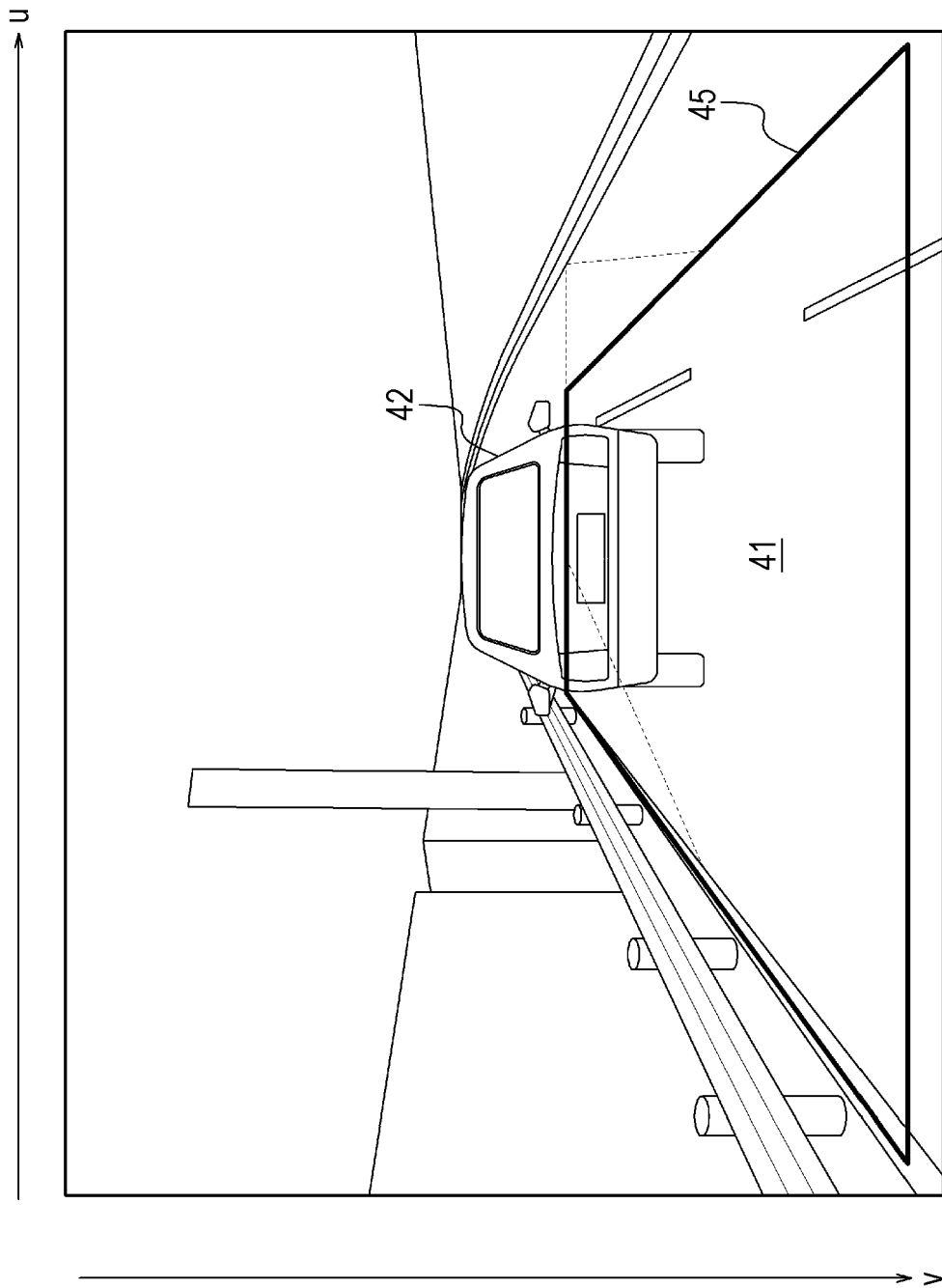
FIG. 11 is a diagram illustrating a range on the road surface for which a histogram of disparities is generated.

If it is determined in the processing of step S206 that the road surface disparity $d_r$ is correct (step S206: Yes) or when the re-search for the road surface disparity $d_r$ is completed in the processing of step S207, the control unit 24 proceeds to the processing of step S208. In the processing of step S208, the control unit 24 determines a range in the transverse direction of the disparity image 41 corresponding to the road surface in the first disparity image that is the target of generating a histogram for the next row shifted by one pixel in the longitudinal direction. For example, as illustrated in FIG. 11, if the disparity image 42 corresponding to another vehicle is overlaid on the disparity image 41 corresponding to the road surface, the road surface detection unit 26 fails to acquire the correct road surface disparity $d_r$ of a portion overlapping the other vehicle in the disparity image 41 corresponding to the road surface. If a range of the disparity image 41 corresponding to the road surface within which the road surface disparity $d_r$ can be acquired is narrow, it is difficult for the control unit 24 to acquire the correct road surface disparity $d_r$. Accordingly, as indicated by the broken line in FIG. 11, the control unit 24 sequentially changes the range for acquiring the candidate road surface disparities $d_c$ in the transverse direction. Specifically, if it is determined in the processing of step S206 that a disparity representing an object is included, the control unit 24 detects on which side of the object in the transverse direction a larger number of candidate road surface disparities $d_c$ representing the correct road surface disparity $d_r$ are present. In the next row, the control unit 24 sequentially shifts the range for acquiring disparities to the side in the transverse direction on which a larger number of candidate road surface disparities $d_c$ representing the correct road surface disparity $d_r$ are present (in FIG. 11, to the right).

Then, the control unit 24 updates the Kalman filter by using the road surface disparity $d_r$ in the current row determined in the processing of step S205 or S207 (step S209). That is, the Kalman filter calculates the estimated value of the road surface disparity $d_r$ on the basis of the observation value of the road surface disparities $d_r$ in the current row. When the estimated value in the current row is calculated, the control unit 24 adds the estimated value of the road surface disparity $d_r$ in the current row as a portion of previous data, and uses the estimated value for the process of calculating the estimated value of the road surface disparity $d_r$ in the next row. It is considered that the height of the road surface 41A does not suddenly change up and down with respect to the distance Z from the stereo camera 10 in the horizontal direction. In estimation using the Kalman filter of this embodiment, accordingly, it is estimated that the road surface disparity $d_r$ in the next row is present near the road surface disparity $d_r$ in the current row. As described above, the control unit 24 limits the disparity range for generating a histogram for the next row to be near the road surface disparity $d_r$ in the current row, thereby making it less likely to erroneously detect an object other than the road surface 41A. In addition, the amount of arithmetic processing executed by the control unit 24 can be reduced, and the processing speed can be increased.

If the road surface disparity $d_r$ estimated by the Kalman filter is larger than a predetermined value in the processing of step S209, the control unit 24 returns to the processing of step S203 and repeatedly executes the processing of steps S203 to S209. If the road surface disparity $d_r$ estimated by the Kalman filter is less than or equal to the predetermined value (step S210), the control unit 24 proceeds to the next processing (step S211). The predetermined value can be, for example, one pixel.

In the processing of step S211, the control unit 24 approximates the relationship between the image coordinate v in the longitudinal direction and the estimated road surface disparity $d_r$ with two straight lines in the d-v correlation diagram. The road surface disparity $d_r$ is related to the distance Z from the stereo camera 10. The value of the v coordinate is associated with the distance Z from the stereo camera 10 and the road surface height Y. Thus, approximating the relationship between the v coordinate and the road surface disparity $d_r$ with two straight lines can be regarded as approximating the relationship between the distance Z from the stereo camera 10 and the height of the road surface 41A with two straight lines. The processing of step S211 will be described in detail in the flowchart in FIG. 14.

First, the processing up to step S210 in FIG. 7 is performed to obtain a correlation between the road surface disparity $d_r$ and the v coordinate. For example, as indicated by a broken-line graph 51 in FIG. 15, the correlation between the v coordinate and the road surface disparity $d_r$ is shown in the d-v coordinate space. When the road surface 41A is flat with no change in inclination in the real space, the graph 51 shows a straight line. However, due to changes in the undulation of the actual road surface 41A, such as rising and falling, the inclination of the road surface 41A may change. When the inclination of the road surface 41A changes, the graph 51 in the d-v coordinate space cannot be represented by a straight line. If a change in the inclination of the road surface 41A is to be approximated with three or more straight lines or a curved line, the processing load on the object detection device 20 is large. In the present application, accordingly, the graph 51 is approximated with two straight lines.

Figure 15:
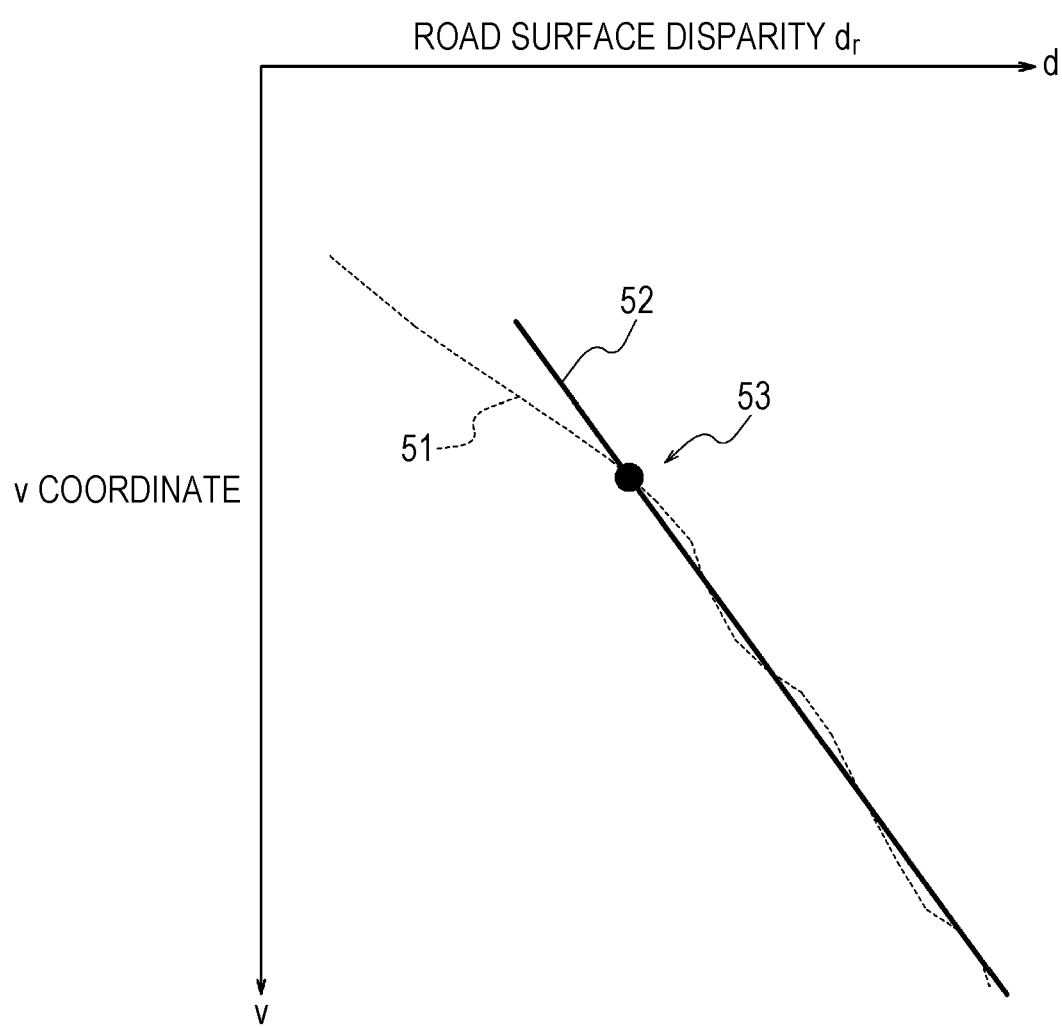
FIG. 15 is a diagram describing approximation of the road surface disparity $d_r$ with a first straight line.

As illustrated in FIG. 15, the control unit 24 approximates the estimated road surface disparity $d_r$ on the lower side (the short-distance side) in the d-v coordinate space with a first straight line 52 by using the least squares method (step S401). The approximation with the first straight line 52 can be performed in a range up to a road surface disparity $d_r$ corresponding to a predetermined distance in the distance range to be subjected to object detection by the object detection device 20. The predetermined distance can be a distance that is one half the distance range to be subjected to object detection by the object detection device 20. For example, in a case where the object detection device 20 is designed to detect an object that is 100 m ahead, the first straight line 52 may be determined so as to be closest to the graph 51 by using the least squares method within a range from the closest distance that can be measured by the stereo camera 10 to 50 m ahead.

Then, the control unit 24 determines whether the inclination of the road surface 41A represented by the first straight line 52 used for approximation in the processing of step S401 is a possible inclination as the road surface 41A (step S402). The inclination angle of the first straight line 52 is converted into a plane in the real space. The inclination of the first straight line 52 corresponds to the inclination angle of the road surface 41A in the yz plane, which is determined in accordance with conditions such as the base length B and the road surface height $Y_0$ at the installation position of the stereo camera 10. If the inclination of the road surface 41A in the real space corresponding to the first straight line 52 is within a range of predetermined angles relative to a horizontal plane in the real space, the control unit 24 can determine that the inclination of the road surface 41A is a possible inclination. If the inclination of the road surface 41A in the real space corresponding to the first straight line 52 is outside the range of predetermined angles relative to the horizontal plane in the real space, the control unit 24 can determine that the inclination of the road surface 41A is not a possible inclination. The predetermined angles can be set as appropriate in consideration of the environment in which the mobile object 30 is traveling.

If it is determined in the processing of step S402 that the inclination of the first straight line 52 is not a possible inclination as the road surface 41A (step S402: No), the control unit 24 determines the first straight line 52 on the basis of a theoretical road surface based on the assumption that the road surface 41A is flat (step S403). The theoretical road surface can be calculated on the basis of installation conditions such as the road surface height $Y_0$ at the installation position of the stereo camera 10, the installation angle, and the base length B. If the road surface disparity $d_r$ calculated from the image is not reliable, the control unit 24 adopts the road surface disparity of the theoretical road surface. For example, if a disparity representing an object or a structure other than the road surface 41A is erroneously extracted as the road surface disparity $d_r$, the control unit 24 may determine that the road surface 41A has an unrealistic inclination, and may be able to exclude the error. This can make it less likely that a disparity representing an object or a structure other than the road surface 41A is erroneously determined as the road surface disparity $d_r$.

If the control unit 24 determines in the processing of step S402 that the inclination of the first straight line 52 is a possible inclination as the road surface 41A (step S402: Yes) or after the control unit 24 executes the processing of step S403, the control unit 24 proceeds to the processing of step S404. In the processing of step S404, the control unit 24 determines an approximation start point 53 at which the approximation of a second straight line 55 is started. The control unit 24 calculates an approximation error of the first straight line 52 with respect to the graph 51 from the smallest v coordinate side (the long-distance side) to the large v coordinate side (the short-distance side), and can set, as the approximation start point 53, the pair of coordinates on the first straight line 52 from which the approximation error is continuously smaller than a predetermined value. Alternatively, an approximation error of the first straight line 52 with respect to the graph 51 may be calculated from the largest v coordinate side (the short-distance side) to the small v coordinate side (the long-distance side), and the approximation start point 53 may be determined as the pair of coordinates on the first straight line 52 at which the approximation error is larger than a predetermined value. The v coordinate of the approximation start point 53 is not limited to a specific value. The approximation start point 53 may be set at the position of the v coordinate corresponding to a position closer to the stereo camera 10 than a distance that is one half the distance range to be subjected to object detection by the object detection device 20 on the first straight line 52. For example, when the road surface 41A is approximated with the first straight line 52 within a range from the closest distance that can be measured to 50 m ahead, the approximation start point 53 may be set at the position of the v coordinate corresponding to 40 m before 50 m.

Figure 16:
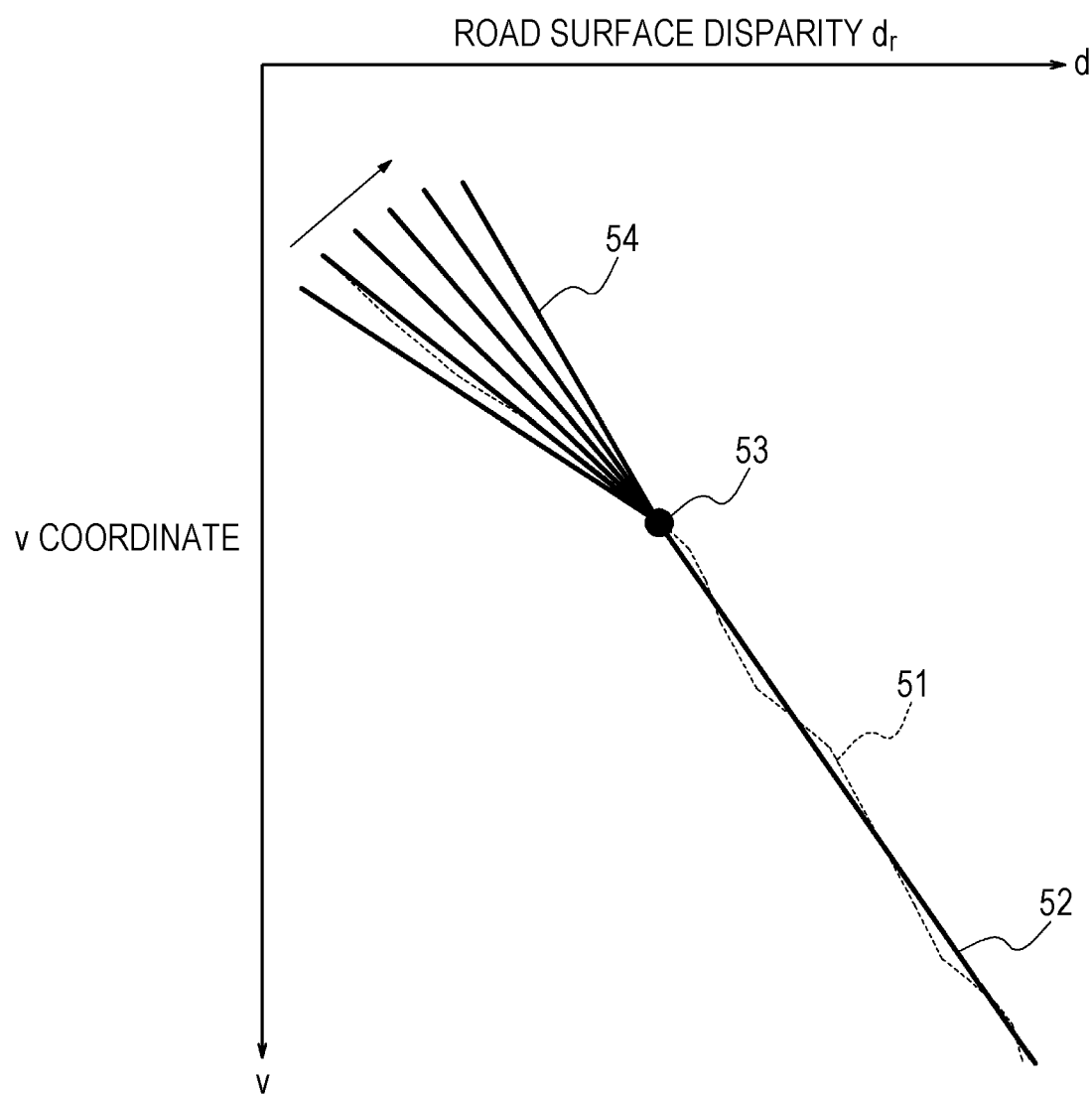
FIG. 16 is a diagram describing a method for determining a second straight line.

After executing the processing of step S404, the control unit 24 repeatedly executes the processing of steps S405 to S407. As illustrated in FIG. 16, the control unit 24 sequentially selects candidate straight lines 54, which are candidates of the second straight line 55 with the approximation start point 53 as a starting point, as angles whose angle differences from the first straight line 52 are selected from a predetermined angle range (step S405). The predetermined angle range is set as angles over which the slope of the road can change in a distance range to be measured. The predetermined angle range can be, for example, ±3 degrees. For example, the control unit 24 can sequentially change the angles of the candidate straight lines 54 to angles in increments of 0.001 degrees, starting from −3 degrees of the angle of the first straight line 52 to +3 degrees of the angle of the first straight line 52.

The control unit 24 computes, for the selected candidate straight lines 54, an error relative to a portion above the approximation start point 53 of the graph 51 (the long-distance side) in the d-v coordinate space (step S406). The error can be computed by using the mean square error of the disparity d with respect to the v coordinate. The control unit 24 may store the error computed for each candidate straight line 54 in the memory 23.

Figure 17:
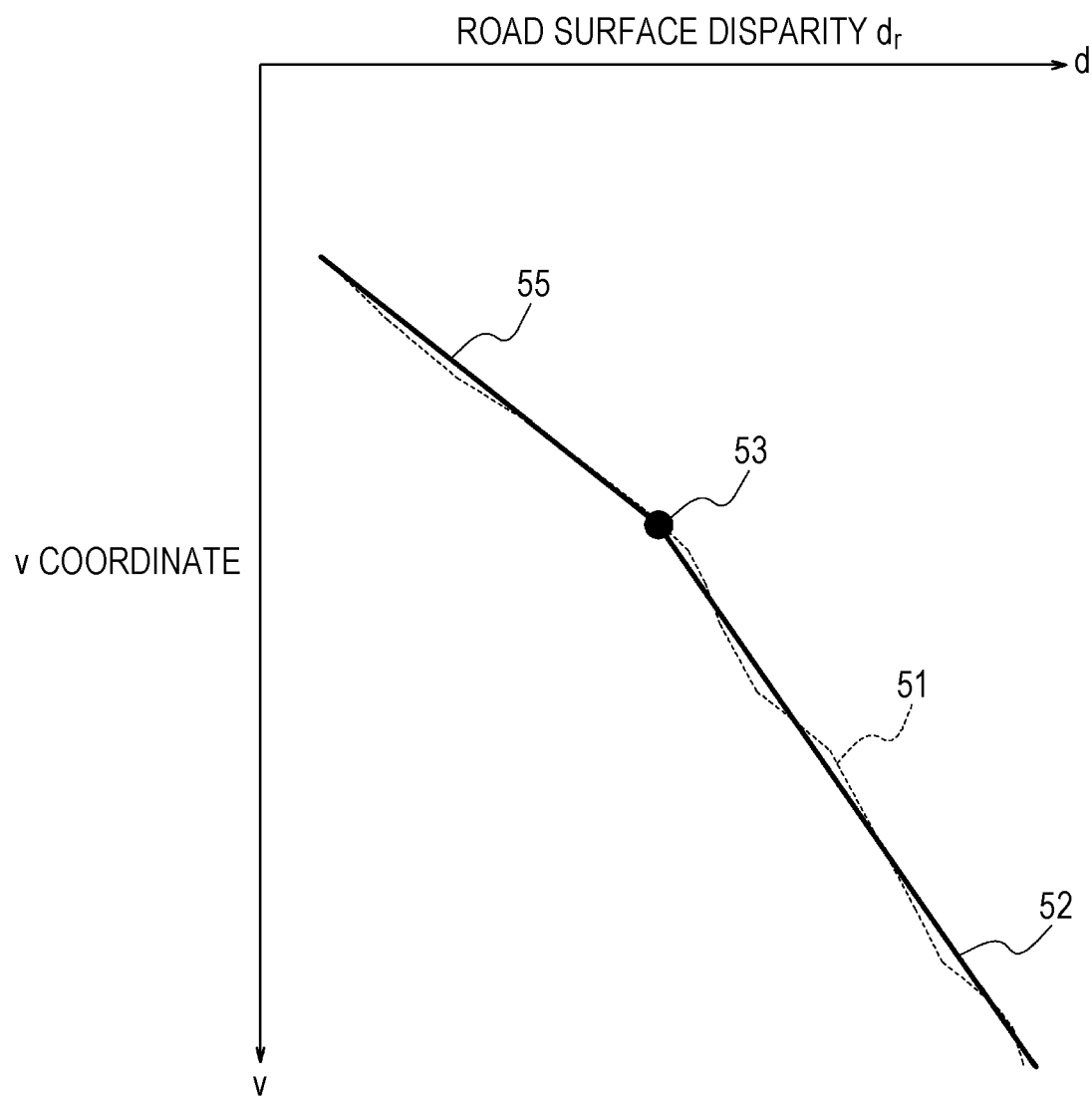
FIG. 17 is a diagram illustrating an example of a result of the approximation of a relationship between the road surface disparity $d_r$ and the coordinate in the longitudinal direction (v coordinate) of an image with straight lines.

When the computation of the errors for all of the candidate straight lines 54 within the angle range is completed (step S407), the control unit 24 searches the errors stored in the memory 23 for the minimum error. As illustrated in FIG. 17, the control unit 24 selects the candidate straight line 54 having the minimum error as the second straight line 55 (step S408).

When the second straight line 55 is determined in the processing of step S408, the control unit 24 determines whether the error between the second straight line 55 and the graph 51 is within a predetermined value (step S409). The predetermined value is set as appropriate to obtain the desired accuracy of road surface estimation.

If the error is within the predetermined value in the processing of step S409 (step S409: Yes), the road surface disparity $d_r$ is approximated using the first straight line 52 and the second straight line 55.

If the error exceeds the predetermined value in the processing of step S409 (step S409: No), the control unit 24 extends the first straight line 52 upward (the long-distance side) and overwrites the approximation result (step S410). As described above, the road surface disparity $d_r$ is approximated with two straight lines.

Approximating the road surface disparity $d_r$ with respect to the v coordinate with two straight lines allows the shape of the road surface to be approximated with two straight lines. As a result, compared to approximation of the shape of the road surface with a curved line or three or more straight lines, the load of the subsequent computation is reduced, and the speed of the object detection process is increased. In addition, compared to approximation of the road surface with a single straight line, the error from the actual road surface is small. Furthermore, since the v coordinate of the approximation start point 53 of the second straight line 55 is not fixed to a predetermined coordinate, the accuracy of approximation to the actual road surface can be improved compared to a case where the coordinates of the approximation start point 53 are fixed in advance.

If the error is within the predetermined value in the processing of step S409 (step S409: Yes) or after executing the processing of step S410, the control unit 24 ends the process of approximating the road surface disparity $d_r$ with straight lines, and then returns to the processing of step S212 in FIG. 7.

In the processing of step S212, a threshold for the road surface disparity $d_r$ to be removed from the first disparity image is determined (step S212). The threshold for the road surface disparity $d_r$ to be removed from the first disparity image corresponds to a first height described below. The first height can be calculated such that the road surface disparity $d_r$ is removed in the subsequent processing of step S103.

Figure 18:
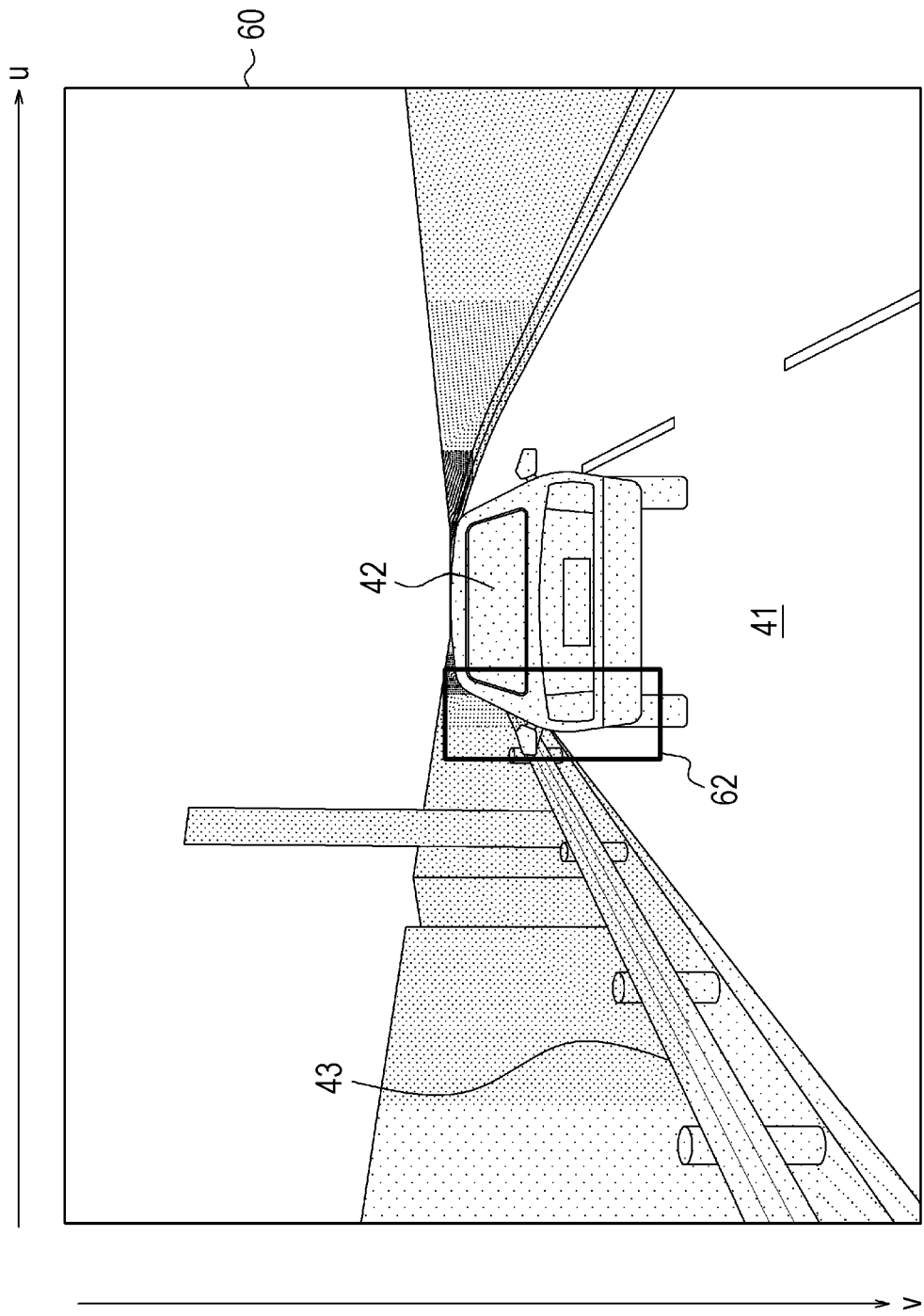
FIG. 18 is a diagram illustrating an example of a second disparity image.
Figure 19:
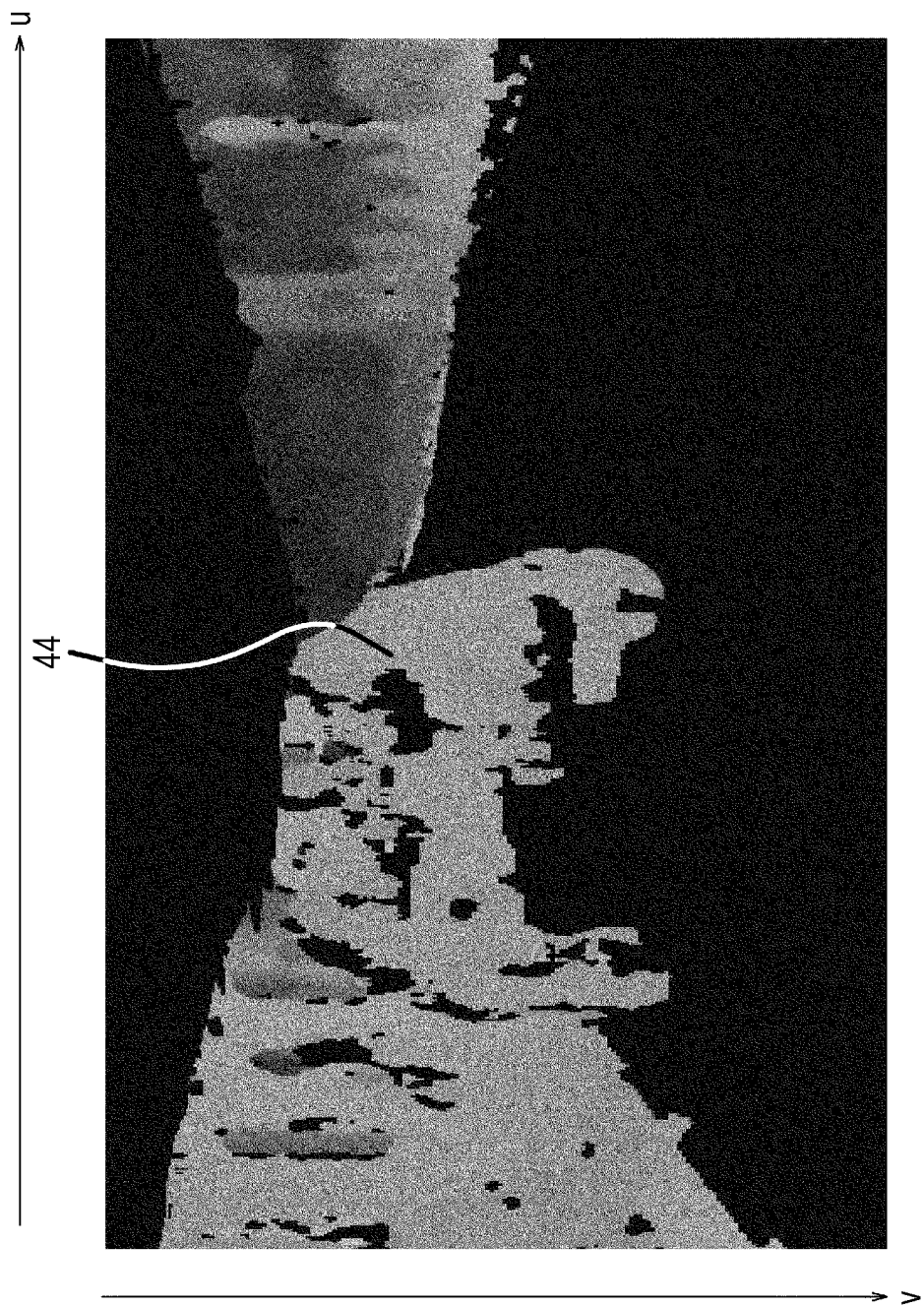
FIG. 19 is a reference diagram of the second disparity image.

Then, the control unit 24 returns to the flowchart in FIG. 5. The control unit 24 performs the process described above to acquire an approximate expression in which the relationship between the v coordinate and the road surface disparity $d_r$ in the d-v coordinate space is approximated with two straight lines. From the approximate expression representing the relationship between the v coordinate and the road surface disparity $d_r$ in the d-v coordinate space, the relationship between the distance Z and the road surface height Y ahead of the stereo camera 10 in the real space is obtained. The control unit 24 executes the second process on the basis of the approximate expression (step S103). The second process is a process for removing, from the first disparity image, a disparity corresponding to a range for which the height from the road surface 41A in the real space is less than or equal to a first height and a disparity corresponding to a subject whose height from the road surface 41A is greater than or equal to a second height. As a result, the control unit 24 generates a second disparity image 60 as illustrated in FIG. 18 from the first disparity image 40 illustrated in FIG. 6. FIG. 18 is a diagram prepared for explanation. An actual second disparity image based on an image acquired from the stereo camera 10 is, for example, illustrated in FIG. 19. In FIG. 19, the magnitudes of the disparities are expressed by the density of black and white. The second disparity image illustrated in FIG. 19 includes a disparity image 44 corresponding to another vehicle.

The first height may be set to be smaller than the minimum value of the height of the object to be detected by the object detection device 20. The minimum value of the height of the object to be detected by the object detection device 20 may be a child's height (for example, 50 cm). The first height may be a value larger than 15 cm and smaller than 50 cm. Noise included in the first disparity image 40 illustrated in FIG. 6 may reduce the detection accuracy of the disparity corresponding to the road surface through the process described above. In this case, if the detected disparity corresponding to the road surface is simply removed from the first disparity image 40, a portion of the disparity image 41 may contain the disparity corresponding to the road surface. The disparity corresponding to the range for which the height from the road surface 41A is less than or equal to the first height is removed from the first disparity image 40 to obtain a second disparity image in which the disparity corresponding to the road surface is accurately removed from the disparity image 41.

In the second disparity image 60 illustrated in FIG. 18, information on the disparity corresponding to the range for which the height from the road surface in the real space is less than or equal to the first height has been removed. With this configuration, the disparity image 41 corresponding to the road surface includes no disparity information. The disparity image 41 corresponding to the road surface and the disparity image 42 corresponding to another vehicle are adjacent to each other. In the second disparity image 60, since the disparity image 41 includes no disparity information, in the subsequent processing, the disparity information of the disparity image 42 corresponding to another vehicle can easily be processed. In addition, removal of an unnecessary disparity that is not associated with the object to be detected can increase the processing speed described below.

The second height may be set as appropriate on the basis of the maximum value of the height of the object to be detected by the object detection device 20. When the mobile object 30 is a vehicle, the second height may be set on the basis of the upper limit of the height of a vehicle capable of traveling on a road. The height of a vehicle capable of traveling on a road is defined by traffic rules and the like. For example, according to the Road Traffic Law in Japan, the height of a truck is basically 3.8 m or less. In this case, the second height may be 4 m. A disparity corresponding to an object whose height from the road surface is greater than or equal to the second height is removed from the first disparity image to remove information on the disparity corresponding to the object from the first disparity image. In the second disparity image 60 illustrated in FIG. 18, since disparities corresponding to objects whose heights from the road surface are greater than or equal to the second height are removed, disparity images corresponding to objects located on the negative direction side of the v axis include no disparity information. Removal of information on disparities corresponding to objects whose heights are greater than or equal to the second height makes it easier to perform, in the subsequent processing, a process on the disparity information of the disparity image 42 corresponding to another vehicle illustrated in FIG. 18. In addition, removal of an unnecessary disparity that is not associated with the object to be detected can increase the processing speed described below.

After executing the processing of step S103, the control unit 24 detects a first disparity and a second disparity from the second disparity image (step S104). The details of the processing of step S104 are illustrated in a flowchart illustrated in FIG. 20.

Figure 21:
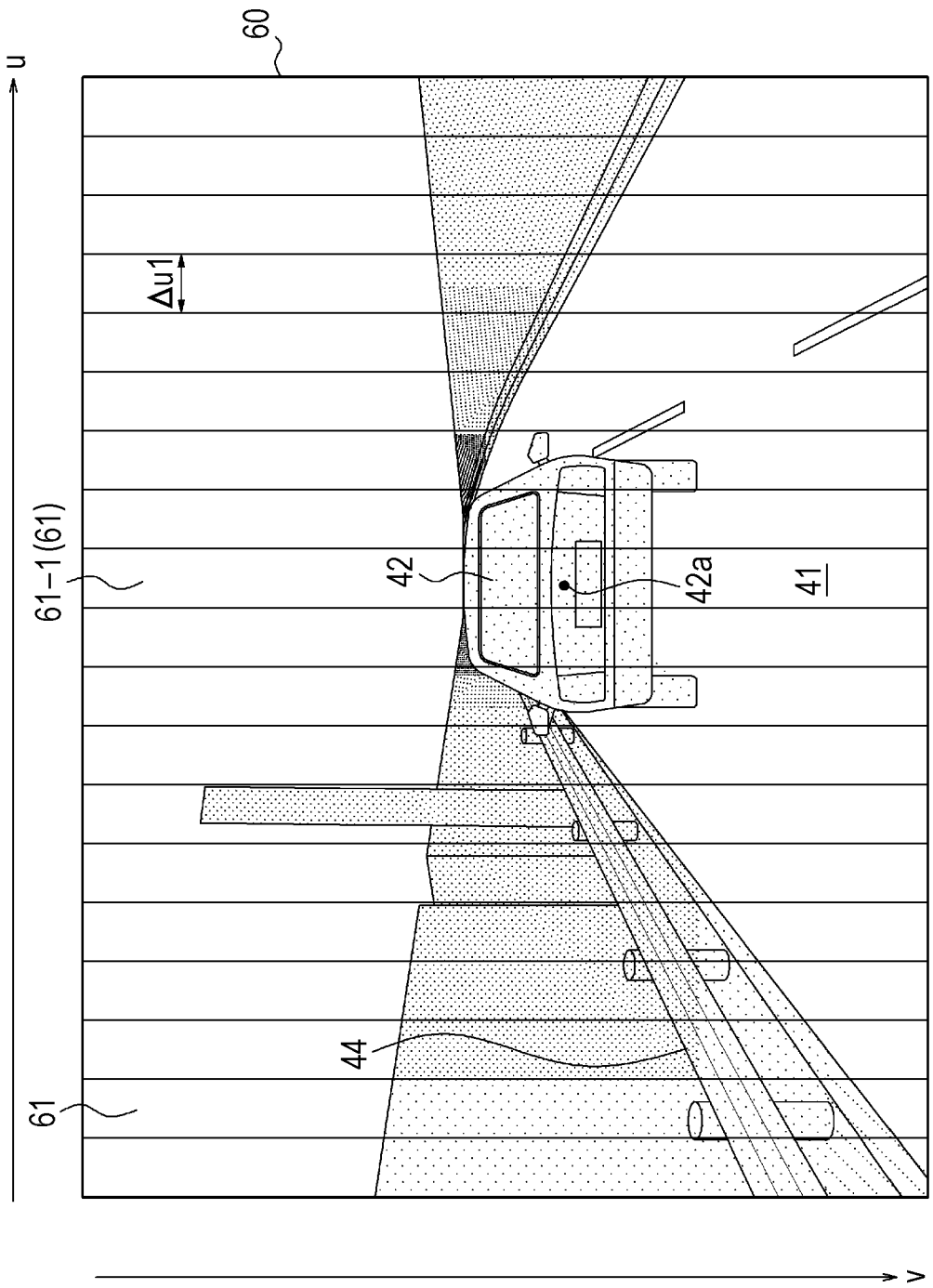
FIG. 21 is a diagram illustrating sub-regions superimposed on the second disparity image illustrated in FIG. 18.

In the processing of step S501, the control unit 24 divides the second disparity image by Aul in the u direction to obtain a plurality of sub-regions. FIG. 21 illustrates sub-regions 61 superimposed on the second disparity image 60. Each of the sub-regions 61 may have a rectangular shape with the long sides being significantly longer than the short sides. The long sides of the sub-regions 61 are five times or more the short sides of the sub-regions 61. The long sides of the sub-regions 61 may be ten times or more the short sides of the sub-regions 61, or may be 20 times or more the short sides of the sub-regions 61. The short sides of the sub-regions 61, that is, Aul, may be each several pixels to several tens of pixels long. As described below, the first disparity and the second disparity can be detected on the basis of the sub-regions 61. The shorter the short sides of the sub-regions 61, that is, Aul, are, the higher the resolution of detection of the first disparity and the second disparity may be. The control unit 24 may sequentially acquire the sub-regions 61 from the negative direction side to the positive direction side of the u axis illustrated in FIG. 21 and execute the processing of steps S502 to S506 below.

Figure 22:
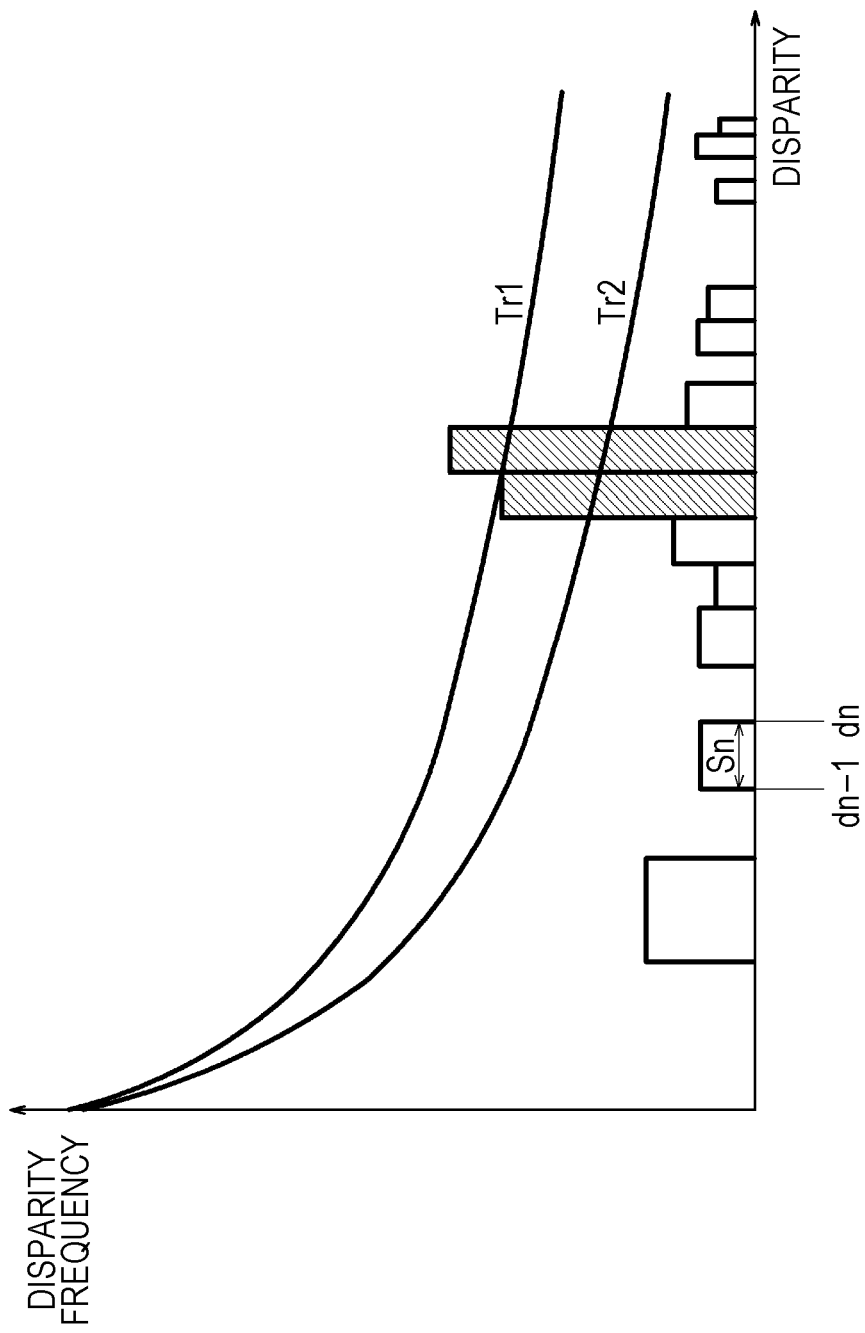
FIG. 22 is a diagram illustrating an example of a disparity histogram.

In the processing of step S502, the control unit 24 generates a disparity histogram for each sub-region. FIG. 22 illustrates an example of the disparity histogram. In FIG. 22, the horizontal axis corresponds to the magnitude of the disparity. In FIG. 22, the vertical axis corresponds to the disparity frequency. The disparity frequency is the number of disparity pixels representing the disparity included in a sub-region. As illustrated in FIG. 21, the sub-regions 61 may include a plurality of disparity pixels in a disparity image corresponding to the same object. For example, a sub-region 61-1 includes a plurality of disparity pixels 42a. The plurality of disparity pixels 42a are disparity pixels included in the sub-region 61-1 among the plurality of disparity pixels in the disparity image 42 corresponding to another vehicle. In the sub-regions 61, disparities represented by a plurality of disparity pixels corresponding to the same object can be approximately equal to each other. For example, in the sub-region 61-1, the disparities represented by the plurality of disparity pixels 42a can be approximately equal to each other. That is, in the disparity histogram illustrated in FIG. 22, the disparity frequency corresponding to the same object can be high.

In the processing of step S502, the control unit 24 may increase the width of a section Sn of the disparity histogram illustrated in FIG. 22 with a decrease in disparity. The section Sn is the n-th section of the disparity histogram counted from the smallest disparity. The start point of the section Sn is a disparity dn−1. The end point of the section Sn is a disparity dn. For example, the control unit 24 may increase the width of a section Sn-1 such that the width of the section Sn-1 is larger than the width of the section Sn by about 10% of the width of the section Sn. When the distance from the stereo camera 10 to an object is long, the disparity corresponding to the object may be smaller than that when the distance from the stereo camera 10 to the object is short. When the distance from the stereo camera 10 to an object is long, the number of pixels occupied by the object in the stereo image may be smaller than that when the distance from the stereo camera 10 to the object is short. That is, when the distance from the stereo camera 10 to an object is long, the number of disparity pixels representing the disparity corresponding to the object in the second disparity image may be smaller than that when the distance from the stereo camera 10 to the object is short. As the disparity decreases, the width of the section Sn in the disparity histogram illustrated in FIG. 22 increases. Thus, a disparity corresponding to an object at a distance far from the stereo camera 10 can be easily detected through the processing of steps S503 to S506 described below. The control unit 24 may sequentially execute the processing of steps S503 to S506 for each section of the disparity histogram.

In the processing of step S503, the control unit 24 determines whether the generated disparity histogram includes the section Sn for which the disparity frequency exceeds a first threshold Tr1 (predetermined threshold). If it is determined that the section Sn for which the disparity frequency exceeds the first threshold Tr1 is included (step S503: Yes), the control unit 24 detects, as a first disparity, the disparity in the range from the start point (the disparity dn−1) of the section Sn to the end point (the disparity dn) of the section Sn (step S504). The control unit 24 detects the first disparity as the disparity corresponding to the object. The control unit 24 stores the detected first disparity in the memory 23 in association with the u coordinate. On the other hand, if it is determined that the generated disparity histogram does not include the section Sn for which the disparity frequency exceeds the first threshold Tr1 (step S503: No), the control unit 24 proceeds to the processing of step S505.

The first threshold Tr1 may be set on the basis of the minimum value (for example, a child's height of 50 cm) of the height of the object to be detected by the object detection device 20. However, as described above, if the object is at a distance far from the stereo camera 10, the disparity corresponding to the object may be smaller than that when the object is at a distance close to the stereo camera 10. In this case, if the first threshold Tr1 is set to be constant with respect to disparities, a disparity corresponding to an object at a distance far from the stereo camera 10 may be more difficult to detect than a disparity corresponding to an object at a distance close to the stereo camera 10. Accordingly, the first threshold Tr1 may be set to increase as the disparity of the disparity histogram decreases, the first threshold Tr1 being based on the minimum value of the height of the object to be detected by the object detection device 20. For example, the first threshold Tr1 may be calculated by Equation (2).

$$Tr1=(D \times H)/B \quad (2)$$

In Equation (2), the disparity D is a disparity corresponding to the horizontal axis of the disparity histogram. The height H is the minimum value of the height of the object to be detected by the object detection device 20. The base length B is the distance (base length) between the optical center of the first camera 11 and the optical center of the second camera 12.

The processing of step S505 is processing of determining whether to detect a second disparity. Prior to the description of the processing of step S505, a description of the reason for detecting a second disparity will be given. As described above, in the matching process for calculating a disparity, a disparity of a portion of the disparity image corresponding to the object may fail to be calculated or may be smaller than disparities of the other portions because of a small number of features in the stereo image. For example, as illustrated in FIG. 19, the disparity of a center portion below the disparity image 44 corresponding to another vehicle fail to be calculated because of a small number of features in the stereo image. If a portion of a disparity of a disparity image corresponding to an object is not calculated, for example, even an object having an actual height greater than or equal to 50 cm in the real space may be displayed in the second disparity image as two or more separate objects each having a height less than 50 cm (for example, a height of 10 cm) in the real space. That is, even for an object having an actual height greater than or equal to the height of the detection target in the real space, if a portion of the disparity image corresponding to the object is missing, the disparity corresponding to the object may fail to be detected as the first disparity through the determination process based on the first threshold Tr1 described above. In this embodiment, accordingly, such a disparity that fails to be detected as the first disparity is detected as a candidate disparity corresponding to the object, that is, the second disparity. Since the disparity is detected as the second disparity, it can be determined whether the disparity is to be restored as the disparity of the object to be detected in the later-mentioned processing of step S107 illustrated in FIG. 5 described below.

In the processing of step S505, the control unit 24 determines whether the generated disparity histogram includes the section Sn for which the disparity frequency is less than or equal to the first threshold Tr1 and exceeds a second threshold Tr2 (predetermined threshold).

The second threshold Tr2 may be a predetermined percentage of the first threshold Tr1. The predetermined percentage may be set as appropriate on the basis of the ratio of a portion of a disparity image for the same object where the disparity is not calculated and a portion thereof where the disparity is calculated. For example, the predetermined percentage may be 0.2.

If it is determined in the processing of step S505 that the generated disparity histogram includes the section Sn for which the disparity frequency is less than or equal to the first threshold Tr1 and exceeds the second threshold Tr2 (step S505: Yes), the control unit 24 proceeds to the processing of step S506. On the other hand, if it is determined that the generated disparity histogram does not include the section Sn for which the disparity frequency is less than or equal to the first threshold Tr1 and exceeds the second threshold Tr2 (step S505: No), the control unit 24 returns to the processing of step S105 illustrated in FIG. 5.

In the processing of step S506, the control unit 24 detects, as a second disparity, the disparity in the range from the start point (the disparity dn−1) of the section Sn to the end point (the disparity dn) of the section Sn (step S506). The control unit 24 stores the detected second disparity in the memory 23 in association with the u coordinate. After executing the processing of step S506, the control unit 24 returns to the processing of step S105 illustrated in FIG. 5.

Figure 23:
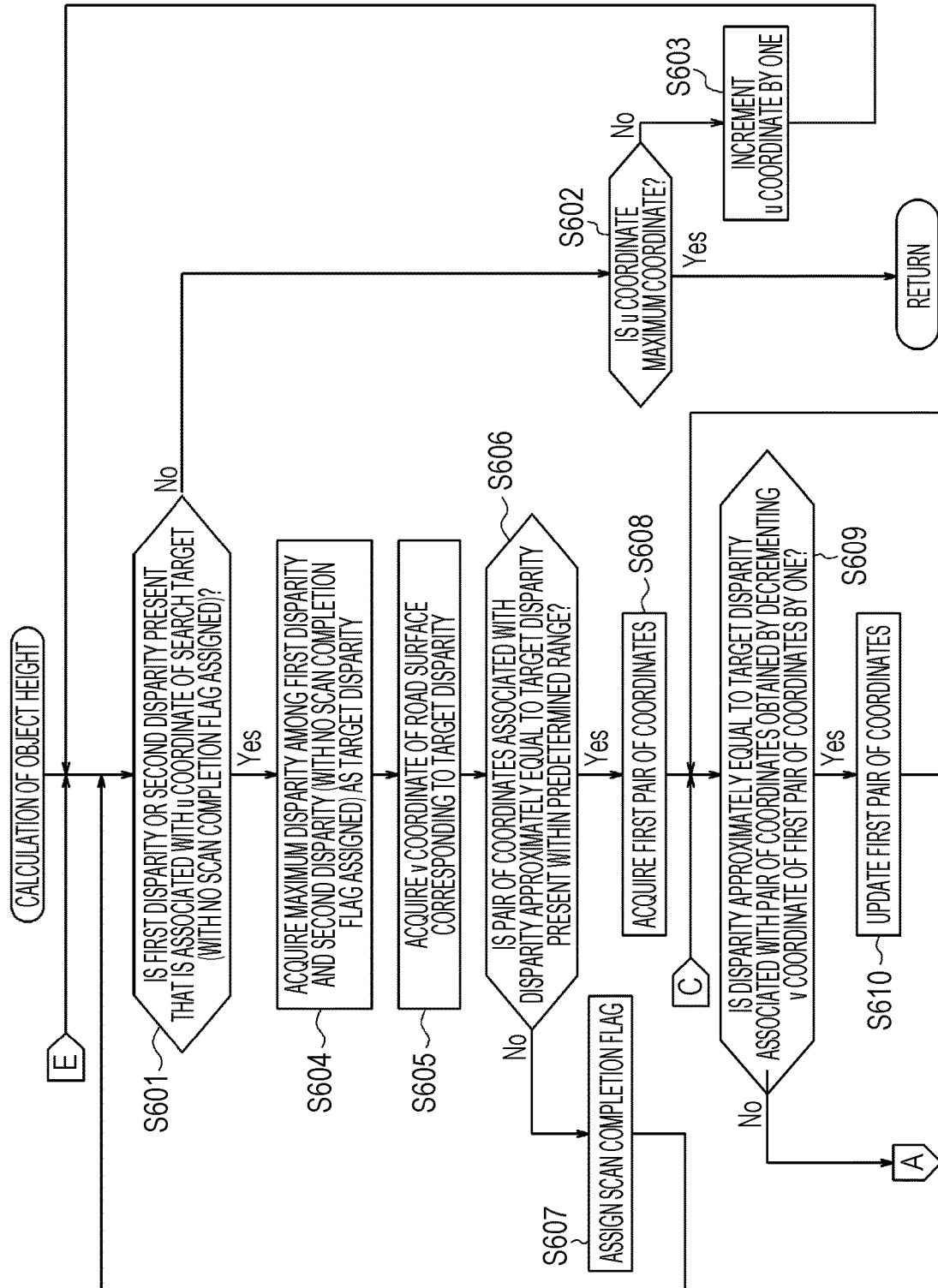
FIG. 23 is a flowchart (part 1) illustrating an example of an object height calculation process.
Figure 24:
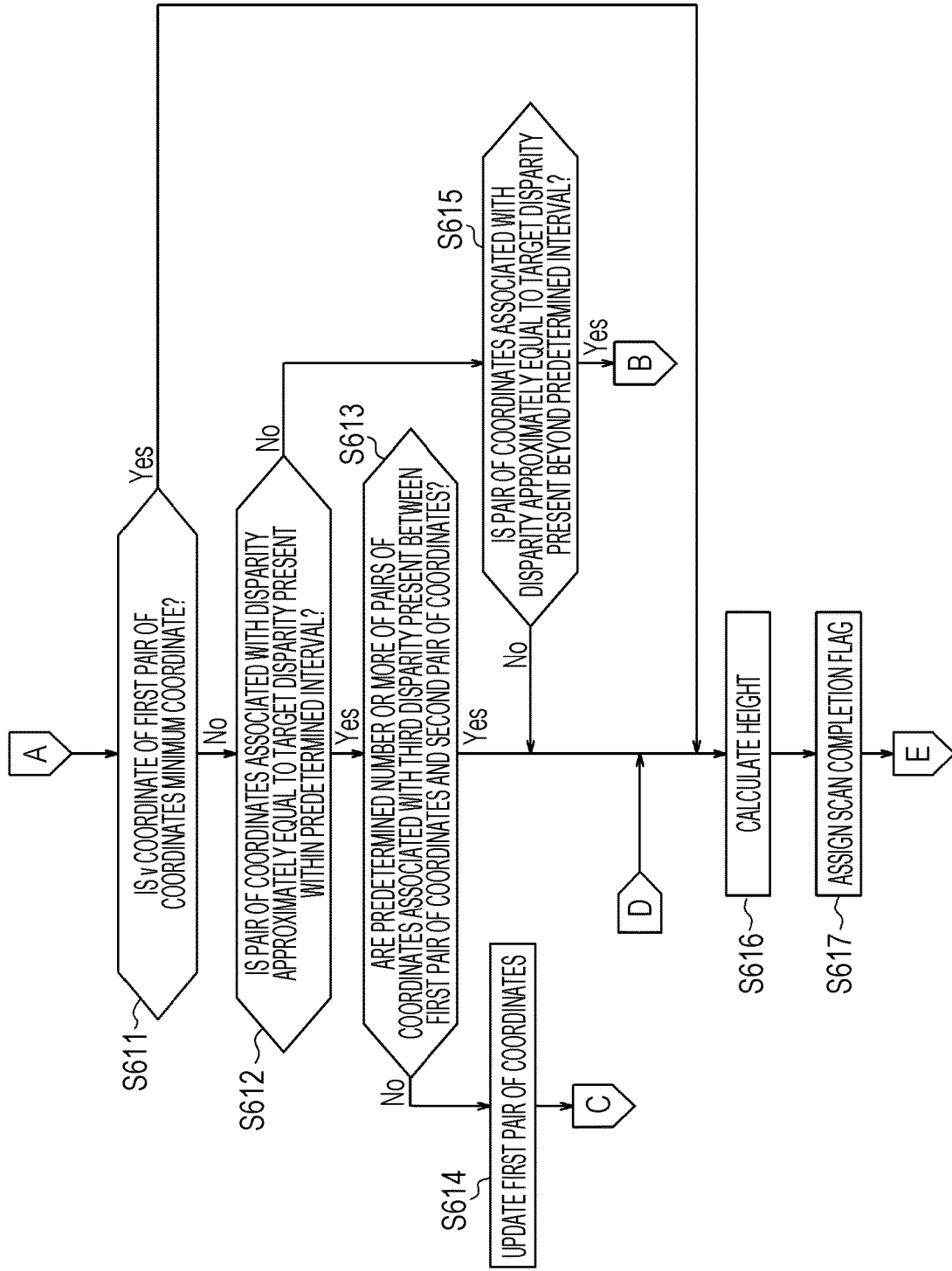
FIG. 24 is a flowchart (part 2) illustrating an example of the object height calculation process.

In the processing of step S105, the control unit 24 calculates the height of the object in the image. The details of the processing of step S105 are illustrated in a flowchart illustrated in FIG. 23 to FIG. 25.

In the following, it is assumed that the control unit 24 executes an object height calculation process on the second disparity map, that is, the second disparity image, as a disparity map. However, the control unit 24 may execute the object height calculation process on any disparity map in which a disparity is associated with a pair of uv coordinates. In the object height calculation process, the control unit 24 scans disparity pixels in the v direction at the u coordinate of the search target to calculate the height of the object in the image. For example, the control unit 24 scans, in the v direction, disparity pixels representing the first disparity identified as the disparity corresponding to the object and/or a disparity pixels representing the second disparity that is a candidate disparity corresponding to the object to calculate the height of the object in the image.

When starting the processing of step S601, the control unit 24 acquires, as the u coordinate of the search target, the minimum coordinate of the u coordinate. In this embodiment, the minimum coordinate and the maximum coordinate when used for scanning over an image refer to the minimum coordinate and the maximum coordinate of a scanning range. The minimum coordinate and the maximum coordinate of the scanning range does not need to be identical to the minimum coordinate and the maximum coordinate in an image. The minimum coordinate and the maximum coordinate of the scanning range may be set as desired.

Figure 20:
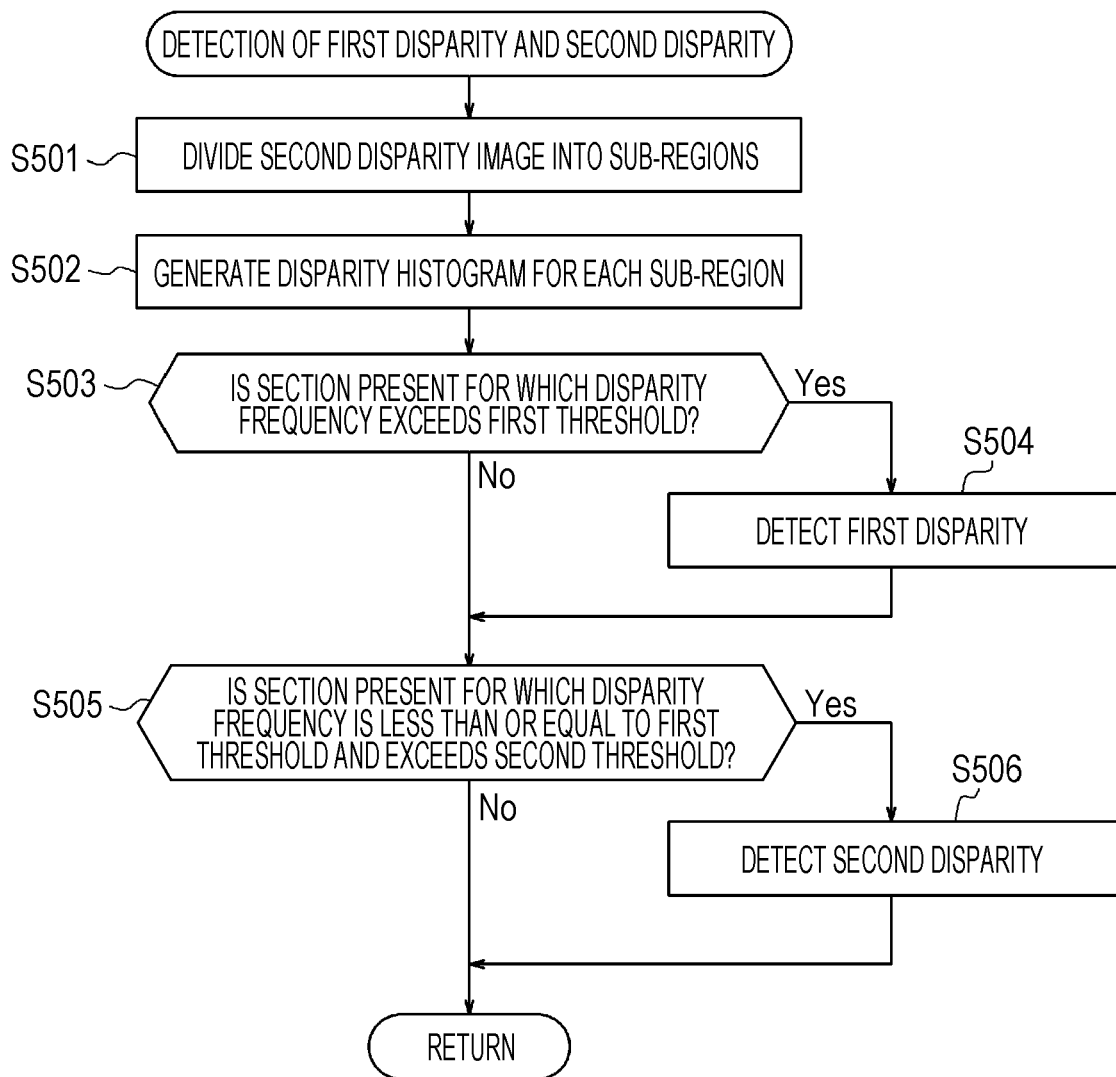
FIG. 20 is a flowchart illustrating an example of a process for detecting a first disparity and a second disparity.

In the processing of step S601, the control unit 24 refers to the memory 23 and determines whether the first disparity or the second disparity associated with the u coordinate of the search target and detected in the process illustrated in FIG. 20 is present.

Figure 26:
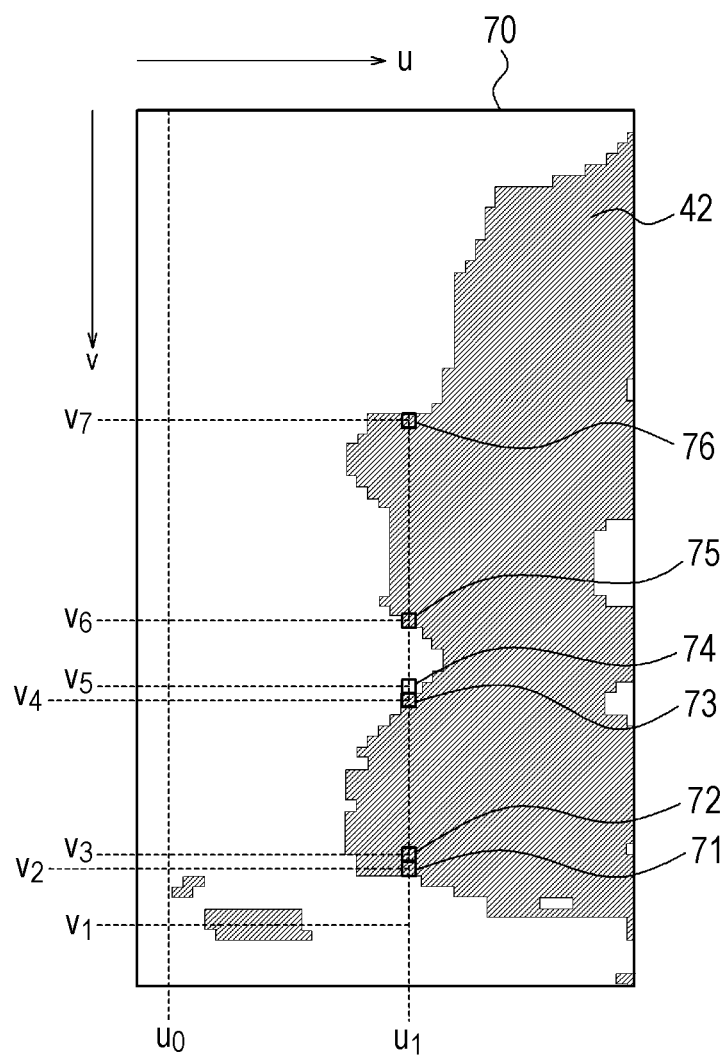
FIG. 26 is a diagram illustrating an example of a second disparity image.

FIG. 26 illustrates a second disparity image 70. In FIG. 26, a portion of the second disparity image 70 is illustrated. The second disparity image 70 corresponds to an area 62 in the second disparity image 60 illustrated in FIG. 18. The second disparity image 70 includes the disparity image 42 of another vehicle. In the second disparity image 70, shaded portions correspond to disparity pixels representing the first disparity or the second disparity. When the u coordinate of the search target is the coordinate ($u_0$), the control unit 24 determines that none of the first disparity and the second disparity associated with the u coordinate of the search target is present. When the u coordinate of the search target is the coordinate ($u_1$), the control unit 24 determines that the first disparity or the second disparity associated with the u coordinate of the search target is present.

If it is not determined in the processing of step S601 that the first disparity or the second disparity associated with the u coordinate of the search target is present (step S601: No), the control unit 24 proceeds to the processing of step S602.

On the other hand, if it is determined that the first disparity or the second disparity associated with the u coordinate of the search target is present (step S601: Yes), the control unit 24 proceeds to the processing of step S604.

In the processing of step S602, the control unit 24 determines whether the u coordinate of the search target is the maximum coordinate. The u coordinate of the search target is the maximum coordinate when the control unit 24 has completely searched the u coordinate from the minimum coordinate to the maximum coordinate. If it is determined that the u coordinate of the search target is the maximum coordinate (step S602: Yes), the control unit 24 ends the process illustrated in FIG. 23, and then returns to the processing of step S106 illustrated in FIG. 5. For example, when the u coordinate of the search target is the coordinate ($u_0$) illustrated in FIG. 26, the control unit 24 determines that the u coordinate of the search target is not the maximum coordinate. On the other hand, if it is determined that the u coordinate of the search target is not the maximum coordinate (step S602: No), the control unit 24 increments the u coordinate of the search target by one (step S603). The control unit 24 executes the processing of step S601 on the u coordinate incremented by one in the processing of step S603. For example, the control unit 24 can repeatedly execute the processing of steps S601 to S603 on the u coordinate of the search target, starting at the coordinate ($u_0$) illustrated in FIG. 26, until it is determined that the first disparity or the second disparity associated with the u coordinate of the search target is present.

In the processing of step S604, the control unit 24 acquires a target disparity. The target disparity may be only the first disparity identified and detected as the disparity corresponding to the object. In other words, the target disparity may be a disparity satisfying the determination process in step S503 illustrated in FIG. 20 as the predetermined condition. Alternatively, the target disparity may include both the first disparity and the second disparity. In other words, the target disparity may be a disparity satisfying the determination process in step S503 and the determination process in step S505 illustrated in FIG. 20 as the predetermined condition. The process illustrated in FIG. 23 to FIG. 25 will be described hereinafter, assuming that the target disparity includes both the first disparity and the second disparity.

In the processing of step S604, the control unit 24 acquires, as a target disparity, the maximum disparity among the first disparity and the second disparity associated with the u coordinate of the search target stored in the memory 23.

In the processing of step S605, the control unit 24 calculates the v coordinate of the road surface corresponding to the target disparity. For example, the control unit 24 substitutes the target disparity into the road surface disparity $d_r$ in the approximate expression (FIG. 17) indicating the relationship between the v coordinate of the road surface acquired in the processing of step S211 illustrated in FIG. 7 and the road surface disparity $d_r$ to calculate the v coordinate of the road surface. In FIG. 26, the u coordinate of the search target is assumed to be the coordinate ($u_1$). In this case, the control unit 24 calculates the coordinate ($v_1$) as the v coordinate of the road surface.

In the processing of step S606, the control unit 24 determines whether a pair of coordinates associated with a disparity approximately equal to the target disparity is present within a predetermined range from the calculated v coordinate of the road surface in the negative direction of the v axis. In the present disclosure, the "disparity approximately equal to the target disparity" includes the same disparity as the target disparity and substantially the same disparity as the target disparity. In the present disclosure, "substantially the same disparity as the target disparity" refers to a disparity that can be identified and handled as the target disparity in image processing. For example, a disparity whose difference from the target disparity is within ±10% may be a disparity approximately equal to the target disparity. In addition, the predetermined range in the processing of step S606 may be set as appropriate on the basis of the height of an object located above the road surface from the road surface. Examples of the object located above the road surface include a roadside tree, a pedestrian bridge, and a traffic light. Such an object located above the road surface is not to be detected by the object detection device 20. That is, the height of such an object located above the road surface need not be calculated.

If it is not determined in the processing of step S606 that a pair of coordinates associated with a disparity approximately equal to the target disparity is present within the predetermined range from the v coordinate of the road surface in the negative direction of the v axis (step S606: No), the control unit 24 does not calculate the height of the object and proceeds to step S607. In the processing of step S607, the control unit 24 assigns a scan completion flag to the target disparity stored in the memory 23, which is acquired in the processing of step S604. After executing the processing of step S607, the control unit 24 again executes the processing of step S601. In the processing of step S601, which is again executed, the control unit 24 determines whether the first disparity or the second disparity that is not assigned the scan completion flag is present for the u coordinate of the search target. In the processing of step S604, which is again executed, the maximum disparity among the first disparity and the second disparity that are not assigned the scan completion flag is acquired as the target disparity.

If it is determined in the processing of step S606 that a pair of coordinates associated with a disparity approximately equal to the target disparity is present within the predetermined range from the v coordinate of the road surface in the negative direction of the v axis (step S606: Yes), the control unit 24 proceeds to the processing of step S608. In the processing of step S608, the control unit 24 acquires, as a first pair of coordinates, a pair of coordinates associated with a disparity approximately equal to the target disparity and present within the predetermined range from the v coordinate of the road surface in the negative direction of the v axis. In FIG. 26, the u coordinate of the search target is assumed to be the coordinate ($u_1$). Further, it is assumed that the coordinates ($u_1$, $v_2$) of a disparity pixel 71 are associated with a disparity approximately equal to the target disparity. That is, the disparity pixel 71 represents a disparity approximately equal to the target disparity. Further, it is assumed that the coordinate ($v_0$) of the v coordinate of the road surface and the coordinate ($v_1$) of the v coordinate of the disparity pixel 71 are located in a predetermined range. In this case, the control unit 24 acquires the coordinates ($u_1$, $v_2$) of the disparity pixel 71 as a first pair of coordinates.

After executing the processing of step S608, the control unit 24 determines whether the pair of coordinates obtained by decrementing the v coordinate of the first pair of coordinates by one is associated with a disparity approximately equal to the target disparity (step S609). In FIG. 26, the first pair of coordinates is assumed to be the coordinates ($u_1$, $v_2$) of the disparity pixel 71. The pair of coordinates obtained by decrementing the v coordinate of the disparity pixel 71 by one is the coordinates ($u_1$, $v_3$) of a disparity pixel 72. The disparity pixel 72 is assumed to represent a disparity approximately equal to the target disparity. That is, it is assumed that the coordinates ($u_1$, $v_3$) of the disparity pixel 72 are associated with a disparity approximately equal to the target disparity. In this case, the control unit 24 determines that the coordinates ($u_1$, $v_3$) of the disparity pixel 72 obtained by decrementing the v coordinate of the coordinates ($u_1$, $v_2$), which are the first pair of coordinates, by one are associated with a disparity approximately equal to the target disparity.

If it is determined in the processing of step S609 that the pair of coordinates obtained by decrementing the v coordinate of the first pair of coordinates by one is associated with a disparity approximately equal to the target disparity (step S609: Yes), the control unit 24 proceeds to the processing of step S610. In the processing of step S610, the control unit 24 updates the first pair of coordinates to the pair of coordinates obtained by decrementing the v coordinate of the first pair of coordinates by one. In FIG. 26, when the first pair of coordinates is the coordinates ($u_1$, $v_2$) of the disparity pixel 71, the first pair of coordinates is updated to the coordinates ($u_1$, $v_3$) of the disparity pixel 72 through the processing of step S610. After executing the processing of step S610, the control unit 24 returns to the processing of step S609. For example, the control unit 24 repeatedly executes the processing of step S609 and the processing of step S610 until the first pair of coordinates is updated to the coordinates (ui, vd of a disparity pixel 73 illustrated in FIG. 26. The coordinates (ui, vd of the disparity pixel 73 are associated with a disparity approximately equal to the target disparity.

If it is determined in the processing of step S609 that the pair of coordinates obtained by decrementing the v coordinate of the first pair of coordinates by one is not associated with a disparity approximately equal to the target disparity (step S609: No), the control unit 24 proceeds to the processing of step S611 illustrated in FIG. 24. In FIG. 26, the first pair of coordinates is assumed to be the coordinates ($u_1$, $v_4$) of the disparity pixel 73. The pair of coordinates obtained by decrementing the v coordinate of the disparity pixel 73 by one is the coordinates ($u_1$, $v_5$) of a disparity pixel 74. The disparity pixel 74 represents a disparity smaller than a disparity approximately equal to the target disparity. That is, the coordinates ($u_1$, $v_5$) of the disparity pixel 74 are not associated with a disparity approximately equal to the target disparity. In this case, the control unit 24 determines that the coordinates ($u_1$, $v_5$) of the disparity pixel 74 obtained by decrementing the v coordinate of the coordinates ($u_1$, $v_4$), which are the first pair of coordinates, by one are not associated with a disparity approximately equal to the target disparity.

In the processing of step S611, the control unit 24 determines whether the v coordinate of the first pair of coordinates is the minimum coordinate. The v coordinate of the first pair of coordinates is the minimum coordinate when the control unit 24 has completely scanned the second disparity image in the negative direction of the v axis. If it is determined that the v coordinate of the first pair of coordinates is the minimum coordinate (step S611: Yes), the control unit 24 proceeds to the processing of step S616. On the other hand, if it is determined that the v coordinate of the first pair of coordinates is not the minimum coordinate (step S611: No), the control unit 24 proceeds to the processing of step S612. For example, when the first pair of coordinates is the coordinates ($u_1$, $v_4$) of the disparity pixel 73 illustrated in FIG. 26, the control unit 24 determines that the v coordinate (coordinate ($v_4$)) of the first pair of coordinates is not the minimum coordinate.

Reference is made again to FIG. 26 before the processing of step S612 is described. In FIG. 26, the first pair of coordinates is assumed to be the coordinates ($u_1$, $v_4$) of the disparity pixel 73. A disparity pixel 75 is located on the negative direction side of the v axis of the disparity pixel 73. The disparity pixel 75 is assumed to represent a disparity approximately equal to the target disparity. The disparity pixel 73 and the disparity pixel 75 are included in a portion of the disparity image 42 corresponding to another vehicle, which is the same object. However, due to the variation in disparity and the like, disparity pixels included in a disparity image corresponding to the same object, such as the disparity pixel 73 and the disparity pixel 75, may be located apart from each other in the v direction.

Accordingly, in the processing of step S612, the control unit 24 determines whether a pair of coordinates associated with a disparity approximately equal to the target disparity is present within a predetermined interval from the v coordinate of the first pair of coordinates in the negative direction of the v axis. The predetermined interval may be set as appropriate on the basis of the height of the object to be detected by the object detection device 20. For example, the predetermined interval may be set as appropriate on the basis of the height (for example, 80 cm) of the rear surface of the vehicle. In FIG. 26, the interval between the disparity pixel 73 and the disparity pixel 75 in the v direction is within the predetermined interval. When the first pair of coordinates is the coordinates ($u_1$, $v_4$) of the disparity pixel 73, the control unit 24 determines that the coordinates ($u_1$, $v_6$) of the disparity pixel 75 associated with a disparity approximately equal to the target disparity are present.

If it is determined in the processing of step S612 that a pair of coordinates associated with a disparity approximately equal to the target disparity is present within the predetermined interval from the v coordinate of the first pair of coordinates in the negative direction of the v axis (step S612: Yes), the control unit 24 proceeds to the processing of step S613. On the other hand, if it is determined that a pair of coordinates associated with a disparity approximately equal to the target disparity is not present within the predetermined interval from the v coordinate of the first pair of coordinates in the negative direction of the v axis (step S612: No), the control unit 24 proceeds to the processing of step S615.

The purpose of the processing of step S613 is to determine whether the target disparity and the disparity approximately equal to the target disparity in the processing of step S612 are disparities corresponding to the same object. Prior to the description of the processing of step S613, a description will be given of an example second disparity image with reference to FIG. 27 and FIG. 28.

Figure 27:
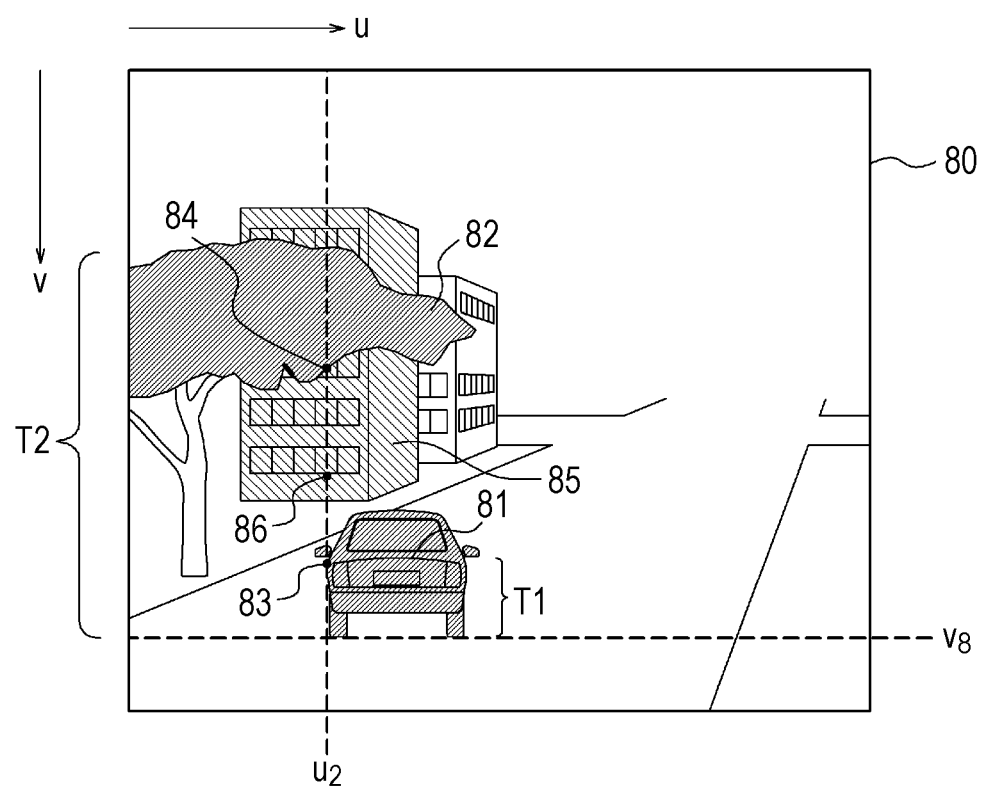
FIG. 27 is a diagram illustrating an example of a second disparity image.

FIG. 27 illustrates a second disparity image 80. The second disparity image 80 is generated on the basis of a first image 90 illustrated in FIG. 28. The first image 90 includes an image 91 corresponding to another vehicle, an image 92 corresponding to a roadside tree, and an image 93 corresponding to a structure. As illustrated in FIG. 27, the second disparity image 80 includes a disparity image 81 corresponding to the image 91 illustrated in FIG. 28, a disparity image 82 corresponding to the image 92 illustrated in FIG. 28, and a disparity image 85 corresponding to the image 93 illustrated in FIG. 28.

Figure 28:
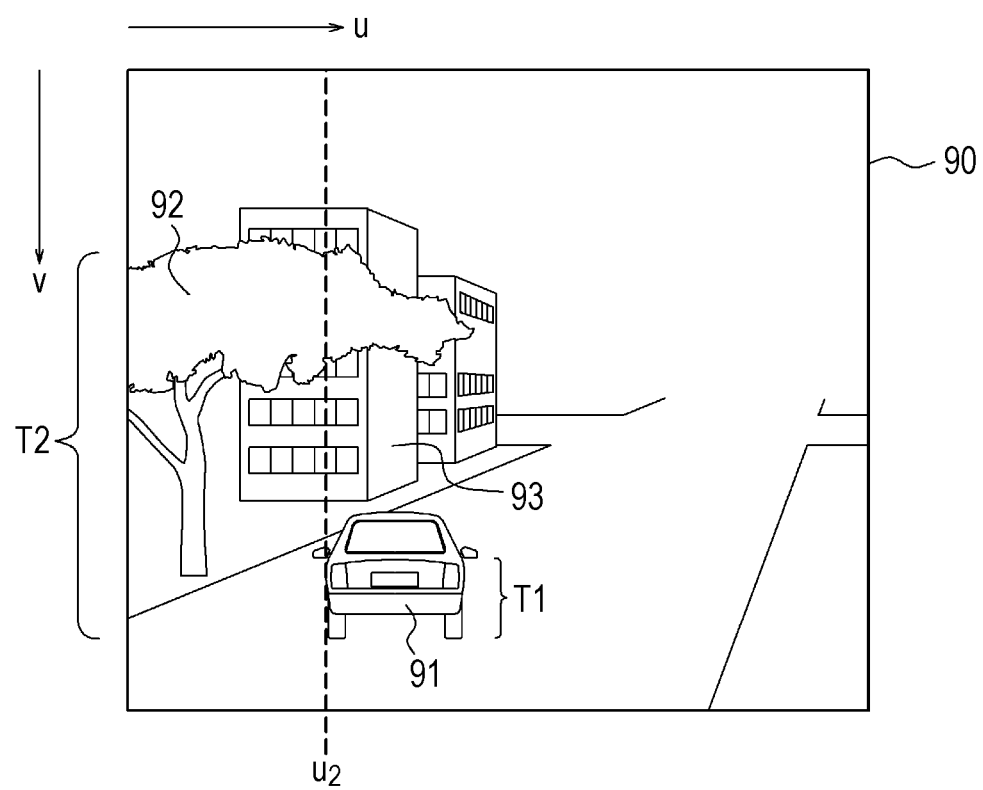
FIG. 28 is a first image corresponding to the second disparity image illustrated in FIG. 27.

As illustrated in FIG. 27, the disparity image 81 includes a disparity pixel 83. The disparity image 82 includes a disparity pixel 84. The disparity pixel 83 and the disparity pixel 84 have the same u coordinate, namely, the coordinate ($u_2$). In the real space, the distance from the stereo camera 10 to the other vehicle corresponding to the image 91 illustrated in FIG. 28 and the distance from the stereo camera 10 to the roadside tree corresponding to the image 92 illustrated in FIG. 28 are approximately equal to each other. Since these two distances are approximately equal to each other, the disparity represented by the disparity pixel 83 in the disparity image 81 illustrated in FIG. 27 and the disparity represented by the disparity pixel 84 in the disparity image 82 illustrated in FIG. 27 can be approximately equal to each other. In addition, in the height direction in the real space, the distance between the other vehicle corresponding to the image 92 illustrated in FIG. 28 and the roadside tree corresponding to the image 92 illustrated in FIG. 28 is short. Since the distance between them is short, the interval between the disparity pixel 83 in the disparity image 81 and the disparity pixel 84 in the disparity image 82 in the v direction illustrated in FIG. 27 is within the predetermined interval described above in the processing of step S612.

In the configuration illustrated in FIG. 27, when the u coordinate of the search target is the coordinate ($u_2$), the control unit 24 can acquire, as the target disparity, the disparities represented by the disparity pixel 83 and the disparity pixel 84. Further, the control unit 24 can update the first pair of coordinates to the pair of coordinates of the disparity pixel 83. When the u coordinate of the search target is the coordinate ($u_2$), it is desirable that a height T1 corresponding to the disparity image 81 be calculated as the height of the object in the image. In an assumed example, when the first pair of coordinates is the pair of coordinates of the disparity pixel 83, since the interval between the disparity pixel 83 and the disparity pixel 84 is within the predetermined interval described above, it is considered that the control unit 24 updates the first pair of coordinates to the pair of coordinates of the disparity pixel 84. In this assumed example, the control unit 24 can continuously scan over the disparity pixels in the disparity image 82 corresponding to the roadside tree. As a result, the control unit 24 detects a height corresponding to the disparity image 82, that is, a height T2 corresponding to the roadside tree, as the height of the object.

A plurality of disparity pixels 86 are present between the disparity pixel 83 and the disparity pixel 84. The plurality of disparity pixels 86 are included in the disparity image 85. The structure corresponding to the disparity image 85 is located farther from the stereo camera 10 than the vehicle and the roadside tree. Thus, the disparity represented by the plurality of disparity pixels 86 in the disparity image 85 is smaller than the disparities represented by the disparity pixel 83 and the disparity pixel 84.

Accordingly, in the processing of step S613, the control unit 24 determines whether a predetermined number or more of pairs of coordinates associated with a third disparity are present between the first pair of coordinates and a second pair of coordinates. The second pair of coordinates is a pair of coordinates located within a predetermined interval from the first pair of coordinates in the negative direction of the v axis and is a pair of coordinates associated with a disparity approximately equal to the target disparity. For example, when the first pair of coordinates is the pair of coordinates of the disparity pixel 83 illustrated in FIG. 27, the second pair of coordinates is the pair of coordinates of the disparity pixel 84. The third disparity is a disparity smaller than the target disparity. The third disparity may be set on the basis of the disparity corresponding to the background. For example, the third disparity may be set assuming the disparity represented by the disparity pixels 86 illustrated in FIG. 27. The predetermined number may be set as appropriate assuming the number of disparity pixels representing the third disparity in the predetermined interval described above.

If it is determined in the processing of step S613 that a predetermined number or more of pairs of coordinates associated with the third disparity are present between the first pair of coordinates and the second pair of coordinates (step S613: Yes), the control unit 24 proceeds to the processing of step S616. For example, when the first pair of coordinates and the second pair of coordinates are the pairs of coordinates of the disparity pixel 83 and the disparity pixel 84 illustrated in FIG. 27, respectively, the control unit 24 determines that a predetermined number or more of disparity pixels 86 are present between the pair of coordinates of the disparity pixel 83 and the pair of coordinates of the disparity pixel 84. On the other hand, if it is determined that a predetermined number or more of pairs of coordinates associated with the third disparity are not present between the first pair of coordinates and the second pair of coordinates (step S613: No), the control unit 24 proceeds to the processing of step S614. For example, when the first pair of coordinates and the second pair of coordinates are the pair of coordinates of the disparity pixel 73 and the pair of coordinates of the disparity pixel 75 illustrated in FIG. 26, respectively, the control unit 24 determines that a predetermined number or more of disparity pixels 74 are not present between the pair of coordinates of the disparity pixel 73 and the pair of coordinates of the disparity pixel 75.

In the processing of step S614, the control unit 24 updates the first pair of coordinates to the second pair of coordinates. For example, when the first pair of coordinates and the second pair of coordinates are the pair of coordinates of the disparity pixel 73 and the pair of coordinates of the disparity pixel 75 illustrated in FIG. 26, respectively, the control unit 24 updates the first pair of coordinates to the coordinates ($u_1$, $v_6$) of the disparity pixel 75. After executing the processing of step S614, the control unit 24 returns to the processing of step S609 illustrated in FIG. 23. For example, in the configuration illustrated in FIG. 26, the control unit 24 can repeatedly execute the processing from step S609 until the first pair of coordinates is updated to the coordinates ($u_1$, $v_7$) of a disparity pixel 76.

In the processing of step S615, the control unit 24 determines whether a coordinate associated with a disparity approximately equal to the target disparity is present beyond the predetermined interval from the first pair of coordinates in the negative direction of the v axis. For example, when the first pair of coordinates is the coordinates ($u_1$, $v_7$) of the disparity pixel 76 illustrated in FIG. 26, the control unit 24 determines that a pair of coordinates associated with a disparity approximately equal to the target disparity is not present beyond the predetermined interval from the coordinates ($u_1$, $v_7$) in the negative direction of the v axis. If it is determined that a pair of coordinates associated with a disparity approximately equal to the target disparity is not present beyond the predetermined interval from the first pair of coordinates in the negative direction of the v axis (step S615: No), the control unit 24 proceeds to the processing of step S616. On the other hand, if it is determined that a pair of coordinates associated with a disparity approximately equal to the target disparity is present beyond the predetermined interval from the first pair of coordinates in the negative direction of the v axis (step S615: Yes), the control unit 24 proceeds to the processing of step S618 illustrated in FIG. 25.

In the processing of step S616, the control unit 24 subtracts the v coordinate of the pair of coordinates of the road surface from the v coordinate of the first pair of coordinates to calculate the height of the object in the image. When the first pair of coordinates is the coordinates ($u_1$, $v_7$) of the disparity pixel 76 illustrated in FIG. 26, the control unit 24 subtracts the v coordinate (coordinate ($v_1$)) of the pair of coordinates of the road surface from the v coordinate (coordinate ($v_7$)) of the disparity pixel 76 to calculate the height of the object. When the first pair of coordinates is the pair of coordinates of the disparity pixel 83 illustrated in FIG. 27, the control unit 24 subtracts the v coordinate (coordinate ($v_8$)) of the road surface from the v coordinate of the disparity pixel 83 to calculate the height T1 of the object. Through the processing of steps S613 and S616, as illustrated in FIG. 27, even when the disparity image 81 of the other vehicle and the disparity image 82 of the roadside tree are located close to each other, the height of the other vehicle can be accurately calculated. In the processing of step S616, the control unit 24 stores the calculated height of the object in the image in the memory 23 in association with the first pair of coordinates.

In the processing of step S616, the control unit 24 may convert the calculated height of the object in the image into the height of the object in the real space. When the height of the object in the real space is smaller than the minimum value of the height of the object to be detected, the control unit 24 may discard information on the calculated height of the object. For example, when the minimum value of the height of the object to be detected is 50 cm, the control unit 24 may discard information on the calculated height of the object if the height of the object in the real space is less than 40 cm.

After executing the processing of step S616, the control unit 24 executes the processing of step S617. In the processing of step S617, the control unit 24 assigns a scan completion flag to the target disparity. After performing the processing of step S617, the control unit 24 returns to the processing of step S601 illustrated in FIG. 23.

Figure 29:
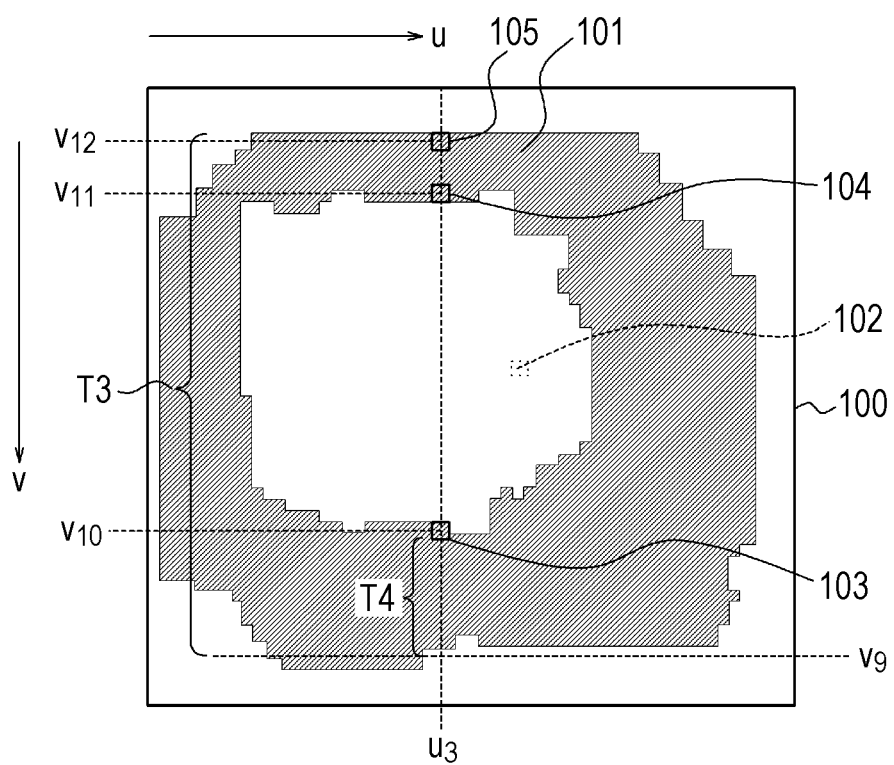
FIG. 29 is a diagram illustrating an example of a second disparity image.

Prior to the description of the processing of step S618, a description will be given of an example second disparity image with reference to FIG. 29. FIG. 29 illustrates a second disparity image 100. In FIG. 29, a portion of the second disparity image 100 is illustrated. A disparity image 101 is a disparity image generated on the basis of a first image 106 illustrated in FIG. 30. The first image 106 includes an image 107 corresponding to the rear surface of a truck.

As illustrated in FIG. 29, the second disparity image 100 includes the disparity image 101. The disparity image 101 corresponds to the image 107 illustrated in FIG. 30. The disparity image 101 includes disparity pixels 102, a disparity pixel 103, a disparity pixel 104, and a disparity pixel 105. The disparity pixel 103 corresponds to a lower image 107a in the image 107 illustrated in FIG. 30. The disparity pixel 104 and the disparity pixel 105 correspond to an upper image 107b in the image 107 illustrated in FIG. 30. The disparity represented by the disparity pixel 103, the disparity represented by the disparity pixel 104, and the disparity represented by the disparity pixel 105 are disparities corresponding to the same object, namely, the truck, and are thus approximately equal to each other.

As illustrated in FIG. 29, the plurality of disparity pixels 102 are located in a center portion of the disparity image 101. No disparity is calculated for the plurality of disparity pixels 102. That is, the plurality of disparity pixels 102 include no disparity information. A center portion on the rear surface of a truck typically has a small number of features in a stereo image. Since a center portion on the rear surface of a truck includes a small number of features in a stereo image, no disparity may be calculated in the matching process for calculating disparity described above, such as in the disparity pixels 102.

In the configuration illustrated in FIG. 29, as an assumed example, the control unit 24 sets the u coordinate of the search target as the coordinate ($u_3$) and scans in the v direction. In the assumed example, it is desired that a height T3 corresponding to the disparity image 101, that is, the height of the truck, be calculated as the height of the object. In the assumed example, the control unit 24 can acquire the disparity represented by the disparity pixel 103 as the target disparity. Further, the control unit 24 can update the first pair of coordinates to the coordinates ($u_3$, $v_{10}$) of the disparity pixel 103. To calculate the height T3, in the processing of step S614 described above, it is required to update the first pair of coordinates to the coordinates ($u_3$, $v_{11}$) of the disparity pixel 104. To update the first pair of coordinates to the coordinates ($u_3$, $v_{11}$) of the disparity pixel 104, it is required to expand the predetermined interval in step S612 described above such that the predetermined interval is larger than the interval between the v coordinate (coordinate ($v_{11}$)) of the disparity pixel 104 and the v coordinate (coordinate ($v_{10}$)) of the disparity pixel 103. However, expanding the predetermined interval in the processing of step S612 described above may make it more likely that the height of the object is erroneously calculated.

Accordingly, the control unit 24 executes the processing of steps S618 to S622 to calculate a height T4 illustrated in FIG. 29 as a first candidate height and calculate the height T3 illustrated in FIG. 29 as a second candidate height. In step S107 illustrated in FIG. 5 described below, the control unit 24 determines which of the first candidate height and the second candidate height to acquire as the height of the object. This configuration eliminates the need to expand the predetermined interval in the processing of step S612 described above. Since the predetermined interval in the processing of step S612 described above is not expanded, it may be less likely that the height of the object is erroneously calculated.

In the processing of step S618, the control unit 24 acquires a pair of candidate coordinates. The pair of candidate coordinates is a pair of coordinates present beyond the predetermined interval from the first pair of coordinates in the negative direction of the v axis and is a pair of coordinates associated with a disparity approximately equal to the target disparity. For example, when the first pair of coordinates is the coordinates ($u_3$, $v_{10}$) of the disparity pixel 103 illustrated in FIG. 29, the control unit 24 acquires the coordinates ($u_3$, $v_{11}$) of the disparity pixel 104 as a pair of candidate coordinates.

In the processing of step S619, the control unit 24 subtracts the v coordinate of the pair of coordinates of the road surface from the v coordinate of the first pair of coordinates to calculate the first candidate height. For example, when the first pair of coordinates is the coordinates ($u_3$, $v_{10}$) of the disparity pixel 103 illustrated in FIG. 29, the control unit 24 subtracts the v coordinate (coordinate ($v_9$)) of the road surface from the v coordinate (coordinate ($v_{10}$)) of the disparity pixel 103 to calculate the first candidate height T4. In the processing of step S619, the control unit 24 stores the calculated first candidate height in the memory 23 in association with the first pair of coordinates. For example, the control unit 24 stores the first candidate height T4 illustrated in FIG. 29 and the coordinates ($u_3$, $v_{10}$) of the disparity pixel 103 as the first pair of coordinates in the memory 23 in association with each other.

In the processing of step S620, the control unit 24 determines whether the pair of coordinates obtained by decrementing the v coordinate of the pair of candidate coordinates by one is associated with a disparity approximately equal to the target disparity. If it is determined that the pair of coordinates obtained by decrementing the v coordinate of the pair of candidate coordinates by one is associated with a disparity approximately equal to the target disparity (step S620: Yes), the control unit 24 proceeds to the processing of step S621. In the processing of step S621, the control unit 24 updates the pair of candidate coordinates to the pair of coordinates obtained by decrementing the v coordinate of the pair of candidate coordinates by one. After executing the processing of step S621, the control unit 24 returns to the processing of step S620. For example, in the configuration illustrated in FIG. 29, the control unit 24 repeatedly executes the processing of step S620 and the processing of step S621 until the pair of candidate coordinates is updated to the coordinates ($u_3$, $v_{12}$) of the disparity pixel 105. On the other hand, if it is determined that the pair of coordinates obtained by decrementing the v coordinate of the pair of candidate coordinates by one is not associated with a disparity approximately equal to the target disparity (step S620: No), the control unit 24 proceeds to the processing of step S622. For example, when the pair of candidate coordinates is the coordinates ($u_3$, $v_{12}$) of the disparity pixel 105 illustrated in FIG. 29, the control unit 24 determines that the pair of coordinates obtained by decrementing the v coordinate of the pair of candidate coordinates by one is not associated with a disparity approximately equal to the target disparity.

In the processing of step S622, the control unit 24 subtracts the v coordinate of the road surface from the v coordinate of the pair of candidate coordinates to calculate the second candidate height. For example, when the pair of candidate coordinates is the coordinates ($u_3$, $v_{12}$) of the disparity pixel 105 illustrated in FIG. 29, the control unit 24 subtracts the v coordinate (coordinate ($v_9$)) of the road surface from the v coordinate (coordinate ($v_{12}$)) of the disparity pixel 105 to calculate a second candidate height T3. In the processing of step S622, the control unit 24 stores the calculated second candidate height and the pair of candidate coordinates in the memory 23 in association with each other. For example, the control unit 24 stores the second candidate height T3 illustrated in FIG. 29 and the coordinates ($u_3$, $v_{12}$) of the disparity pixel 105 as the pair of candidate coordinates in the memory 23 in association with each other. After executing the processing of step S622, the control unit 24 proceeds to the processing of step S623.

In the processing of step S623, the control unit 24 assigns a scan completion flag to the target disparity stored in the memory 23, which is acquired in the processing of step S604. After executing the processing of step S623, the control unit 24 returns to the processing of step S601 illustrated in FIG. 23.

In the processing of step S106, the control unit 24 executes a parallel-object detection process. The details of the processing of step S106 are illustrated in a flowchart illustrated in FIG. 31.

In the processing of step S701, the control unit 24 generates or acquires a UD map. The UD map is also referred to as a "U-disparity space" and a "u-d coordinate space". In the UD map, a target disparity is associated with a pair of two-dimensional coordinates formed by a u direction and a d direction corresponding to the magnitude of the disparity. The target disparity may be only the first disparity identified and detected as the disparity corresponding to the object. Alternatively, the target disparity may include both the first disparity and the second disparity. In the following, it is assumed that the target disparity includes the first disparity and the second disparity. The control unit 24 may acquire the first disparity and the second disparity stored in the memory 23 to generate the UD map. Alternatively, the control unit 24 may cause the acquisition unit 21 to acquire the UD map from the outside.

Figure 32:
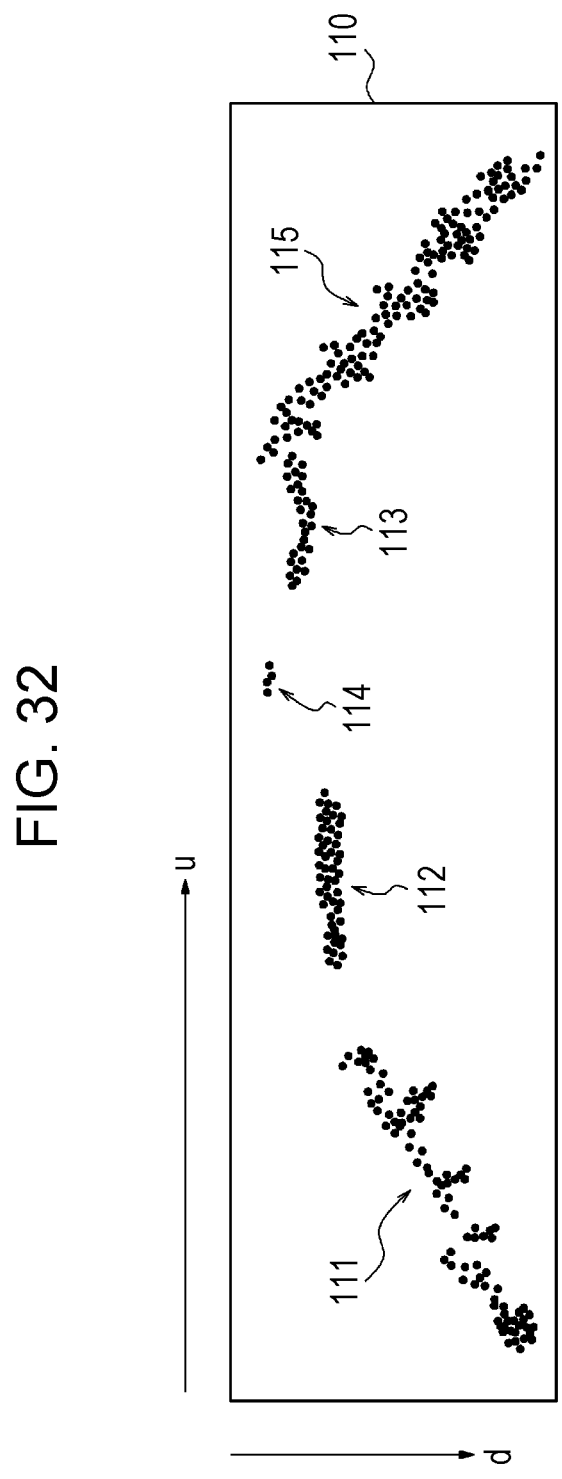
FIG. 32 is a diagram illustrating an example of a UD map.

FIG. 32 illustrates a UD map 110. The horizontal axis of the UD map 110 corresponds to the u axis. The vertical axis of the UD map 110 corresponds to a d axis representing the magnitude of the disparity. The coordinate system formed by the u coordinate and the d coordinate is also referred to as the "ud coordinate system". The lower left corner of the UD map 110 in FIG. 32 is the origin (0, 0) of the ud coordinate system. The dots on the plot illustrated in FIG. 32 are coordinate points associated with the first disparity and the second disparity detected in the process illustrated in FIG. 20. The coordinate points are also referred to simply as "points". The UD map 110 includes a point group 111, a point group 112, a point group 113, a point group 114, and a point group 115. The UD map 110 is generated on the basis of a second disparity image generated from a first image 120 illustrated in FIG. 33.

Figure 33:
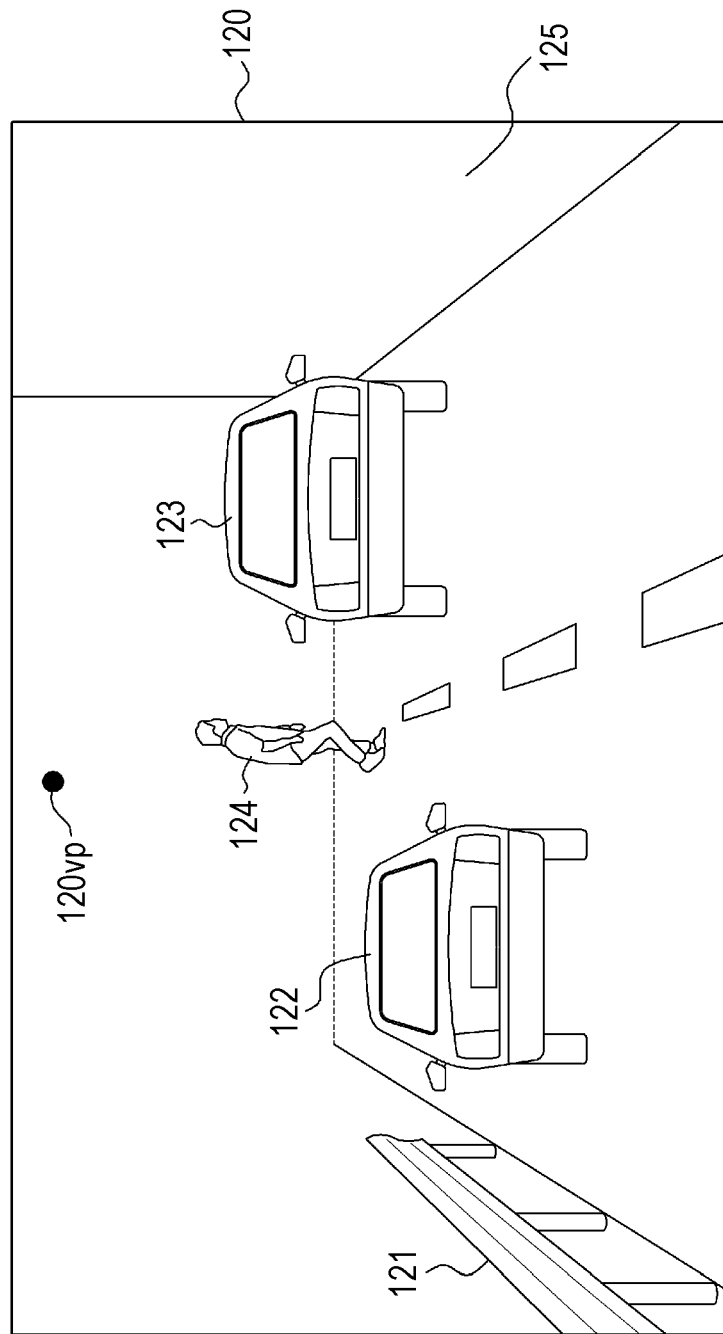
FIG. 33 is a first image corresponding to the UD map illustrated in FIG. 32.

As illustrated in FIG. 33, the first image 120 includes an image 121 corresponding to a guardrail, an image 122 and an image 123 corresponding to other vehicles, an image 124 corresponding to a pedestrian, and an image 125 corresponding to a side wall. The first disparity and the second disparity detected from the images 121 to 125 correspond to the point groups 111 to 115 illustrated in FIG. 32, respectively. The image 121 and the image 125 can be images corresponding to parallel objects. That is, the point group 111 and the point group 115 illustrated in FIG. 32 can be disparities corresponding to parallel objects. One of the purposes of the parallel-object detection process is to detect a disparity corresponding to a parallel object such as the point group 111 and the point group 115 illustrated in FIG. 32.

In this embodiment, a disparity corresponding to a parallel object such as the point group 111 and the point group 115 illustrated in FIG. 32 is detected by applying a Hough transform in the processing of step S704 described below. However, as illustrated in FIG. 32, the point group 112 and the point group 113 are located near the point group 111 and the point group 115. The point group 112 and the point group 113 located near the point group 111 and the point group 115 may reduce the accuracy of detection of the point group 111 and the point group 115 through the Hough transform in the processing of step S704 described below. Accordingly, in the processing of step S702, the control unit 24 determines whether, as illustrated in FIG. 32, the point group 112 and the point group 113 located near the point group 111 and the point group 115 are present.

Specifically, in the processing of step S702, the control unit 24 determines whether a point group that is substantially parallel to the u direction is present. As illustrated in FIG. 32, the point group 112 and the point group 113 located near the point group 111 and the point group 115 are disparities acquired from the images 122 and 123 corresponding to other vehicles illustrated in FIG. 33. The other vehicles include portions that are substantially parallel to the width direction of the road surface. Since the other vehicles include portions that are substantially parallel to the width direction of the road surface, as illustrated in FIG. 32, the point group 112 and the point group 113 may have shapes that are substantially parallel to the u direction. Accordingly, determining whether a point group that is substantially parallel to the u direction is present can determine whether the point group 112 and the point group 113 as illustrated in FIG. 32 are present.

As an example of the processing of step S702, first, the control unit 24 scans the UD map in the u direction. For example, the control unit 24 scans the UD map 110 illustrated in FIG. 32 from the negative direction side of the u axis to the positive direction side of the u axis. The control unit 24 determines, while scanning the UD map in the u direction, whether points continuously arranged in a predetermined range in the u direction are present. The predetermined range may be set on the basis of the length of an image of a vehicle (for example, the image 122 and the image 123 illustrated in FIG. 33) in the u direction. If it is determined that points continuously arranged in the predetermined range in the u direction are present, the control unit 24 determines that a point group that is substantially parallel to the u direction is present. The control unit 24 detects disparity points continuously arranged in a predetermined section in the u direction as a point group that is substantially parallel to the u direction. For example, the control unit 24 detects the point group 112 and the point group 113 illustrated in FIG. 32 as point groups that are substantially parallel to the u direction.

If it is determined in the processing of step S702 that a point group that is substantially parallel to the u direction is present (step S702: Yes), the control unit 24 proceeds to the processing of step S703. On the other hand, if it is determined that a point group that is substantially parallel to the u direction is not present (step S702: No), the control unit 24 proceeds to the processing of step S704.

Figure 34:
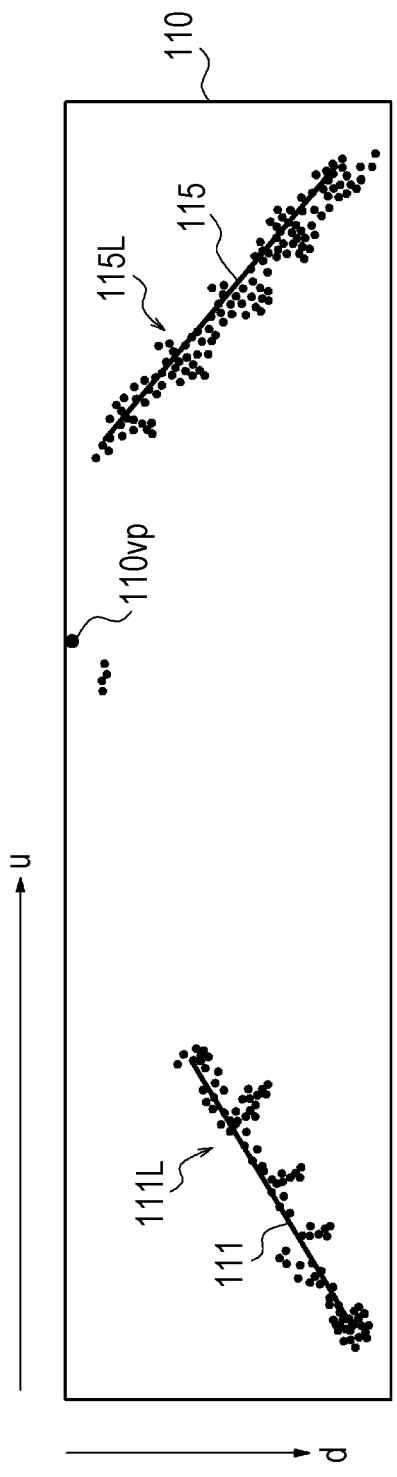
FIG. 34 is a diagram illustrating a UD map after a point group substantially parallel to a u direction is removed.

In the processing of step S703, the control unit 24 removes the detected point group that is substantially parallel to the u direction from the UD map. Instead of removing a point group that is substantially parallel to the u direction from the UD map, the control unit 24 may simply exclude a point group that is substantially parallel to the u direction among the coordinate points on the UD map from the application of a Hough transform in the processing of step S704 described below. FIG. 34 illustrates the UD map 110 after a point group that is substantially parallel to the u direction is removed. In the UD map 110 illustrated in FIG. 34, the point group 112 and the point group 113 illustrated in FIG. 32 have been removed.

In the processing of step S704, the control unit 24 applies a Hough transform to the points included in the UD map to detect a straight line. A straight line can be detected by converting the UD map into a real-space coordinate system formed by x-z coordinates and applying a Hough transform to the real-space coordinate system obtained as a result of the conversion. However, if the base length B between the first camera 11 and the second camera 12 is short, the intervals between the coordinate points included in the real-space coordinate system may be sparser than the intervals between the coordinate points included in the UD map. Sparse intervals between coordinate points may prevent accurate detection of a straight line by the Hough transform. In this embodiment, applying a Hough transform to the UD map makes it possible to accurately detect a straight line even if the base length B between the first camera 11 and the second camera 12 is short.

An example of the processing of step S704 will be described with reference to FIG. 35 and FIG. 36.

Figure 35:
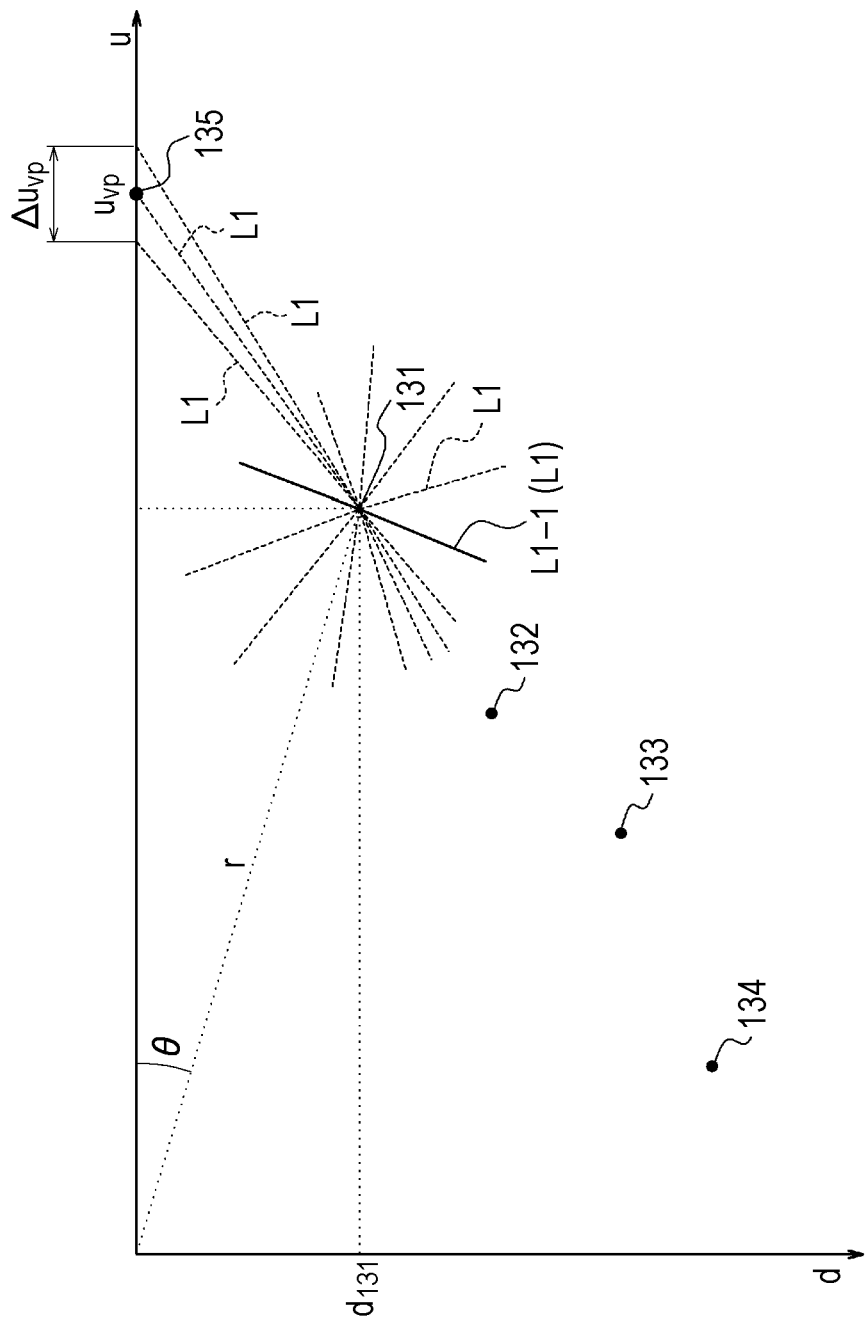
FIG. 35 is a diagram (part 1) describing the Hough transform.

FIG. 35 illustrates a portion of the UD map. Points 131, 132, 133, and 134 are coordinate points on the UD map. The Hough transform will be described using the point 131 as an example. The uv coordinates of the point 131 on the UD map are the coordinates ($u_{131}$, $d_{131}$). An infinity of straight lines L1 can pass through the point 131. For example, a line normal to a straight line L1-1 starting from the origin (0, 0) of the uv coordinates has a length r. The normal line is inclined by an angle θ from the u axis in the positive direction of the d axis. The control unit 24 sets the length r and the angle θ as variables to acquire Equation (3) below as a general expression of the straight lines L1 passing through the point 131.

$$r = u_{131} \times \cos\theta + d_{131} \times \sin\theta \quad (3)$$

Figure 36:
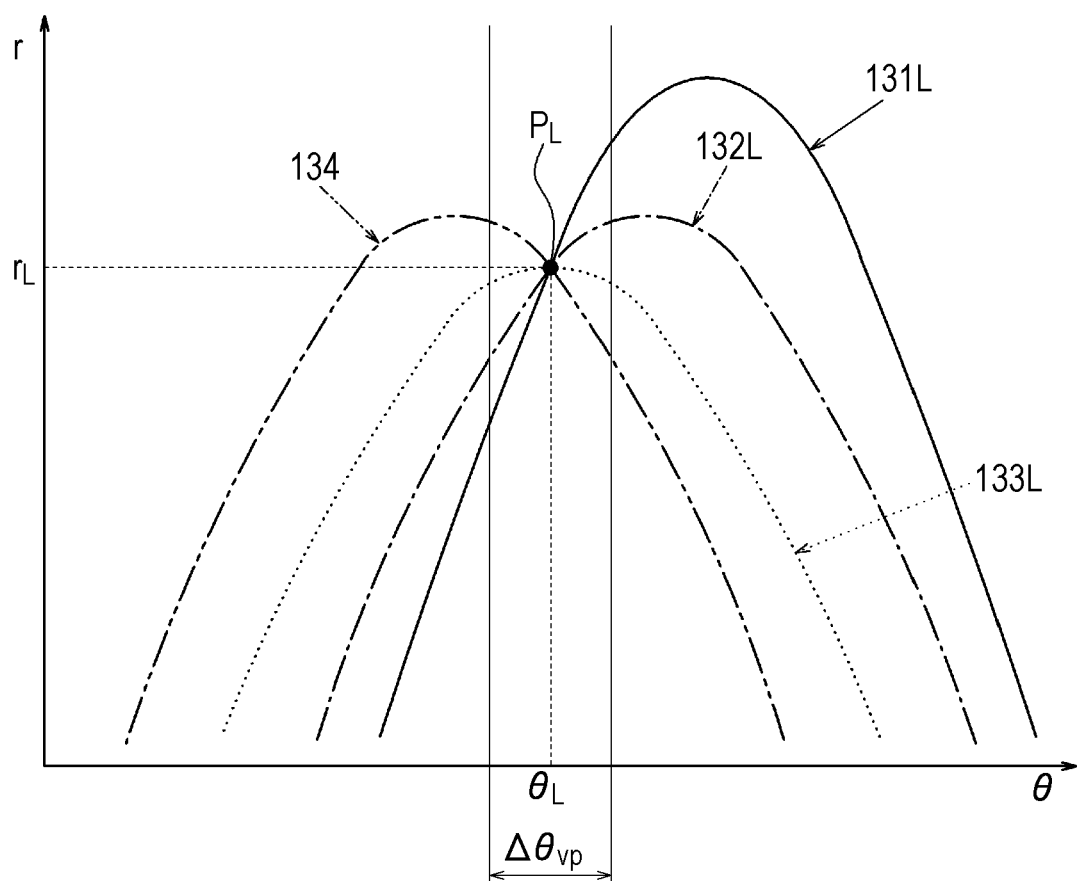
FIG. 36 is a diagram (part 2) describing the Hough transform.

The control unit 24 projects the equation of the straight lines L1 (Equation (3)) onto an rθ plane as illustrated in FIG. 36 as a Hough space. The horizontal axis of the rθ plane illustrated in FIG. 36 is the r axis. The vertical axis of the rθ plane illustrated in FIG. 36 is the θ axis. A curve 131L illustrated in FIG. 36 is a curve represented by Equation (3). The curve 131L is represented as a sinusoidal curve in the rθ plane. The control unit 24 acquires the equation of straight lines passing through the points 132 to 134 illustrated in FIG. 35 in a manner similar to that of the point 131. The control unit 24 projects the acquired equation of the straight lines passing through the points 132 to 134 onto the rθ plane as illustrated in FIG. 36 as a Hough space in a manner similar to that of the point 131. Curves 132L to 134L illustrated in FIG. 36 correspond to the acquired straight lines passing through the points 132 to 134 illustrated in FIG. 35, respectively. As illustrated in FIG. 36, the curves 131L to 134L can intersect at a point $P_L$. The control unit 24 acquires the rθ coordinates (coordinates ($\theta_L$, $r_L$)) of the point $P_L$. The control unit 24 detects an equation of a straight line passing through the points 131 to 134 illustrated in FIG. 35 on the basis of the coordinates ($\theta_L$, $r_L$) of the point $P_L$. The control unit 24 detects Equation (4) below as the straight line passing through the points 131 to 134 illustrated in FIG. 35.

$$r_L = u \times \cos\theta_L + d \times \sin\theta_L \quad (4)$$

By executing the processing of step S704, as illustrated in FIG. 34, the control unit 24 can detect a straight line 111L corresponding to the point group 111 and a straight line 115L corresponding to the point group 115.

As illustrated in FIG. 33, the image 121 and the image 125 corresponding to parallel objects extend toward a vanishing point $120_{VP}$. Since the image 121 and the image 125 extend toward the vanishing point $120_{VP}$, as illustrated in FIG. 34, the point group 111 and the point group 115 also extend toward a vanishing point $110_{VP}$ corresponding to the vanishing point $120_{VP}$. Since the point group 111 and the point group 115 also extend toward the vanishing point $110_{VP}$, the straight line 111L and the straight line 115L can also extend toward the vanishing point $110_{VP}$.

In the processing of step S704, accordingly, when acquiring an equation of straight lines passing through a point on the UD map, the control unit 24 may acquire an equation of a straight line passing through a predetermined range based on a vanishing point among the straight lines passing through the point. For example, when acquiring the straight lines L1 passing through the point 131 illustrated in FIG. 35, the control unit 24 may acquire an equation of a straight line passing through the point 131 and a predetermined range $\Delta u_{VP}$ among the infinity of straight lines L1 passing through the point 131. The predetermined range $\Delta u_{VP}$ is a range based on a vanishing point. The predetermined range $\Delta u_{VP}$ includes a point 135. The point 135 may be a vanishing point when the direction of travel of the mobile object 30 is straight. The d coordinate of the point 135 may be zero since the disparity at infinity is zero. The u coordinate (coordinate $u_{VP}$) of the point 135 may be one half the maximum coordinate of the u coordinate when the direction of travel of the mobile object 30 is straight, since the u coordinate of the vanishing point is one half the maximum coordinate of the u coordinate. The predetermined range $\Delta u_{VP}$ may be set as appropriate on the basis of the amount of deviation of the vanishing point $110_{VP}$ illustrated in FIG. 34 from the point 135 when the mobile object 30 is traveling on a curve. Through such processing, as illustrated in FIG. 36, the range of the θ axis within which the curves 131L to 134L are to be plotted in the rθ plane as the Hough space can be narrowed to a range $\Delta\theta_{VP}$. Since the range of the θ axis within which the curves 131L to 134L are to be plotted is narrowed to the range $\Delta\theta_{VP}$, the amount of arithmetic processing of the Hough transform can be reduced. The reduction in the amount of arithmetic processing of the Hough transform can increase the processing speed of the Hough transform.

In the processing of step S705, the control unit 24 determines whether the length of the straight line detected in the processing of step S704 exceeds a predetermined length. The predetermined length may be set as appropriate on the basis of the length of a structure located along the road surface, that is, a parallel object. If it is determined that the length of the straight line is less than or equal to the predetermined length (step S705: No), the control unit 24 returns to the processing of step S107 illustrated in FIG. 5. On the other hand, if it is determined that the length of the straight line exceeds the predetermined length (step S705: Yes), the control unit 24 assigns a parallel-object flag to the point group corresponding to the straight line (step S706). For example, the control unit 24 assigns the parallel-object flag to the point group 111 and the point group 115 illustrated in FIG. 34. After executing the processing of step S706, the control unit 24 proceeds to the processing of step S107 illustrated in FIG. 5.

In the processing of step S107, the control unit 24 executes a restoration process. The details of the processing of step S107 are illustrated in a flowchart illustrated in FIG. 37.

Figure 31:
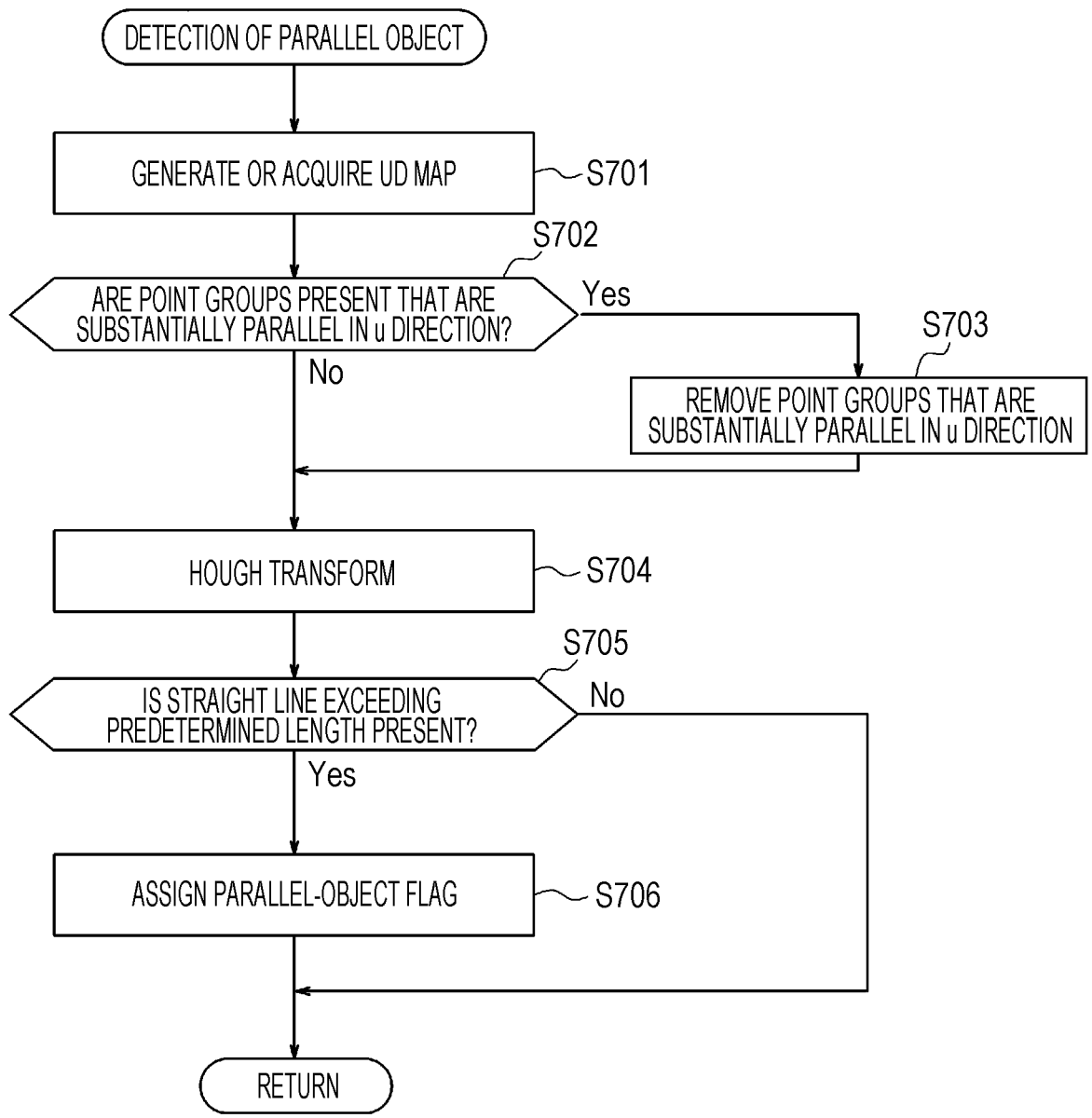
FIG. 31 is a flowchart illustrating an example of a parallel object detection process.

In the processing of step S801, the control unit 24 generates or acquires a UD map in a manner that is the same as or similar to the processing of step S701 illustrated in FIG. 31. If a UD map is generated in the processing of step S701 illustrated in FIG. 31, the control unit 24 may acquire the UD map generated in the processing of step S701 illustrated in FIG. 31.

Figure 38:
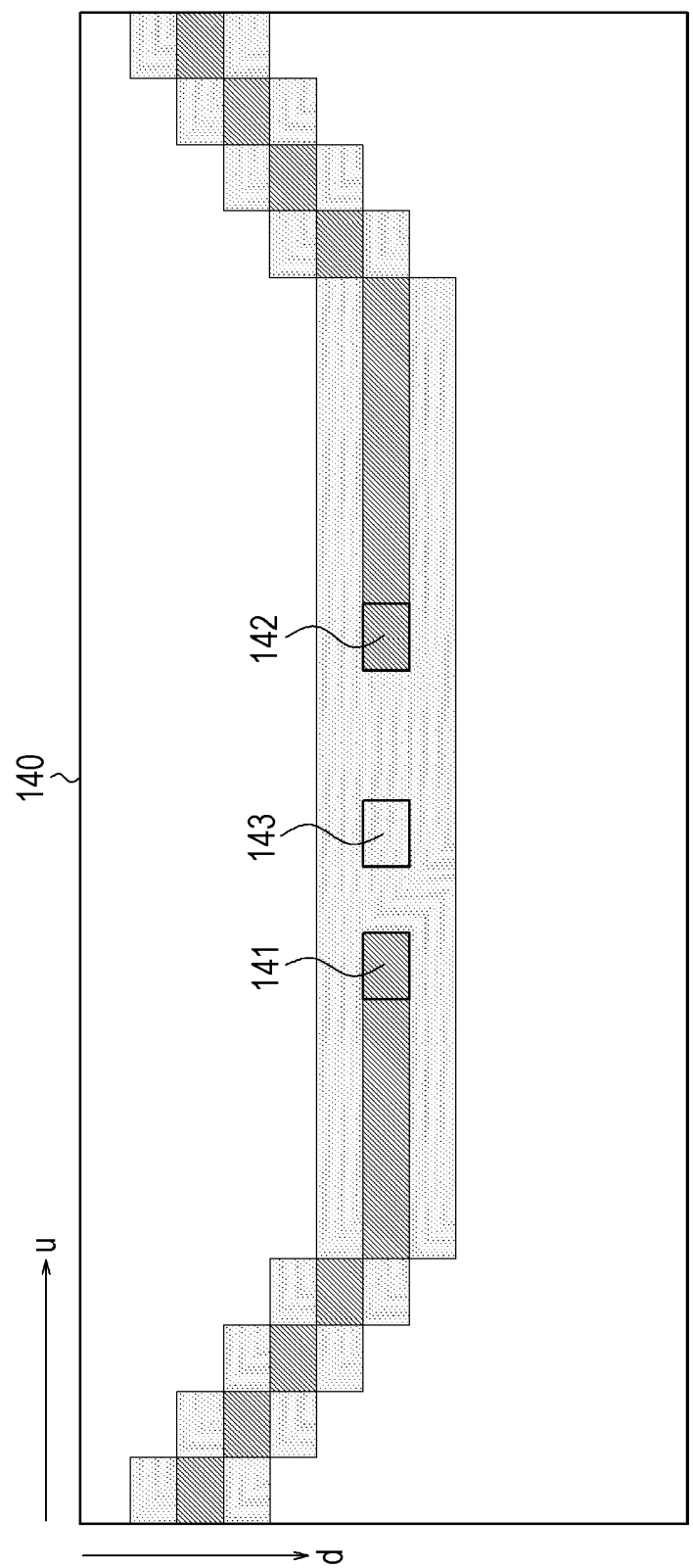
FIG. 38 is a diagram illustrating an example of a UD map.

FIG. 38 illustrates a UD map 140. The UD map 140 is an enlarged portion of the UD map 110 as illustrated in FIG. 34. The horizontal axis of the UD map 140 corresponds to the u axis. The vertical axis of the UD map 140 corresponds to the d axis representing the magnitude of the disparity. In FIG. 38, the UD map 140 is illustrated as an image. In the UD map 140, pixels represent disparities. Hatched pixels are pixels representing the first disparity. The pixels representing the first disparity, that is, the pairs of coordinates associated with the first disparity, are also referred to as "first disparity points". Dotted pixels are pixels representing the second disparity. The pixels representing the second disparity, that is, the pairs of coordinates associated with the second disparity, are also referred to as "second disparity points". The UD map 140 includes a first disparity point 141, a first disparity point 142, and a second disparity point 143. The UD map 140 is generated on the basis of a second disparity image including the disparity image corresponding to the rear surface of the vehicle. Due to the presence of the rear glass and the like, a center portion of the rear surface of the vehicle has a small number of features in the stereo image. Since the center portion of the rear surface of vehicle has a small number of features in the stereo image, the amount of disparity information that can be acquired may be smaller in the center portion of the rear surface than in the other portions, as in the disparity image 44 illustrated in FIG. 19. For example, as illustrated in FIG. 38, the second disparity point 143 is present between the first disparity point 141 and the first disparity point 142.

In the processing of step S802, the control unit 24 determines whether second disparity points between first disparity points are present beyond a predetermined range in the u direction of the UD map. For example, the control unit 24 scans the UD map from the negative direction side of the u axis to the positive direction side of the u axis. The control unit 24 scans in the u direction to determine whether second disparity points between first disparity points are present beyond a predetermined range in the u direction of the UD map. The predetermined range may be set as appropriate on the basis of the width (for example, 1 m) of the rear surface of the vehicle in the real space. If the second disparity points between the first disparity points are present beyond the predetermined range, these second disparity points may possibly be respective disparities corresponding to different objects such as different vehicles traveling together. In contrast, if the second disparity points between the first disparity points are present within the predetermined range, these second disparity points may possibly be disparities corresponding to the same object. In the u direction of the UD map 140 illustrated in FIG. 38, a second disparity points 143 between the first disparity point 141 and the first disparity point 142 are present within the predetermined range. In the u direction of the UD map 140, the control unit 24 does not determine that the second disparity point 143 between the first disparity point 141 and the first disparity point 142 is present beyond the predetermined range.

If it is determined in the processing of step S802 that the second disparity points between the first disparity points are present beyond the predetermined range in the u direction of the UD map (step S802: Yes), the control unit 24 proceeds to the processing of step S805. On the other hand, if it is not determined that the second disparity points between the first disparity points are present beyond the predetermined range in the u direction of the UD map (step S802: No), the control unit 24 proceeds to the processing of step S803.

In the processing of step S803, the control unit 24 acquires the respective first disparities associated with the two first disparity points between which the second disparity points are located. For example, the control unit 24 acquires a first disparity associated with the first disparity point 141 and a first disparity associated with the first disparity point 142 illustrated in FIG. 38. Further, in the processing of step S802, the control unit 24 determines whether the difference between the respective heights corresponding to the acquired two first disparities in the real space is within a predetermined height. For example, the control unit 24 determines whether the difference between the height corresponding to the first disparity of the first disparity point 141 illustrated in FIG. 38 in the real space and the height corresponding to the first disparity of the first disparity point 142 in the real space is less than or equal to a predetermined height. The predetermined height may be set as appropriate on the basis of the height (for example, 1 m) of the vehicle in the real space.

Figure 39:
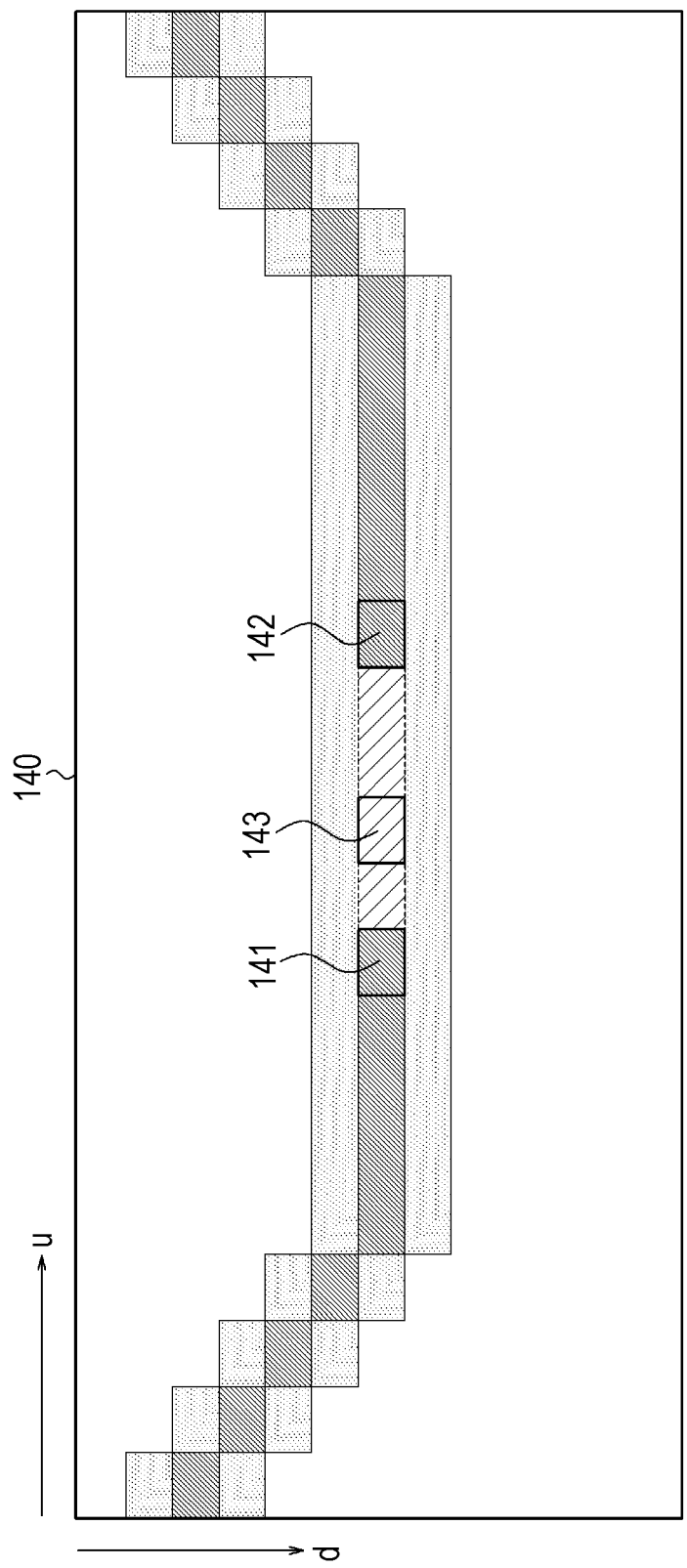
FIG. 39 is a diagram illustrating an example of a UD map assigned a restoration flag.

If it is determined in the processing of step S803 that the difference between the respective heights corresponding to the acquired two first disparities in the real space is within the predetermined height (step S803: Yes), the control unit 24 proceeds to the processing of step S804. In the processing of step S804, the control unit 24 assigns a restoration flag to second disparity points that are located between the first disparity points and that are beyond the predetermined range. As described above, the second disparity points are pairs of ud coordinates representing the second disparity. That is, the processing of step S804 can be translated to processing for assigning a restoration flag to a second disparity and a u coordinate associated with the second disparity. FIG. 39 illustrates the UD map 140 that is assigned the restoration flag. A coarsely hatched pixel illustrated in FIG. 39 is a second disparity point that is assigned the restoration flag.

If it is determined in the processing of step S803 that the difference between the respective heights corresponding to the acquired two first disparities in the real space exceeds the predetermined height (step S803: No), the control unit 24 proceeds to the processing of step S805.

Figure 25:
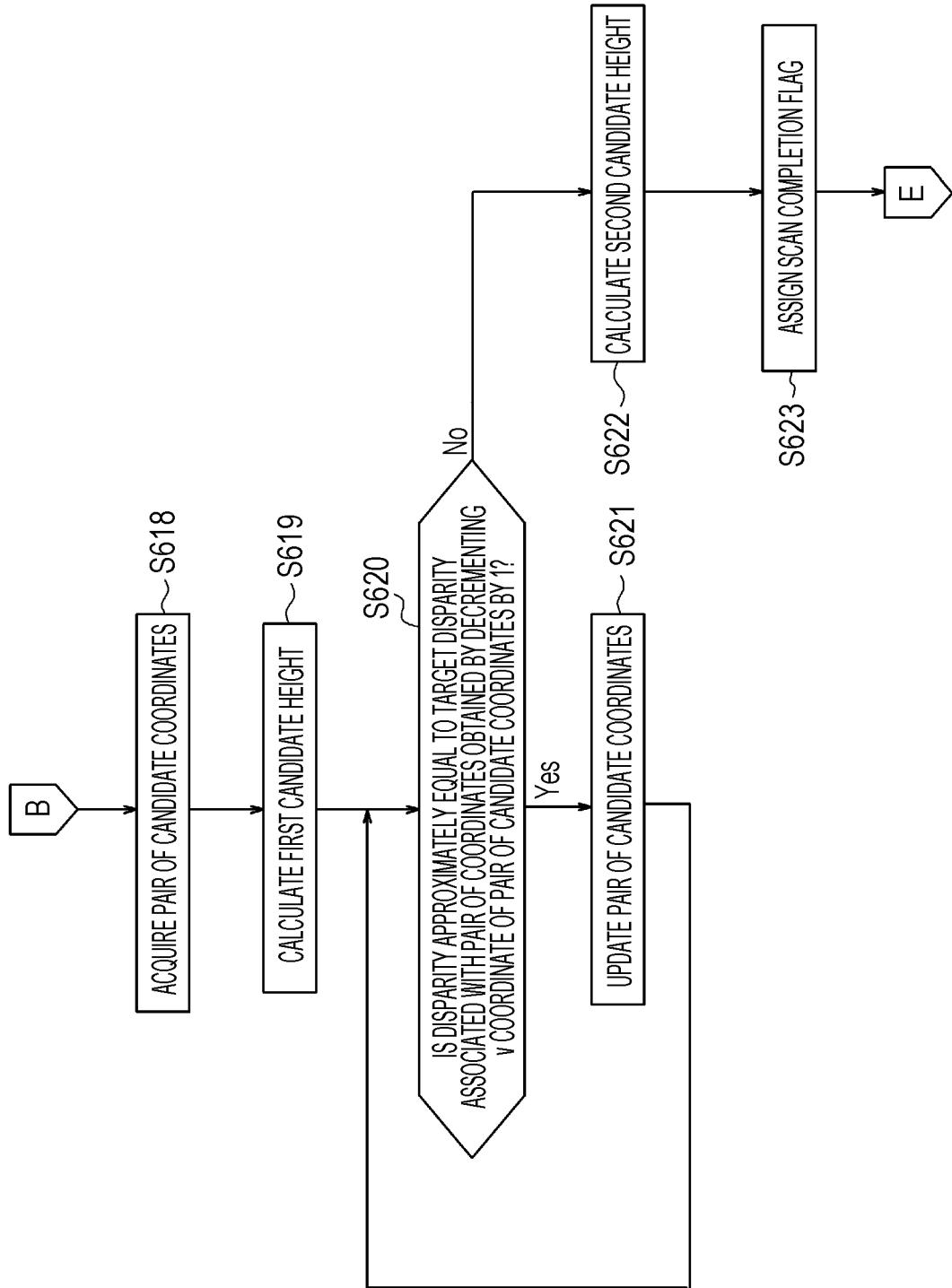
FIG. 25 is a flowchart (part 3) illustrating an example of the object height calculation process.

The processing after step S805 is processing for determining which of the first candidate height calculated in the processing of step S619 illustrated in FIG. 25 and the second candidate height calculated in the processing of step S622 illustrated in FIG. 25 is to be acquired as the height of the object. Prior to the description of the processing after step S805, a description will be given of an example second disparity image with reference to FIG. 40 and FIG. 41.

Figure 40:
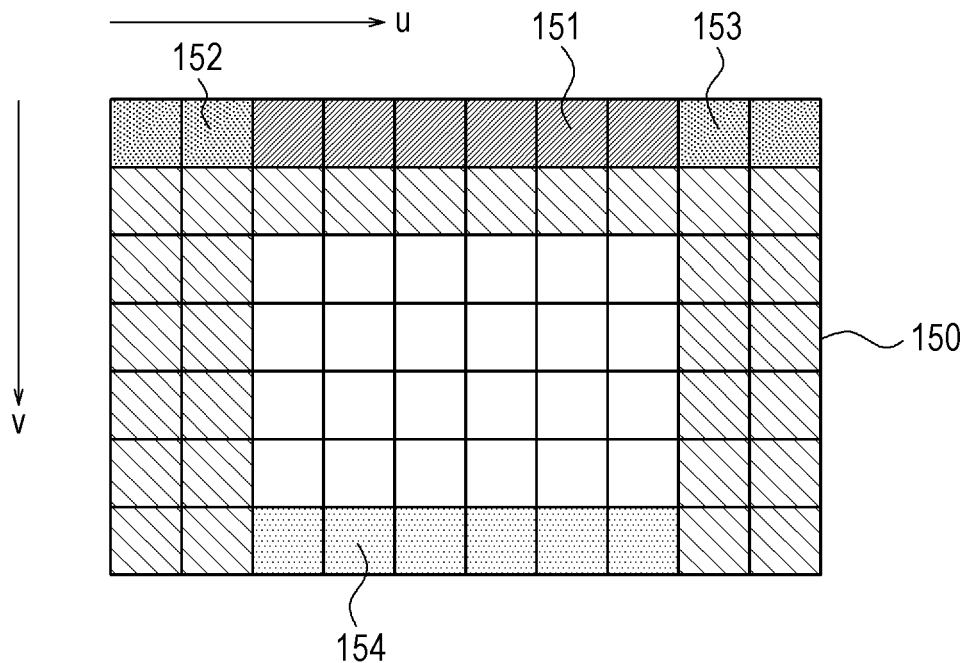
FIG. 40 is a diagram illustrating an example of a second disparity image.
Figure 41:
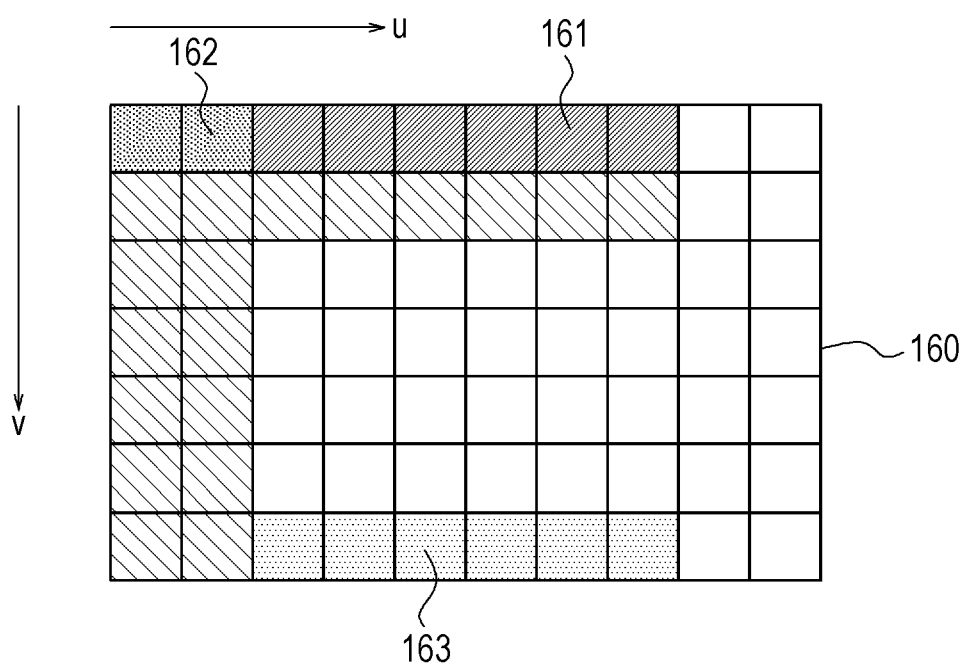
FIG. 41 is a diagram illustrating an example of a second disparity image.

FIG. 40 illustrates a second disparity image 150. FIG. 41 illustrates a second disparity image 160. FIG. 40 and FIG. 41 illustrate portions of the second disparity image 150 and the second disparity image 160. In the second disparity image 150 and the second disparity image 160, a white disparity pixel is a pixel including no disparity information. A coarsely hatched disparity pixel is a pixel including disparity information. A finely hatched disparity pixel is a disparity pixel used for calculating the second candidate height in the processing of step S622 illustrated in FIG. 25. The pair of coordinates of a finely hatched disparity pixel is associated with the second candidate height as a pair of candidate coordinates in the processing of step S622 illustrated in FIG. 25. A coarsely dotted disparity pixel is a disparity pixel used for calculating the first candidate height in the processing of step S619 illustrated in FIG. 25. The pair of coordinates of a coarsely dotted disparity pixel is associated with the first candidate height as the first pair of coordinates in the processing of step S619 illustrated in FIG. 25. A finely dotted disparity pixel is a disparity pixel used for calculating the height of the object in the processing of step S616 illustrated in FIG. 24. The pair of coordinates of a finely dotted disparity pixel is associated with the height of the object as the first pair of coordinates in the processing of step S616 illustrated in FIG. 24.

Figure 30:
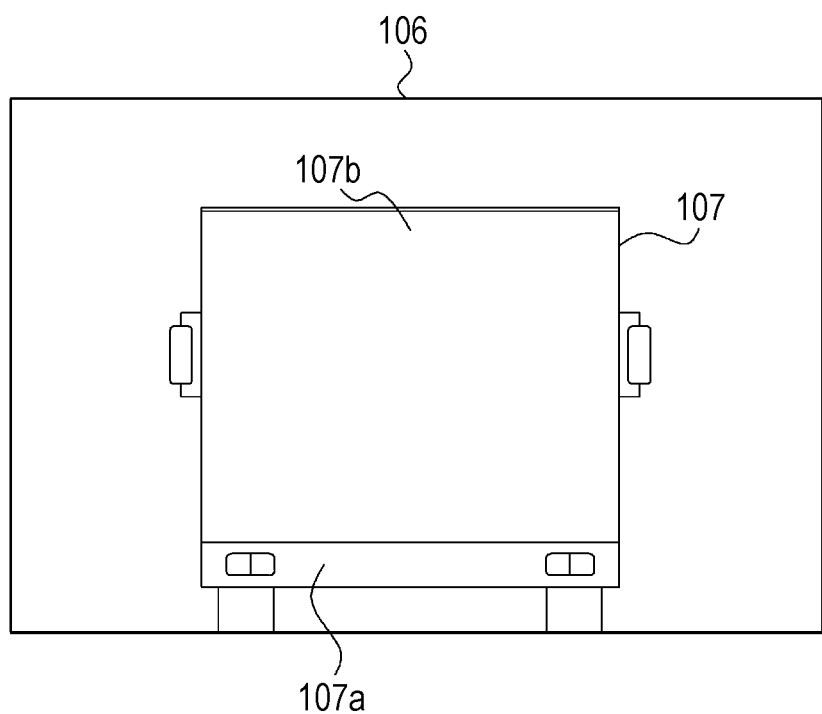
FIG. 30 is a first image corresponding to the second disparity image illustrated in FIG. 29.

Like the second disparity image 100 illustrated in FIG. 29, the second disparity image 150 illustrated in FIG. 40 is generated on the basis of the image 107 of the rear surface of the truck illustrated in FIG. 30. A center portion of the second disparity image 150 includes white disparity pixels. That is, no disparity is calculated for the disparity pixels in the center portion of the second disparity image 150. Disparities are calculated for the disparity pixels surrounding the center portion of the second disparity image 150.

The second disparity image 150 illustrated in FIG. 40 includes disparity pixels 151, 152, 153, and 154. The disparity pixel 151 is a disparity pixel used for calculating the second candidate height. The pair of coordinates of the disparity pixel 151 is associated with the second candidate height as a pair of candidate coordinates. The disparity pixel 152 and the disparity pixel 153 are disparity pixels used for calculating the height of the object. Each of the pairs of coordinates of the disparity pixel 152 and the disparity pixel 153 is associated with the height of the object as a first pair of coordinates. The disparity pixel 154 is a disparity pixel used for calculating the first candidate height. The pair of coordinates of the disparity pixel 154 is associated with the first candidate height as a first pair of coordinates.

Like the disparity pixel 105 illustrated in FIG. 29, the disparity pixel 151 corresponds to the upper image 107b of the image 107 of the rear surface of the truck illustrated in FIG. 30. Like the disparity pixel 103 illustrated in FIG. 29, the disparity pixel 154 corresponds to the lower image 107a of the image 107 of the rear surface of the truck illustrated in FIG. 30. In the configuration illustrated in FIG. 40, it is required that, among the second candidate height based on the disparity pixel 151 and the first candidate height based on the disparity pixel 154, the second candidate height based on the disparity pixel 151 be acquired as the height of the object, that is, the height of the truck illustrated in FIG. 30.

Figure 42:
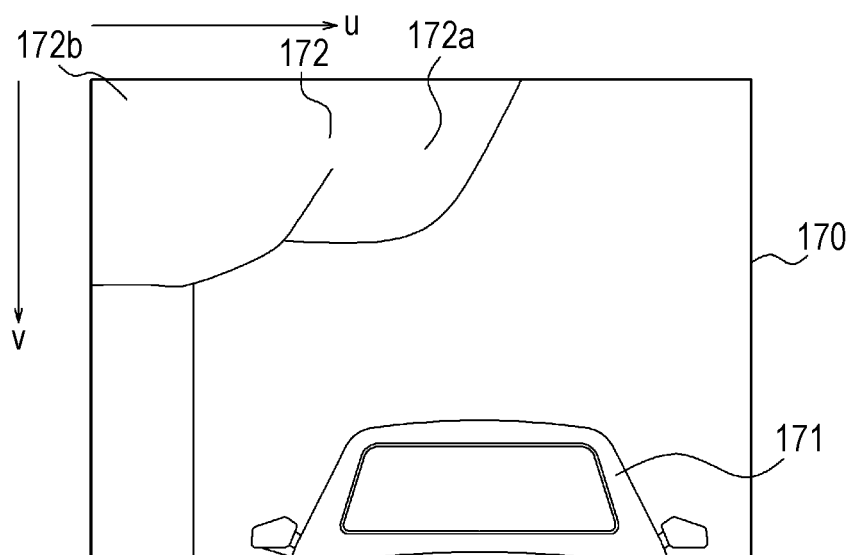
FIG. 42 is a diagram illustrating a first image corresponding to the second disparity image illustrated in FIG. 41.

The second disparity image 160 illustrated in FIG. 41 is a disparity image generated on the basis of a first image 170 illustrated in FIG. 42. The first image 170 includes an image 171 of an upper portion of another vehicle, and an image 172 corresponding to a roadside tree. Disparities generated from the image 171 and the image 172 are approximately equal to each other. The image 172 includes a sub-image 172a and a sub-image 172b. The sub-image 172a and the image 171 of the vehicle are located in a center portion of the first image 170 in the u direction. The u coordinate of the sub-image 172a is the same as the u coordinate of a portion of the image 171 of the other vehicle. The sub-image 172a is closer to the negative direction side of the v axis than the image 171 of the other vehicle. The sub-image 172b is closer to the negative direction side of the u axis than the sub-image 172a and the image 171.

The second disparity image 160 illustrated in FIG. 41 includes a disparity pixel 161, a disparity pixel 162, and a disparity pixel 163. The disparity pixel 161 is a disparity pixel used for calculating the second candidate height. The pair of coordinates of the disparity pixel 161 is used to calculate the height of the sub-image 172a of the roadside tree illustrated in FIG. 42 as the second candidate height. The pair of coordinates of the disparity pixel 161 is associated with the second candidate height as a pair of candidate coordinates. The disparity pixel 162 is a disparity pixel used for calculating the height of the object. The pair of coordinates of the disparity pixel 162 is used to calculate the height of the sub-image 172b of the roadside tree illustrated in FIG. 42 as the height of the object. The pair of coordinates of the disparity pixel 162 is associated with the height of the object as a pair of candidate coordinates. The disparity pixel 163 is a disparity pixel used for calculating the first candidate height. The pair of coordinates of the disparity pixel 163 is used to calculate the height of the image 171 of the vehicle illustrated in FIG. 42 as the first candidate height. The pair of coordinates of the disparity pixel 163 is associated with the first candidate height as the first pair of coordinates.

In the configuration illustrated in FIG. 41, it is required that, among the first candidate height based on the disparity pixel 163 and the second candidate height based on the disparity pixel 161, the first candidate height based on the disparity pixel 163 be acquired as the height of the object, that is, the height of the image 171 of the vehicle illustrated in FIG. 42.

In the processing of steps S805 to S807, the control unit 24 determines, based on the disparities associated with two pairs of coordinates between which the pair of candidate coordinates is located, which of the first candidate height and the second candidate height is to be acquired as the height of the object.

Specifically, in the processing of step S805, the control unit 24 scans the second disparity image in the u direction to determine whether two first pairs of coordinates between which a pair of candidate coordinates is located are present in the u direction. As described above, the first pair of coordinates is associated with a disparity approximately equal to the target disparity, as described above with reference to FIG. 23. That is, the processing of step S805 can be translated to processing for determining whether the respective disparities associated with two pairs of coordinates between which the pair of candidate coordinates is located in the u direction are target disparities.

For example, in the u direction of the second disparity image 150 illustrated in FIG. 40, the pair of candidate coordinates of the disparity pixel 151 is located between the first pair of coordinates of the disparity pixel 152 and the first pair of coordinates of the disparity pixel 153. In the configuration illustrated in FIG. 40, the control unit 24 determines that the first pair of coordinates of the disparity pixel 152 and the first pair of coordinates of the disparity pixel 153 between which the pair of candidate coordinates of the disparity pixel 151 is located are present.

For example, in the u direction of the second disparity image 160 illustrated in FIG. 41, the first pair of coordinates of the disparity pixel 162 is located on the negative direction side of the u axis with respect to the pair of candidate coordinates of the disparity pixel 161. In contrast, no first pair of coordinates is located on the positive direction side of the u axis with respect to the pair of candidate coordinates of the disparity pixel 161. In the configuration illustrated in FIG. 41, the control unit 24 determines that two first pairs of coordinates between which the pair of candidate coordinates of the disparity pixel 161 is located are not present.

If it is determined in the processing of step S805 that two first pairs of coordinates between which a pair of candidate coordinates is located are present in the u direction of the second disparity image (step S805: Yes), the control unit 24 proceeds to the processing of step S806. On the other hand, if it is not determined that two first pairs of coordinates between which a pair of candidate coordinates is located are present in the u direction of the second disparity image (step S805: No), the control unit 24 proceeds to the processing of step S807.

Figure 43:
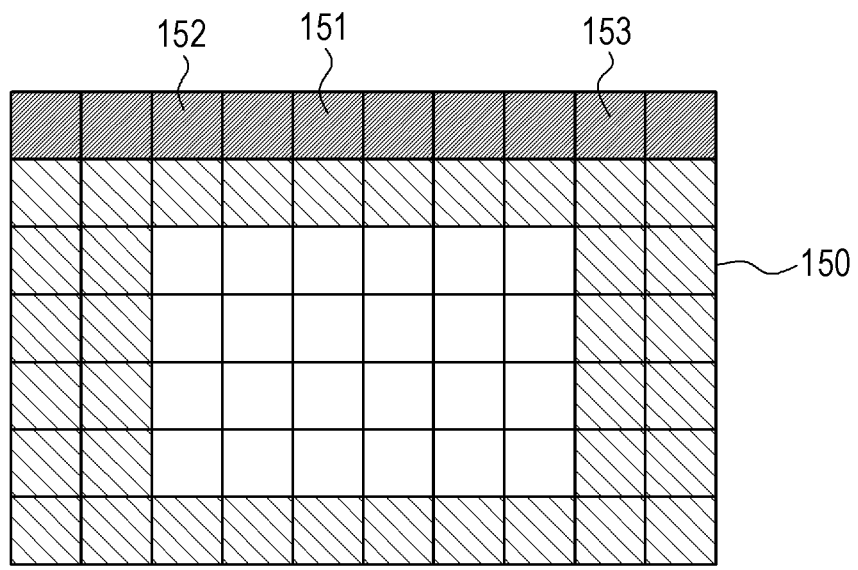
FIG. 43 is a diagram illustrating disparity pixels used for object height determination in the second disparity image illustrated in FIG. 40.

In the processing of step S806, the control unit 24 determines that the second candidate height among the first candidate height and the second candidate height is to be acquired as the height of the object. Through the processing of steps S805 and S806, if it is determined that the respective disparities associated with two pairs of coordinates between which the candidate coordinates is located are target disparities, the control unit 24 determines that the second candidate height is to be acquired as the height of the object. For example, the control unit 24 determines that, among the first candidate height based on the pair of coordinates of the disparity pixel 154 and the second candidate height based on the pair of coordinates of the disparity pixel 151 illustrated in FIG. 40, the second candidate height based on the pair of coordinates of the disparity pixel 151 is to be acquired as the height of the object. FIG. 43 illustrates disparity pixels used for object height determination in the second disparity image 150 illustrated in FIG. 40. In FIG. 43, the height of the object is calculated on the basis of the pairs of coordinates of the finely hatched disparity pixels. As illustrated in FIG. 43, the second candidate height based on the disparity pixel 151 among the second candidate height based on the disparity pixel 151 and the first candidate height based on the disparity pixel 154 is acquired as the height of the object, that is, the height of the truck illustrated in FIG. 30.

Figure 44:
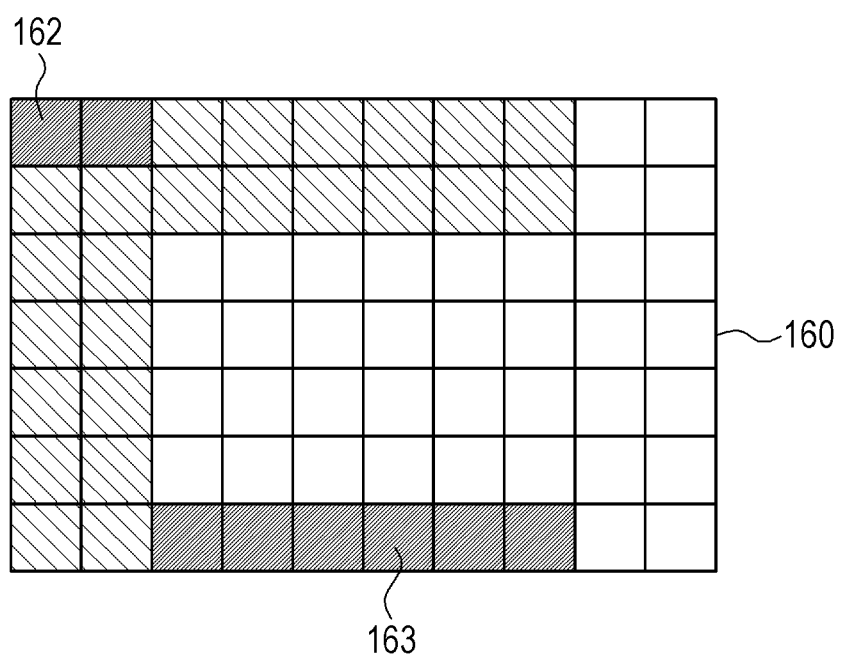
FIG. 44 is a diagram illustrating disparity pixels used for object height determination in the second disparity image illustrated in FIG. 41.

In the processing of step S807, the control unit 24 determines that the first candidate height among the first candidate height and the second candidate height is to be acquired as the height of the object. Through the processing of steps S805 and S807, if it is not determined that the respective disparities associated with two pairs of coordinates between which the pair of candidate coordinates is located are target disparities, the control unit 24 determines that the first candidate height is to be acquired as the height of the object. For example, the control unit 24 determines that, among the first candidate height based on the pair of coordinates of the disparity pixel 163 and the second candidate height based on the pair of coordinates of the disparity pixel 161 illustrated in FIG. 41, the first candidate height based on the pair of coordinates of the disparity pixel 163 is to be acquired as the height of the object. FIG. 44 illustrates disparity pixels used for object height determination in the second disparity image 160 illustrated in FIG. 41. In FIG. 44, the height of the object is calculated on the basis of the coordinates of the finely hatched disparity pixels. As illustrated in FIG. 44, the first candidate height based on the disparity pixel 163 among the first candidate height based on the disparity pixel 163 and the second candidate height based on the disparity pixel 161 is acquired as the height of the object, that is, the height of the image 171 of the vehicle illustrated in FIG. 42.

After executing the processing of steps S806 and S807, the control unit 24 proceeds to the processing of step S108 illustrated in FIG. 5.

Figure 45:
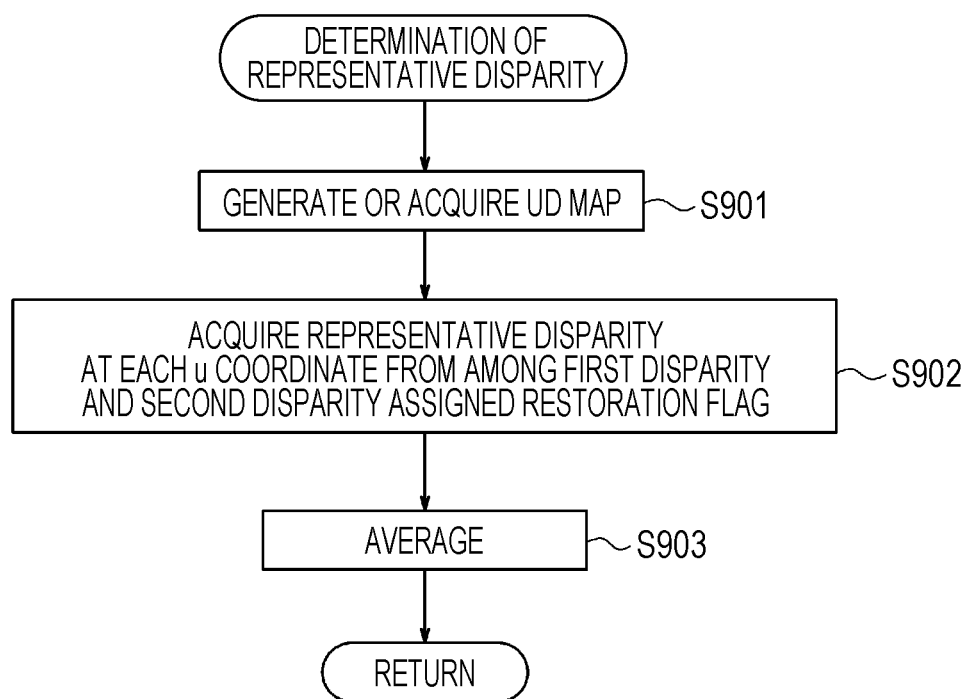
FIG. 45 is a flowchart illustrating an example of a representative disparity determination process.

In the processing of step S108, the control unit 24 executes a process of determining a representative disparity. The details of the processing of step S108 are illustrated in a flowchart illustrated in FIG. 45.

In the processing of step S901, the control unit 24 generates a UD map in a manner that is the same as or similar to that in the processing of step S701 illustrated in FIG. 31. If a UD map is generated in the processing of step S701 illustrated in FIG. 31, the control unit 24 may acquire the UD map generated in the processing of step S701 illustrated in FIG. 31.

Figure 37:
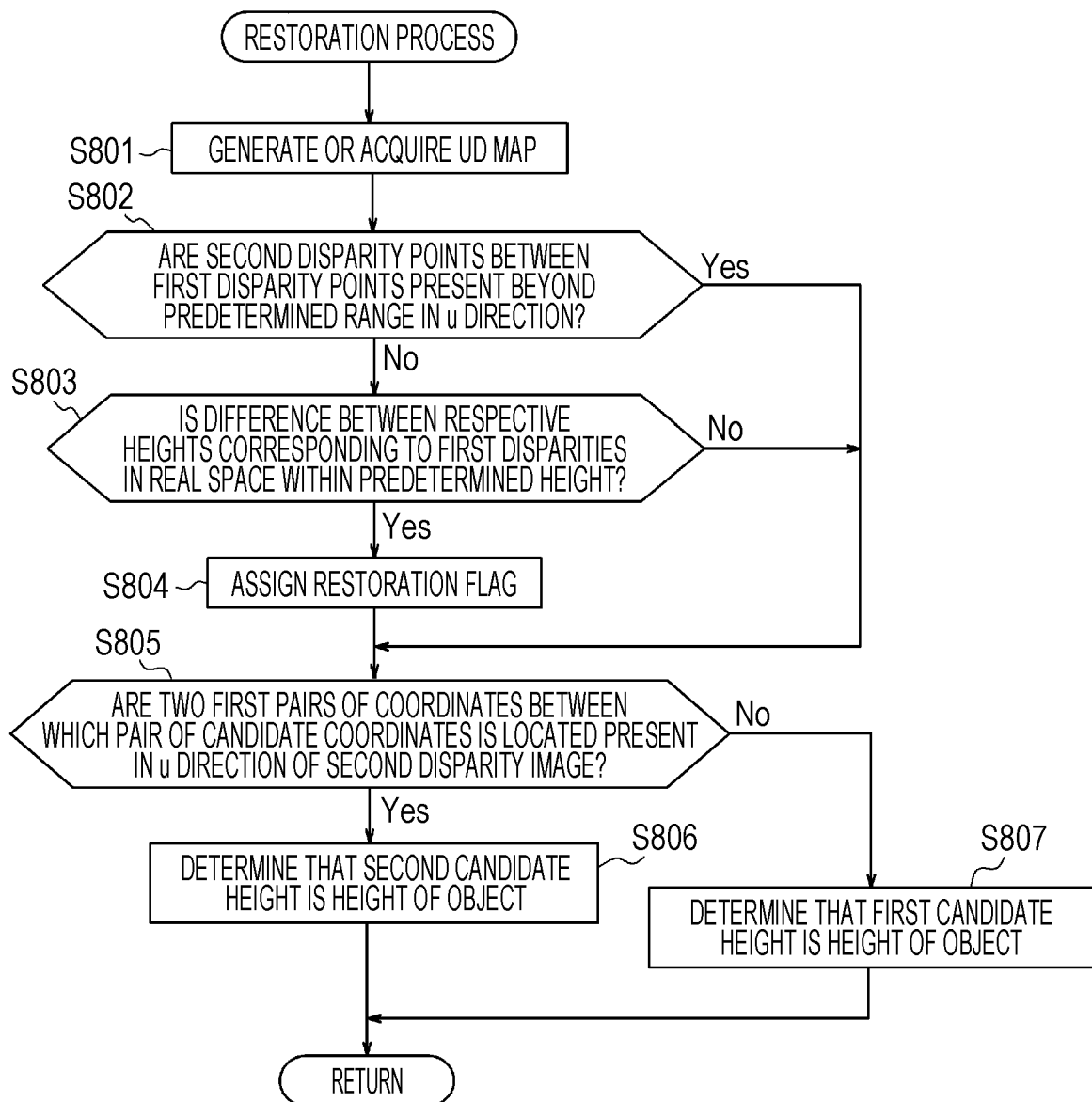
FIG. 37 is a flowchart illustrating an example of a restoration process.

In the processing of step S902, the control unit 24 acquires, at each u coordinate on the UD map, a representative disparity from among the first disparity and the second disparity assigned the restoration flag in the processing of step S804 illustrated in FIG. 37. The control unit 24 acquires a representative disparity from among the first disparity and the second disparity assigned the restoration flag, which are not assigned the parallel-object flag in the processing of step S706 illustrated in FIG. 31.

When the distance from the stereo camera 10 to the object is short, the number of pixels occupied by the object in the stereo image can be larger than that when the distance from the stereo camera 10 to the object is long. In addition, since an object at a distance farther from the stereo camera 10 is more susceptible to noise or the like, the accuracy of detection of the disparity corresponding to the object deteriorates. That is, the disparity corresponding to an object at a distance closer to the stereo camera 10 can be more accurately detected.

In the processing of step S902, accordingly, the control unit 24 acquires, at each u coordinate on the UD map, the disparity corresponding to an object at a distance close to the stereo camera 10, that is, the maximum disparity, from among the first disparity and the second disparity assigned the restoration flag, as a representative disparity. Further, the control unit 24 may acquire, as a representative disparity, the disparity corresponding to an object that is located at a distance close to the stereo camera 10 and that is larger than the minimum value (for example, 50 cm) of the height of the object to be detected by the object detection device 20.

Figure 46:
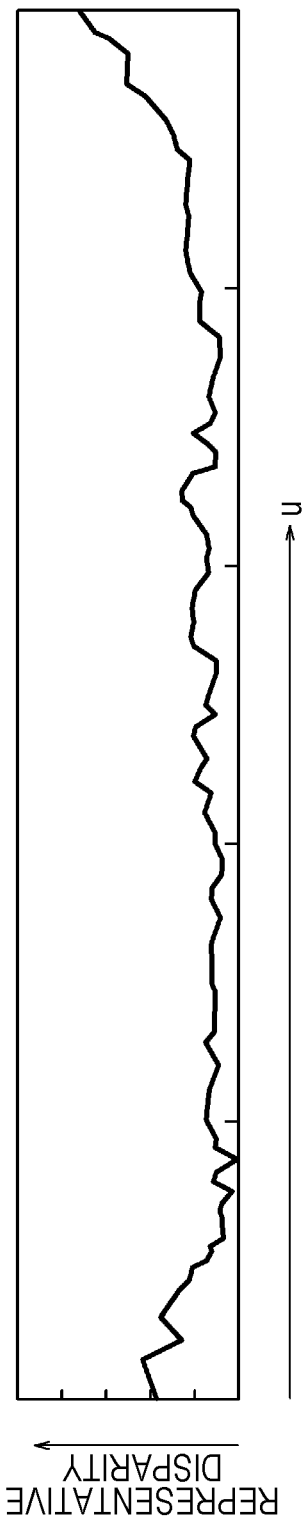
FIG. 46 illustrates an example of acquired representative disparities corresponding to the u direction.

FIG. 46 illustrates an example of the acquired representative disparities corresponding to the u direction. In the example illustrated in FIG. 46, the variation of the representative disparities with respect to the respective u coordinates is large. The large variation of the representative disparities with respect to the respective u coordinates may increase the amount of arithmetic processing of the grouping process in the processing of step S109.

Figure 47:
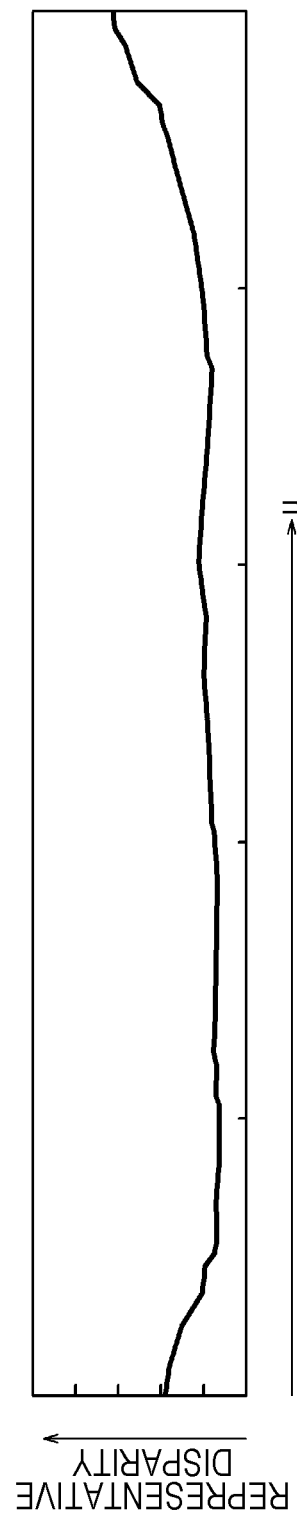
FIG. 47 illustrates an example of averaged representative disparities corresponding to the u direction.

In the processing of step S903, accordingly, the control unit 24 may average the representative disparities in a predetermined range. Averaging the representative disparities in a predetermined range may decrease the amount of arithmetic processing of the grouping process in the processing of step S109. The predetermined range may be set as appropriate in consideration of the computation load or the like of the processing of step S109 or the like described below. In averaging, the control unit 24 may acquire a representative disparity representing a median value of the predetermined range. The control unit 24 may remove, within the predetermined range, a representative disparity deviated by a predetermined percentage (for example, 5%) from the extracted median value and then calculate an average value of the resulting representative disparities. FIG. 47 illustrates an example of the averaged representative disparities corresponding to the u direction. After executing the processing of step S903, the control unit 24 proceeds to the processing of step S109 illustrated in FIG. 5.

Figure 48:
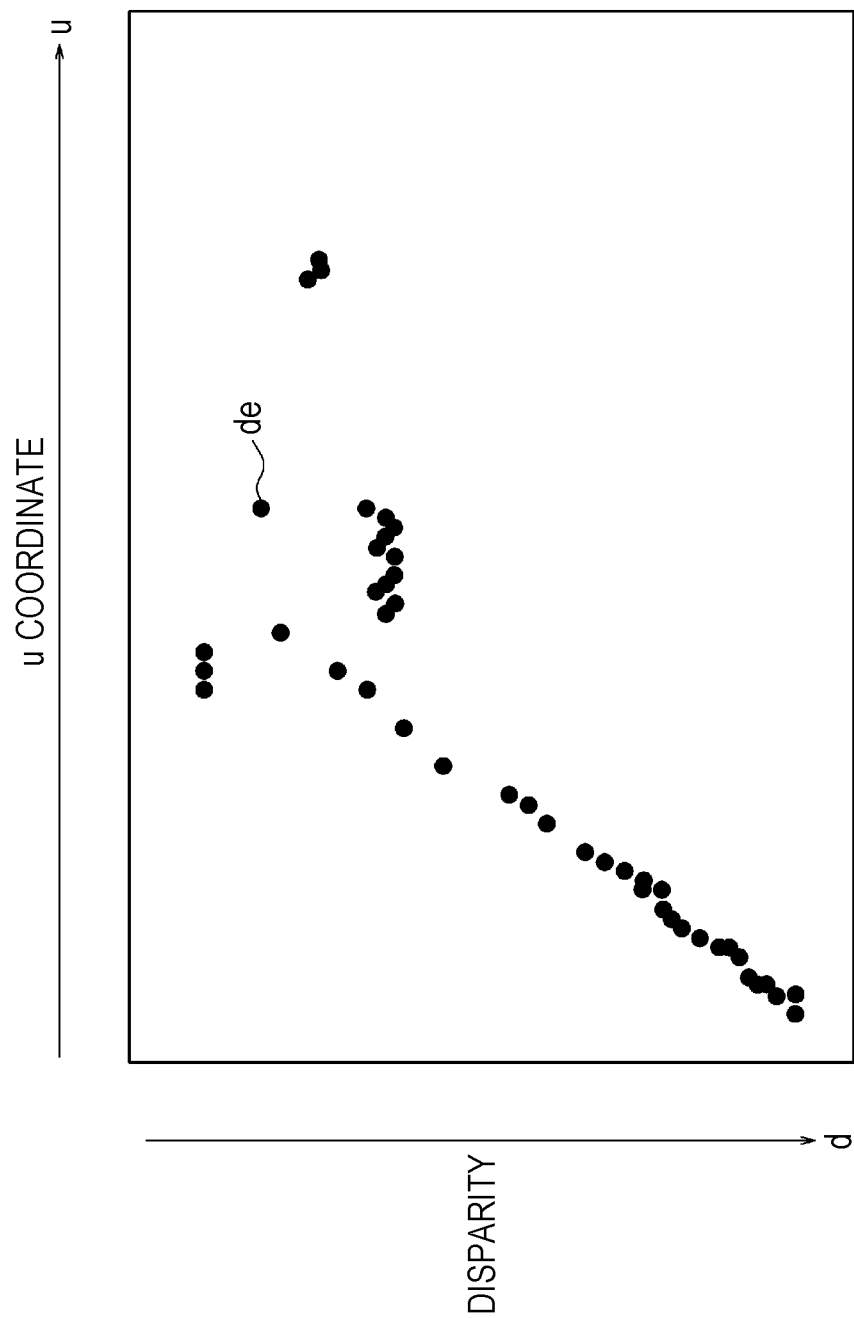
FIG. 48 is a diagram illustrating an example of a distribution, in a UD map, of point groups indicating representative disparities.

After executing the processing of steps S104 to S108 illustrated in FIG. 5, that is, the third process, the control unit 24 may store, for each predetermined range of the coordinate in the transverse direction (u coordinate) including one or more coordinates, representative disparities $d_e$ and object height information in the memory 23 in association with each other. As illustrated in FIG. 48, the plurality of representative disparities $d_e$ stored in the memory 23 can be represented as a distribution of point groups lying in a two-dimensional space (u-d coordinate space) with the horizontal axis and the vertical axis representing the u coordinate and the disparity d, respectively.

In the processing of step S109, the control unit 24 executes a process (fourth process) for converting the information on the representative disparities $d_e$ in the u-d coordinate space into the real-space coordinate system formed by the x-z coordinates and extracting a collection (group) of the representative disparities $d_e$ to detect an object. An example of the processing of step S109 will be described with reference to FIG. 49 and FIG. 50.

Figure 49:
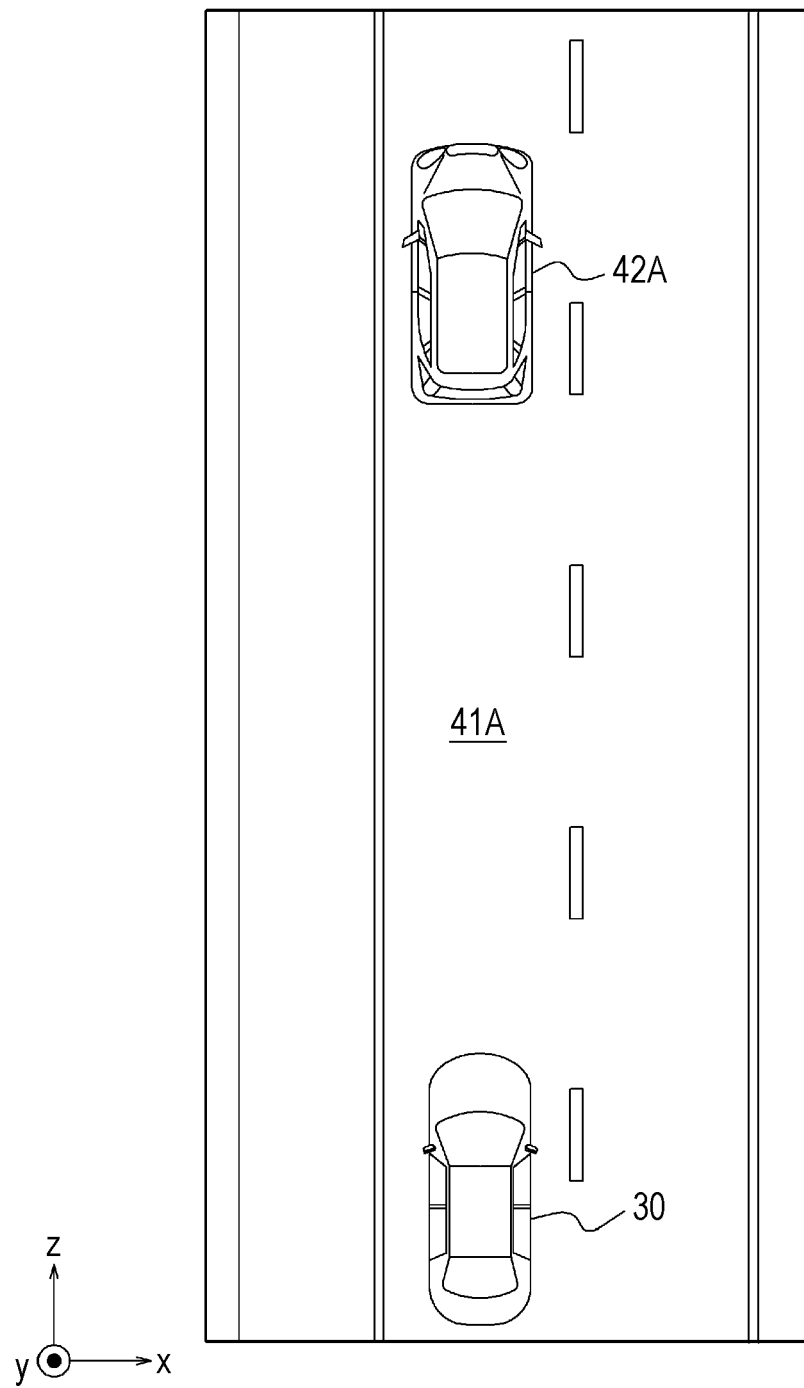
FIG. 49 is a view of the road surface as viewed from a height direction (y direction).

FIG. 49 illustrates an example configuration in the real space. FIG. 49 illustrates the mobile object 30 traveling on the road surface 41A of the road and having mounted therein the object detection system 1, and another vehicle 42A. In FIG. 49, the mobile object 30 is a vehicle.

Figure 50:
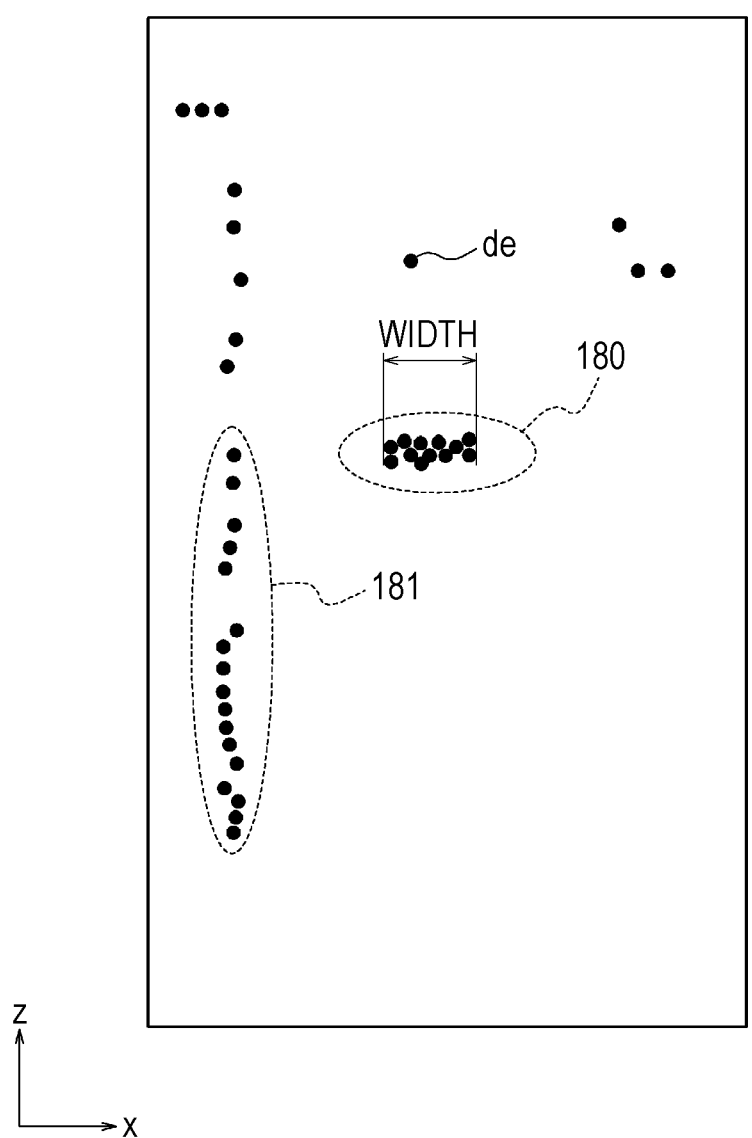
FIG. 50 is a diagram of converted point groups indicating representative disparities and lying on an x-z plane in a real space.

The control unit 24 of the object detection device 20 mounted in the mobile object 30 converts the plurality of representative disparities $d_e$ in the u-d coordinate space as illustrated in FIG. 48 into point groups in the real space (x-z coordinate space) as illustrated in FIG. 50. In FIG. 50, respective points representing the representative disparities $d_e$ in the u-d coordinate space are displayed as points in the x-z coordinate space. The control unit 24 extracts a collected point group on the basis of a distribution of the point groups. The control unit 24 collects a plurality of points that are close to each other in accordance with a predetermined condition and extracts the collected points as a collected point group. The collected point group represents a collection (group) of representative disparities $d_e$.

When the object has a surface parallel to the base-length direction of the stereo camera 10, the point groups are arranged in the x direction in the x-z coordinate space. When a collected point group 180 is arranged in the x direction in the x-z coordinate space, the control unit 24 can recognize the collected point group 180 as an object. In FIG. 50, the collected point group 180 corresponds to the rear surface of the body of the other vehicle 42A illustrated in FIG. 49.

When the object is a parallel object, the point groups are arranged in the z direction in the x-z coordinate space. When a collected point group 181 is arranged in the z direction in the x-z coordinate space, the control unit 24 can recognize the collected point group 181 as a parallel object. As described above, examples of the parallel object include structures alongside the road, such as a guardrail and a sound-insulating wall of an expressway, and a side surface of the other vehicle 42A illustrated in FIG. 49. The collected point group 181 arranged in the z direction in the x-z coordinate space corresponds to an object arranged in parallel to the direction of travel of the mobile object 30 or a surface of the object parallel to the direction of travel of the mobile object 30. The control unit 24 can exclude the collected point group 181 arranged in the z direction from the target of the object detection process. The disparity corresponding to the parallel object detected in the clustering process described above is excluded from the target of the process of acquiring the representative disparities $d_e$ in the processing of step S902 illustrated in FIG. 45. However, not all disparities corresponding to parallel objects may be detected in the clustering process. In this case, a disparity corresponding to a parallel object, for example, the collected point group 181, may be present in the x-z coordinate space. Even when a disparity corresponding to a parallel object, such as the collected point group 181, is present in the x-z coordinate space, the disparity corresponding to the parallel object can be excluded from the target of the object detection process in the processing of step S109.

The control unit 24 can detect the width of the object from the width of the collected point group 180 arranged in the x direction, which is recognized as the object. The control unit 24 can determine the height of the object on the basis of height information associated with the representative disparities $d_e$ acquired in the process illustrated in FIG. 45. Thus, the control unit 24 can recognize the position, breadth, and height of the recognized object in the x-z coordinate space.

Figure 51:
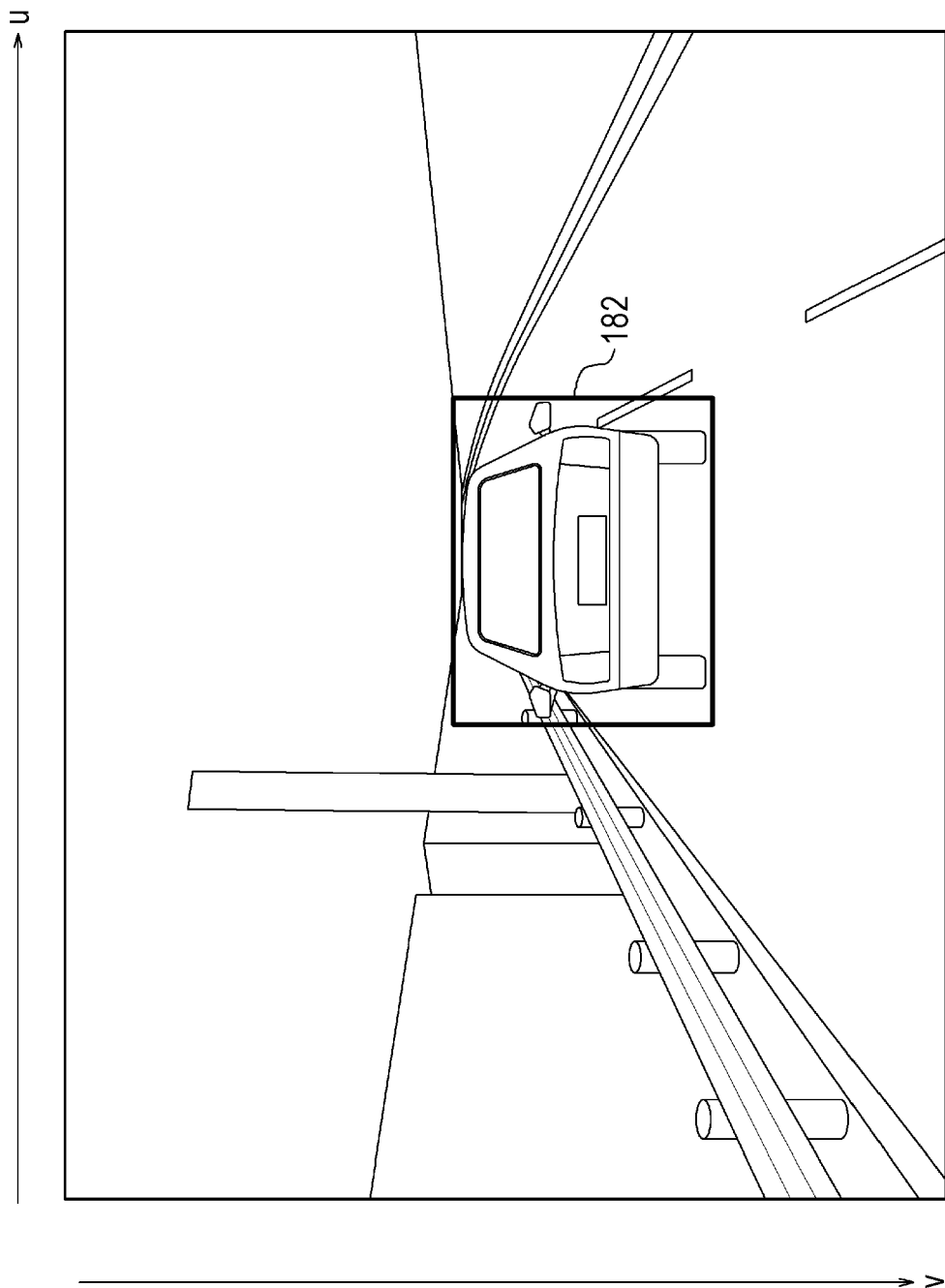
FIG. 51 is a diagram illustrating an example of a method for outputting detection result of an object.

In the processing of step S110, the control unit 24 can output information on the position, breadth, and height of the object recognized in the processing of step S109 to other devices inside the mobile object 30 through the output unit 22. For example, the control unit 24 can output the information described above to a display device in the mobile object 30. As illustrated in FIG. 51, the display device in the mobile object 30 may display a detection frame 182 surrounding an image corresponding to another vehicle in the image of the first camera 11 or the second camera 12, on the basis of the information acquired from the object detection device 20. The detection frame 182 indicates the position of the detected object and a range occupied by the object in the image.

As described above, the object detection device 20 of the present disclosure enables object detection at a high processing speed with high accuracy. That is, the object detection device 20 of the present disclosure and an object detection method of the present disclosure can improve the object detection performance. Further, the object to be detected by the object detection device 20 is not limited to a specific type of object. The object detection device 20 is capable of detecting any object present on a road surface. The control unit 24 of the object detection device 20 can execute the first process, the second process, the third process, and the fourth process without using information on an image captured by the stereo camera 10 other than the first disparity image. This may eliminate the need for the object detection device 20 to perform a process of separately recognizing an object from a captured image in addition to processing of the first disparity image and the second disparity image. Accordingly, the object detection device 20 of the present disclosure can reduce the processing load of object recognition on the control unit 24. This does not preclude the object detection device 20 of the present disclosure from being combined with image processing for an image obtained directly from the first camera 11 or the second camera 12. The object detection device 20 can be combined with an image processing technique such as template matching.

In the description of the processes executed by the control unit 24 described above, processes including determination, operation, and the like using various images have been described to help understand the present disclosure. The processes using these images need not include processes for actually drawing an image. Processes having substantially the same content as the processes using these images are executed by information processing inside the control unit 24.

While embodiments according to the present disclosure have been described with reference to the drawings and examples, it should be noted that various modifications or changes can easily be made by a person skilled in the art on the basis of the present disclosure. Accordingly, it should be noted that these modifications or changes fall within the scope of the present disclosure. For example, the functions and the like included in each component, each step, or the like can be rearranged in any manner that is not logically contradictory, and a plurality of components, steps, or the like may be combined into one or divided. While embodiments according to the present disclosure have been described focusing on a device, embodiments according to the present disclosure may also be implemented as a method including steps executed by the components of the device. Embodiments according to the present disclosure may also be implemented as a method or a program executed by a processor included in the device, or a storage medium having recorded therein the program. It should be understood that these are also included in the scope of the present disclosure.

In the present disclosure, descriptions such as "first" and "second" are identifiers for distinguishing the respective configurations. The configurations distinguished by the descriptions such as "first" and "second" in the present disclosure may be interchangeably numbered. For example, a first lens and a second lens can exchange their identifiers "first" and "second". The identifiers are exchanged simultaneously. Even after the identifiers are exchanged, the respective configurations are distinguishable. The identifiers may be deleted. Configurations without identifiers are distinguished using reference signs. Only the description of identifiers such as "first" and "second" in the present disclosure should not be used for interpreting the order of the configurations or as a basis of the presence of identifiers with smaller numbers.

In the present disclosure, the x direction, the y direction, and the z direction are provided for convenience of description and may be interchanged with each other. The configurations according to the present disclosure have been described using the Cartesian coordinate system with the x direction, the y direction, and the z direction corresponding to the respective axial directions. The positional relationship between the components according to the present disclosure is not limited to an orthogonal relationship. The u coordinate and the v coordinate representing a pair of coordinates on an image are provided for convenience of description and may be interchanged with each other. The origins and directions of the u coordinate and the v coordinate are not limited to those of the present disclosure.

In the embodiment described above, the first camera 11 and the second camera 12 of the stereo camera 10 are positioned side by side in the x direction. The arrangement of the first camera 11 and the second camera 12 is not limited to this. The first camera 11 and the second camera 12 may be positioned side by side in a direction perpendicular to the road surface (i.e., the y direction) or a direction inclined with respect to the road surface 41A. The number of cameras included in the stereo camera 10 is not limited to two. The stereo camera 10 may include three or more cameras. For example, two cameras arranged side by side in a direction horizontal to the road surface and two cameras arranged side by side in a direction perpendicular to the road surface, namely, four cameras in total, may be used to obtain more accurate distance information.

In the embodiment described above, the stereo camera 10 and the object detection device 20 are mounted in the mobile object 30. The stereo camera 10 and the object detection device 20 may not necessarily be mounted in the mobile object 30. For example, the stereo camera 10 and the object detection device 20 may be mounted in a roadside device installed at an intersection or the like and disposed so as to capture an image including a road surface. For example, the roadside device is capable of detecting a first vehicle approaching from one of roads intersecting at an intersection and providing information indicating that the approach of the first vehicle to a second vehicle traveling and approaching from the other road.

REFERENCE SIGNS LIST 1, 1A object detection system
10 stereo camera
11 first camera
12 second camera
20 object detection device
21 acquisition unit
22 output unit
23 memory
24 control unit
25 generation device
30 mobile object
40 first disparity image
41, 42, 43, 44, 71, 72, 73, 74, 75, 76, 81, 82, 101 disparity image
41A road surface
42A vehicle
42a, 83, 84, 85, 102, 103, 104, 105, 151, 152, 153, 154, 161, 162, 163 disparity pixel
45 frame
51 graph
52 first straight line
53 approximation start point
54 candidate straight line
55 second straight line
60, 70, 80, 100, 150, 160 second disparity image
61 sub-region
61-1, 61 sub-region
62 area
90, 106, 120, 170 first image
91, 92, 107, 121, 122, 123, 124, 125, 171, 172 image
101a sub-region
107a lower image
107b upper image
110, 140 UD map
110VP, 120VP vanishing point
111, 112, 113, 114, 115, 180, 181 point group
111L, 115L straight line
131, 132, 133, 134 point
131L, 132L, 133L, 134L, 135L curve
141, 142 first disparity point
143 second disparity point
172a, 172b sub-image
182 detection frame

The invention claimed is:

1. An object detection device comprising:
a processor configured to search for a pair of coordinates associated with a disparity approximately equal to a target disparity satisfying a predetermined condition in a second direction of a disparity map, update a first pair of coordinates to the pair of coordinates found, and calculate a height of an object corresponding to the target disparity based on the first pair of coordinates, the disparity map being a map in which a disparity acquired from a captured image generated by a stereo camera capturing an image of a road surface is associated with a pair of two-dimensional coordinates formed by the second direction and a first direction corresponding to a horizontal direction of the captured image, the second direction intersecting the first direction, wherein
the processor is further configured to
when a second pair of coordinates associated with a disparity approximately equal to the target disparity is present within a predetermined interval from the first pair of coordinates, update the first pair of coordinates to the second pair of coordinates based on undulations of the road surface, and
when a predetermined number or more of pairs of coordinates associated with a disparity smaller than the target disparity are present between the first pair of coordinates and the second pair of coordinates, not update the first pair of coordinates to the second pair of coordinates,
wherein the disparity approximately equal to the target disparity includes the same disparity as the target disparity and substantially the same disparity as the target disparity.

2. The object detection device according to claim 1, wherein
the processor is configured to
search for a pair of coordinates associated with the target disparity, starting from a pair of coordinates of the road surface corresponding to the target disparity, in a direction corresponding to a direction pointing upward from the road surface among directions included in the second direction of the disparity map, update the first pair of coordinates to the pair of coordinates found, and subtract the pair of coordinates of the road surface from the first pair of coordinates to calculate the height of the object.

3. The object detection device according to claim 2, wherein
the processor is configured not to
calculate the height of the object when a pair of coordinates associated with a disparity approximately equal to the target disparity is not present within a predetermined range from the pair of coordinates of the road surface in the direction corresponding to the direction pointing upward from the road surface.

4. The object detection device according to claim 3, wherein
the predetermined range is set based on a height of an object located above the road surface from the road surface.

5. The object detection device according to claim 1, wherein
the processor is configured to
divide the disparity map into a plurality of sub-regions in the first direction of the disparity map and generate, for each of the plurality of sub-regions, a distribution indicating a disparity frequency, and
extract, as the target disparity satisfying the predetermined condition, a disparity for which the disparity frequency exceeds a predetermined threshold.

6. The object detection device according to claim 1, wherein
the predetermined interval is set based on a height of an object to be detected by the object detection device.

7. The object detection device according to claim 1, wherein
the processor is configured to execute, as a process for generating the disparity map,
a first process for estimating a shape of the road surface in a real space based on a first disparity map, the first disparity map being generated based on an output of the stereo camera and being a map in which a disparity obtained from the output of the stereo camera is associated with a pair of two-dimensional coordinates formed by the first direction and the second direction, and
a second process for removing from the first disparity map a disparity corresponding to a range for which a height from the road surface in the real space is less than or equal to a predetermined height based on the estimated shape of the road surface to generate a second disparity map as the disparity map.

8. An object detection system comprising:
a stereo camera that captures a plurality of images having a disparity therebetween; and
an object detection device including at least one processor, wherein
the at least one processor is configured to
search for a pair of coordinates associated with a disparity approximately equal to a target disparity satisfying a predetermined condition in a second direction of a disparity map, update a first pair of coordinates to the pair of coordinates found, and calculate a height of an object corresponding to the target disparity based on the first pair of coordinates, the disparity map being a map in which a disparity acquired from a captured image generated by the stereo camera capturing an image of a road surface is associated with a pair of two-dimensional coordinates formed by the second direction and a first direction corresponding to a horizontal direction of the captured image, the second direction intersecting the first direction,
when a second pair of coordinates associated with a disparity approximately equal to the target disparity is present within a predetermined interval from the first pair of coordinates, update the first pair of coordinates to the second pair of coordinates based on undulations of the road surface, and
when a predetermined number or more of pairs of coordinates associated with a disparity smaller than the target disparity are present between the first pair of coordinates and the second pair of coordinates, not update the first pair of coordinates to the second pair of coordinates,
wherein the disparity approximately equal to the target disparity includes the same disparity as the target disparity and substantially the same disparity as the target disparity.

9. A mobile object comprising the object detection system according to claim 8.

10. An object detection method comprising:
searching for a pair of coordinates associated with a disparity approximately equal to a target disparity satisfying a predetermined condition in a second direction of a disparity map,
updating a first pair of coordinates to the pair of coordinates found, and calculating a height of an object corresponding to the target disparity based on the first pair of coordinates, the disparity map being a map in which a disparity acquired from a captured image generated by a stereo camera capturing an image of a road surface is associated with a pair of two-dimensional coordinates formed by the second direction and a first direction corresponding to a horizontal direction of the captured image, the second direction intersecting the first direction, wherein
the calculating of the height of the object includes
when a second pair of coordinates associated with a disparity approximately equal to the target disparity is present within a predetermined interval from the first pair of coordinates, updating the first pair of coordinates to the second pair of coordinates based on undulations of the road surface, and
when a predetermined number or more of pairs of coordinates associated with a disparity smaller than the target disparity are present between the first pair of coordinates and the second pair of coordinates, not updating the first pair of coordinates to the second pair of coordinates,
wherein the disparity approximately equal to the target disparity includes the same disparity as the target disparity and substantially the same disparity as the target disparity.

* * * * *